(12) United States Patent
Tobikov et al.

(10) Patent No.: US 12,092,195 B2
(45) Date of Patent: Sep. 17, 2024

(54) VEHICLE DIFFERENTIAL LOCKING DEVICE

(71) Applicants: Roman Tobikov, Pos. Oktyabrskiy (RU); Denis Shuba, Krasnodar (RU)

(72) Inventors: Roman Tobikov, Pos. Oktyabrskiy (RU); Denis Shuba, Krasnodar (RU)

( * ) Notice: Subject to any disclaimer, the term of this patent is extended or adjusted under 35 U.S.C. 154(b) by 0 days.

(21) Appl. No.: 17/773,927

(22) PCT Filed: Sep. 20, 2021

(86) PCT No.: PCT/RU2021/050302
§ 371 (c)(1),
(2) Date: May 3, 2022

(87) PCT Pub. No.: WO2022/197207
PCT Pub. Date: Sep. 22, 2022

(65) Prior Publication Data
US 2023/0220911 A1    Jul. 13, 2023

(30) Foreign Application Priority Data

Mar. 19, 2021    (RU) ................................ 2021107252

(51) Int. Cl.
*F16H 48/24*    (2006.01)
*F16H 48/34*    (2012.01)

(52) U.S. Cl.
CPC .............. *F16H 48/24* (2013.01); *F16H 48/34* (2013.01)

(58) Field of Classification Search
CPC .......... F16H 48/24; F16H 48/34; F16H 48/08; F16H 2048/343; F16H 2048/202; F16D 2011/006; F16D 11/12; F16D 23/14; F16D 2023/141; F16D 28/00
See application file for complete search history.

(56) References Cited

U.S. PATENT DOCUMENTS

| 2016/0033025 A1* | 2/2016 | Valente ................... F16H 48/24 475/231 |
| 2019/0154128 A1* | 5/2019 | Downs .................... F16D 15/00 |
| 2022/0194223 A1* | 6/2022 | Zingerle ................. F16H 48/40 |

* cited by examiner

*Primary Examiner* — Lori Wu
(74) *Attorney, Agent, or Firm* — Nadya Reingand

(57) ABSTRACT

The claimed invention relates to the automotive industry, namely: to devices for locking differentials of vehicle driving axles with forced locking. The technical result is creating a differential locking mechanism facilitating a significant improvement of performance indicators in differentials using the claimed locking mechanism and the range expansion of such a differential use. The technical result is achieved by the locking device integrated into the differential, comprising the differential housing, semi-axle gears located inside the housing, and being in either "Locked" or "Unlocked" positions, consists of: locking elements shaped as a rotation body; through locking holes made in the differential housing; the recesses of semi-axle gear arranged on the semi-axle gear surface; ring lock-up clutch on the differential housing around the locking holes with locking elements, on the inner surface of which there are lock-up clutch grooves enlarging the contact spot area: "Lock-up clutch—locking element".

4 Claims, 70 Drawing Sheets

View M

Figure 1:
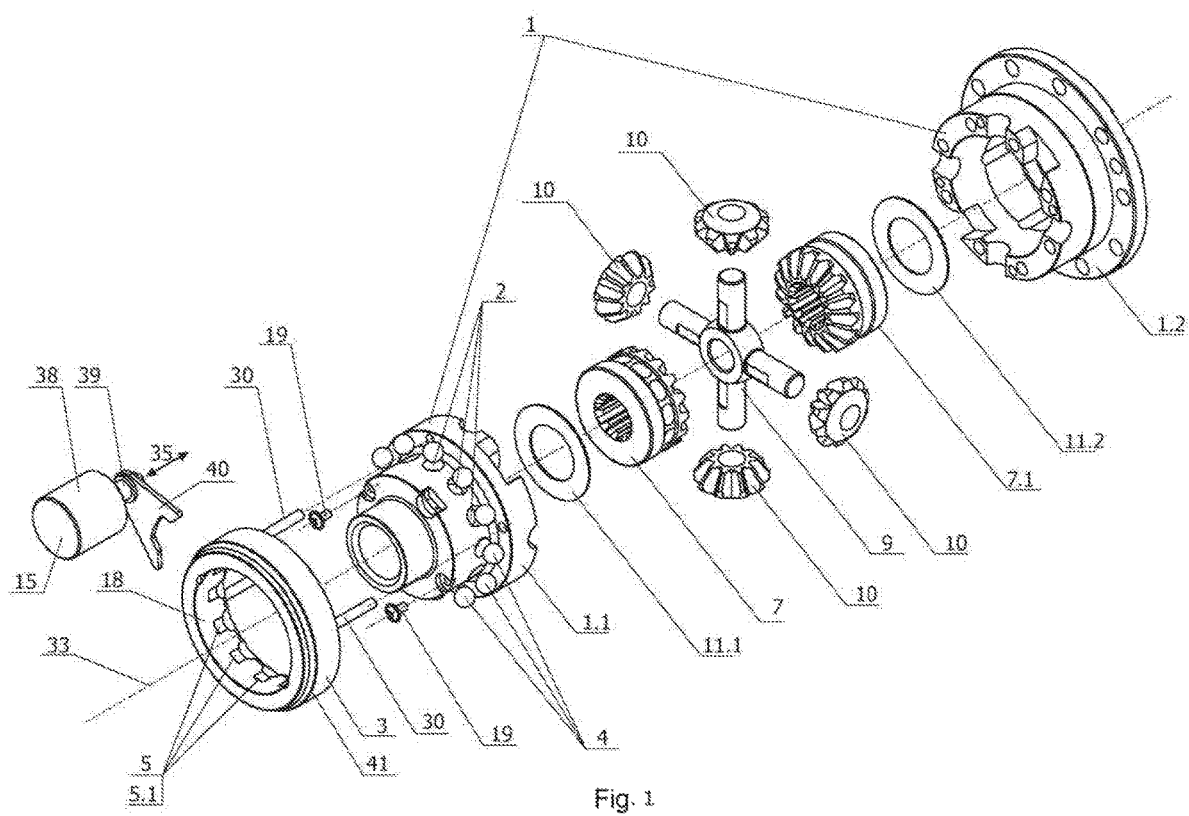

|  | Load (kg) | Cntact patch area (MM²) | Immersion depth (MM) | Maximum pressure (MPa) |
|---|---|---|---|---|
| Claimed device | 3000 | 14,045 | 0,062 | 4288 |
| Prototype | 3000 | 8,595 | 0,228 | 10063 |

Fig. 70

VEHICLE DIFFERENTIAL LOCKING DEVICE

TECHNICAL FIELD

The claimed invention relates to the automotive industry, namely: to devices for locking differentials of vehicle driving axles with forced locking.

STATE OF ART

From the state of the art, the utility model patent of the Russian Federation No. 154407 Differential with a forced vehicle locking is known (Patent Application No. 2014151019; IPC F16H 48/20. Patent holder(s): Tobikov Alexander Andreevich (RU); published on 20 Aug. 2015) [1]. The technical result is achieved by the vehicle differential with forced locking comprising a differential housing, inside which the semi-axle gear is located and a device for blocking the differential rotation. In this device, at least one hole is made in the differential housing to comprise Locking Element. At least one recess is made on the axis of the semi-axle gear. Around the holes with Locking Elements, there is a ring-shape coupling that can move along the central axis of the differential housing. This design has an advantage over differentials with forced locking based on spline or clutch couplings.

A forced blocking differential is known for vehicles under the invention patent of the Russian Federation No. 2040720 (Application No. 5028840; IPC F16H 48/20; published on Jul. 25, 1995) [2]. The known differential contains Semi-Axle Gears 2 and 3 located in Housing 1 with semi-axes placed in the, Satellites 6 engaged with semi-axle gears, as well as a locking device that comprises Switch 8 mounted on the differential carrier housing with the possibility of axial movement. Clamps 7, Springs 5, Pressing Balls 4 for locking are located inside the axes of Satellites 6. Radial Grooves are made on the front-end surfaces of semi-axle gears for interaction with balls, and the inner working surface of the switch has a conical shape. It simplifies the structure, increases its durability, and ensures a smooth non-step alteration of the differential locking coefficient. The disadvantages of this design include the structure complexity and the narrow scope of the blocking mechanism. This mechanism excludes the possibility of its use in worm-gear and gearless differentials, as well as in axles with a small differential crankcase, for example, in UAZ gear axle.

A forced blocking differential is known for vehicles under the invention patent of the Russian Federation No. 2304243 (Application 2006113228; IPC F16H 48/20, B60K23/04, B60K17/16; published on 10 Aug. 2007) [3]. Such differential comprises Housing 1, Semi-Axle Gears 2 and 3, satellites and a locking device. The locking device is made as a ring-shaped Switch 7 joined to Drive 8, Pushers 10 located inside Satellite Axes 9, intermediate and locking elements. An elastic stopper is also added to the differential, and Spring Inserts 17 and 18 are located between Housing 1 and Rear Surfaces 20 and 21 of Semi-Axle Gears 2 and 3. At the same time, wave-like profile grooves that fit Locking Elements profile are made on the front end surfaces of Semi-Axle Gears 2 and 3. The number of radial grooves is even. The effort transmitting elements inside the satellite axes are executed in the shape of a set of balls. The spring inserts are made as belleville springs. The elastic stopper of locking elements is executed in the shape of a split spring ring. The drive with which the ring switch is connected is made as a stepper motor.

The disadvantages of this structure include the possibility of jamming the locking balls after the complete lock of the differential, since there is no force to return the balls. Besides, the disadvantages include the inability to obtain a locking coefficient equal to one due to the fact that the springs cannot transfer the effort sufficient for locking the semi-axle gears together. Mechanical locking activation leads to rapid wear of the parts involved in the lock, reducing the service life of the differential itself.

The mechanism of forced locking of vehicle inter-wheel differential is known under the invention patent of the Russian Federation No. 2165043 (application Ser. No. 99/117,948/28, IPC F16H 48/20; published on 10 Apr. 2001, is inactive) [4]. It comprises an axle case, a clutch coupling made of two parts, one of which is fixed to the differential carrier housing, and the other is located on the semi-axle. It is movable axially by a double-arm lever, one of the ends of which is made in the shape of a fork. It is mounted on the axle so that one arm interacts with the piston of Drive Mechanism, and the other arm interacts with the movable half-coupling. The mechanism is equipped with a bracket mounted in the flange of the axle case, and the axis of the double-arm lever is fixed on the bracket console.

The disadvantages of the known mechanism are the presence of holes for the fork axis in the axle case. It results in the decrease of axle case strength and reliability. Non-original semi-axle has a negative impact on repairability.

A self-locking differential of a vehicle is known under RF U.S. Pat. No. 2,319,875 (Application No. 2005137271, IPC F16H 48/20; published in 2007) [5]. It comprises a drive housing in which semi-axle elements connected to the semi-axles are arranged coaxially with each other. On the outer surface, they have screw grooves in the direction opposite to the spiral. The rolling elements are shaped as balls filling as a chain at least one closed channel in the drive housing. A part of the channel is open to fit the ball segments in the screw grooves. The closed channel in the longitudinal section is rectangular with rounded outer corners. The cross-section of the branches of a rectangular closed channel is equal to ball diameter, and the number of balls in the channel is odd.

The disadvantages of this differential include low reliability of the design due to using a rectangular closed channel. The right inner corners of a rectangular closed channel and a rectangular section on the outer wall of the transition channel when the chain of balls moves from the transition channels into the return channel or into the working groove lead to braking of the ball chain. It causes increased friction of the balls with the outer wall of the closed channel, namely with the outer wall of the transition channels and the walls at the interface of the covers and the housing (in the junction zone of transition channels with the return channel), as well as with the inner wall of the closed channel in the corners of the partition between the return channel and the working groove. It leads to balls wearing, abrasion of transition channel walls, causing a gap between the balls and ball chain elongation. Besides, when exiting the transition channels into the cavity between the working groove and screw grooves of the semi-axle elements, the balls hit each other and the end of semi-axle elements, which leads to wearing and destruction not only of the balls and the semi-axle elements, but also of the differential mechanism as a whole.

This structure of a self-locking differential affects the vehicle passability, significantly reduces its service life and, as a result, affects the traffic safety.

The RF patent for Utility Model No. 154407 Differential with forced locking for a vehicle [1] describes the structure of the differential with the option of forced locking.

The design described above has a number of disadvantages:
1. When locking on the move, the differential lock mechanism undergoes severe impact loads. At the same time, deformations are formed on the edges of spherical recesses located on the neck of the semi-axle gear. The deformation leads to a local increase in the diameter of the semi-axle gear neck. It leads to jamming of the semi-axle gear and differential failure;
2. Under shock load on the differential in the locked state, due to the small e contact spot area between Locking Element and the coupling, the coupling inner surface is deformed, which, in its turn, locally reduces the coupling inner diameter. It leads to coupling wedging on the differential housing, and locking ability is disabled;
3. When the locking mechanism is in operation, there is a problem of coupling misalignment related to differential housing. It leads to time increase for all locking elements to get into the grooves of the semi-axle gear, which, in turn, imposes restrictions on the speed of semi-axle gear rotation relative to the differential housing at the time the locking mechanism is triggered.

All these factors limit the load capacity, operational characteristics and service life of the differential with forced locking described in Patent RU 154407.

According to the essential features scope, the closest analogue is a differential with a forced lock for a vehicle under Utility Model Patent No. 154407 [1].

The technical result of this invention is creating the differential locking mechanism. It facilitates a significant improvement the performance characteristics of the differential. It uses the claimed locking mechanism and expands the range of application of such a differential, by:
Increasing the differential stability when it is locked on the move and under impact loads during movement;
Increasing the reliability of the differential locking mechanism and increasing the load capacity of the differential locking mechanism by increasing the contact area of the pair: locking element-lock-up clutch;
Improving the reliability of the differential locking mechanism by eliminating the cause of mechanism failure under shock load due to hardening on the axle gear;
Increasing the rotation speed of the semi-axle gear relative to the differential housing, on which the differential lock can occur;
Increasing the flawless operation period of the differential locking mechanism;
Increasing the speed of differential locking system activation, also on the move (in Option 1).

The claimed vehicle differential locking device can operate under shock stress. The claimed structure is capable of differential lock-up during the rotation of the semi-axle gear relative to the differential housing. It enables differential lock-up turning on and off while the vehicle is on the move without damaging the differential lock mechanism, which is not admitted for a prototype.

INVENTION DISCLOSURE

The technical result is achieved by the fact that the differential locking device of the vehicle according to Option 1, is integrated into the differential. The differential locking device comprises also the differential housing and semi-axle gears located inside the housing. The position of the differential locking device is "Locked" or "Unlocked". The device consists of:
Locking elements shaped as a rotary body;
Reach-through locking holes made in the differential housing. The holes comprise Locking Elements with the ability to move in Locking Holes along the axes of these holes;
Recesses of the semi-axle gear located on the surface of the semi-axle gear;
Ring lock-up clutch placed on the differential housing around Locking Holes with locking elements; on the inner surface of the ring lock-up clutch there are grooves of the lock-up clutch to increase the contact area of the pair: locking element-lock-up clutch;
Moreover, the lock-up clutch is connected to the drive and has the ability to move along the differential rotation axis.

In the differential locking device, according to Option 1 invention, the grooves of the lock-up clutch have a section intended to fit Locking Element in the recess of the half-axle gear with the possibility of increasing the contact spot area of the pair: "lock-up clutch-locking element" when the device is in "Locked" position.

In the differential locking device, according to Option 1 invention, the grooves of the lock-up clutch also have a section intended to accommodate a part of the volume of Locking Element that locks the diametrically opposite part of Locking Element when it exits from the recess of the half-axle gear when the differential locking device switches to the "Unlocked" position.

In the differential locking device, according to Option 1 invention, the grooves of the lock-up clutch are aligned along the differential rotation axis.

In the differential locking device, according to Option 1 invention, the ring lock-up clutch is equipped with guide pins.

The technical result is also achieved by the fact that the vehicle differential locking device, according to Option 2, is integrated into the differential. The differential locking device comprises also the differential housing and semi-axle gears located inside the housing. The position of the differential locking device is "Locked" or "Unlocked". The device consists of:
Locking elements shaped as a rotary body;
Reach-through locking holes made in the differential housing. The holes comprise Locking Elements with the ability to move in Locking Holes along the axes of these holes;
Recesses of the semi-axle gear located on the surface of the semi-axle gear;
Ring lock-up clutch mounted on the differential housing around Locking Holes with locking elements; on the inner surface of the ring lock-up clutch there are grooves of the lock-up clutch to increase the contact area of the pair: locking element-lock-up clutch;
In this case, the lock-up clutch is made with the possibility of its turn relative to the differential housing around its rotation axis and with the possibility of stopping its rotation in the "Unlocked" and "Locked" positions.

In the differential locking device, according to Option 2 invention, Locking Elements in the shape of long pins are made with the possibility of stopping the lock-up clutch rotation in one of two fixed positions "Locked" depending on the rotation direction of the differential housing relative to its crankcase and in view of returning the lock-up clutch to the fixed position "Unlocked".

In the differential locking device, according to Option 2 invention, the Lock-Up Clutchcontains short pins for its return to the fixed "Unlocked" position.

In the differential locking device, according to Option 2 invention, the grooves of the lock-up clutch have two stop sections intended to lock the Lock-Up Clutchin the "Locked" position, due to restriction with these sections of further rotation of the Lock-Up Clutchrelative to the differential housing in "Locked" position. One of the sections restricts such rotation in one direction, and the other section in the opposite direction.

In the differential locking device, according to Option 2 invention, the differential contains a spring mechanism for returning the lock-up clutch to a fixed "Unlocked" position.

In the differential locking device, according to Option 2 invention, the grooves of the lock-up clutch have a section intended to fix Locking Element in the recess of the half-axle gear with the possibility of increasing the contact area of the pair: lock-up clutch—Locking Element, when the device is in "Locked" position.

In the differential locking device, according to Option 2 invention, the grooves of the lock-up clutch have a section intended to accommodate a part of Locking Element when the diametrically opposite part of Locking Element exits from the recess of the half-axle gear when the differential locking device switches to "Unlocked" position.

In the differential locking device, according to Option 2 invention, the drive is located on the housing next to the lock-up clutch. The drive is made with a locking mechanism that prevents its rotation relative to the differential crankcase.

In the differential locking device, according to either Option 1 or 2, the recesses on the outer surface of the semi-axle gear:
are elongated along the parallels of the outer surface of the;
are expanded along the axis of semi-axle gear rotation.

The differential locking device for either Option 1 or 2 has a ring groove located on the outer surface of the semi-axle gear and oriented along the parallels of the outer surface of the semi-axle gear.

LIST OF DEVICE FIGURES

FIG. 1. General view diagram of the device with spaced elements according to Option 1.

Figure 2:
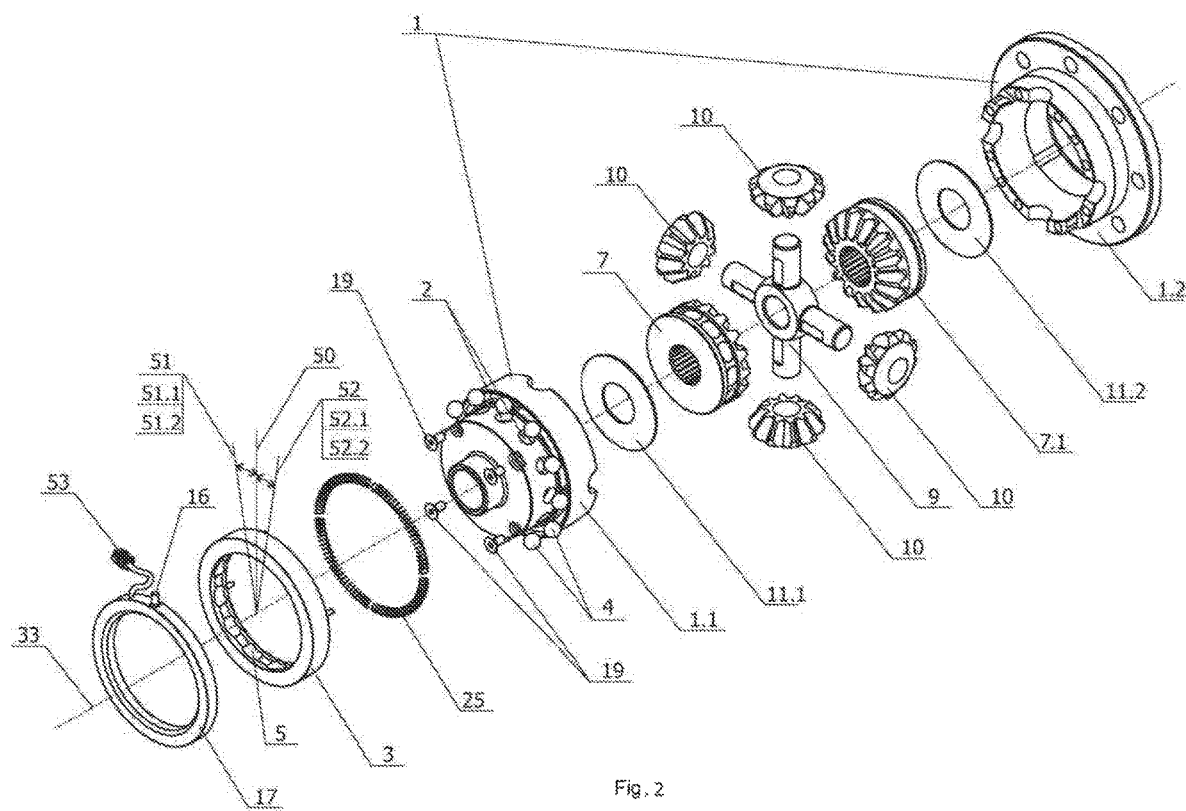

FIG. 2. General view diagram of the device with spaced elements according to Option 2.

Figure 3:
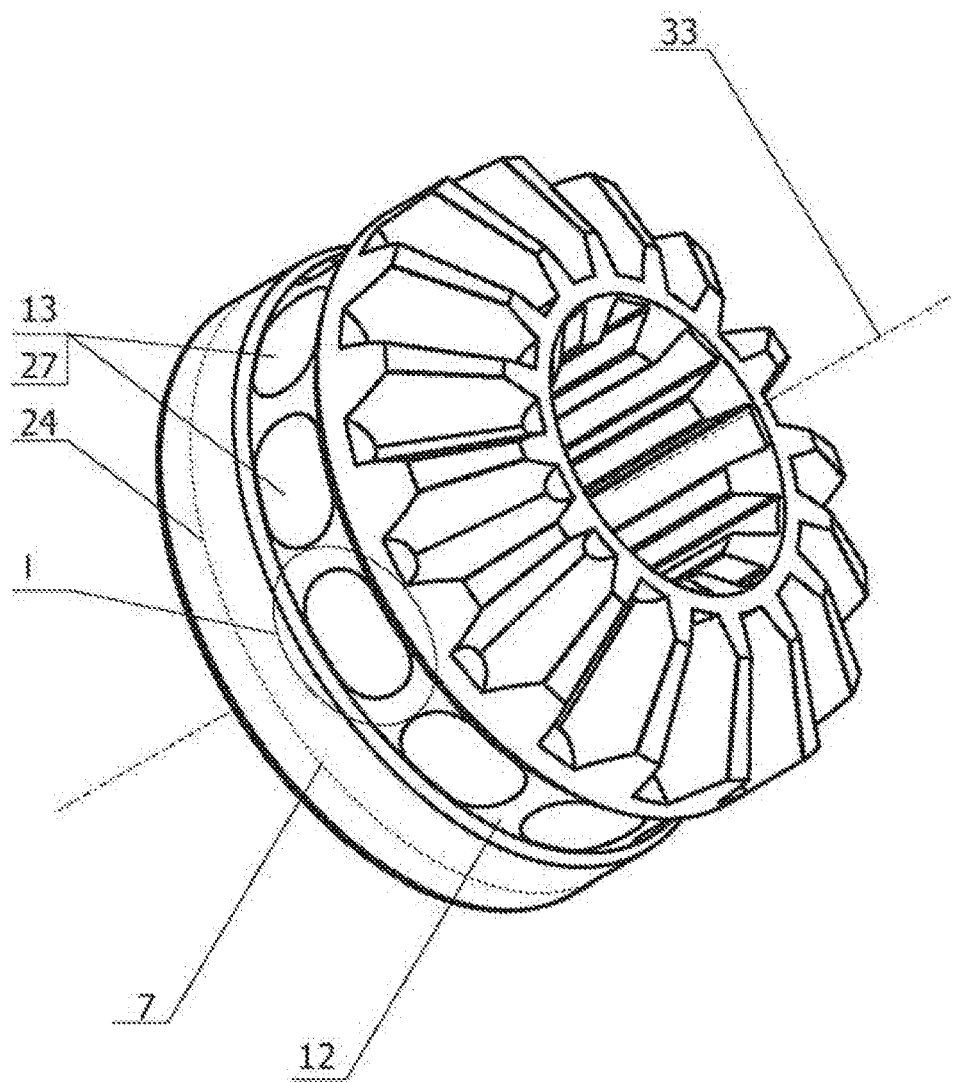

FIG. 3. General view of Semi-Axle Gear 7.

Figure 4:
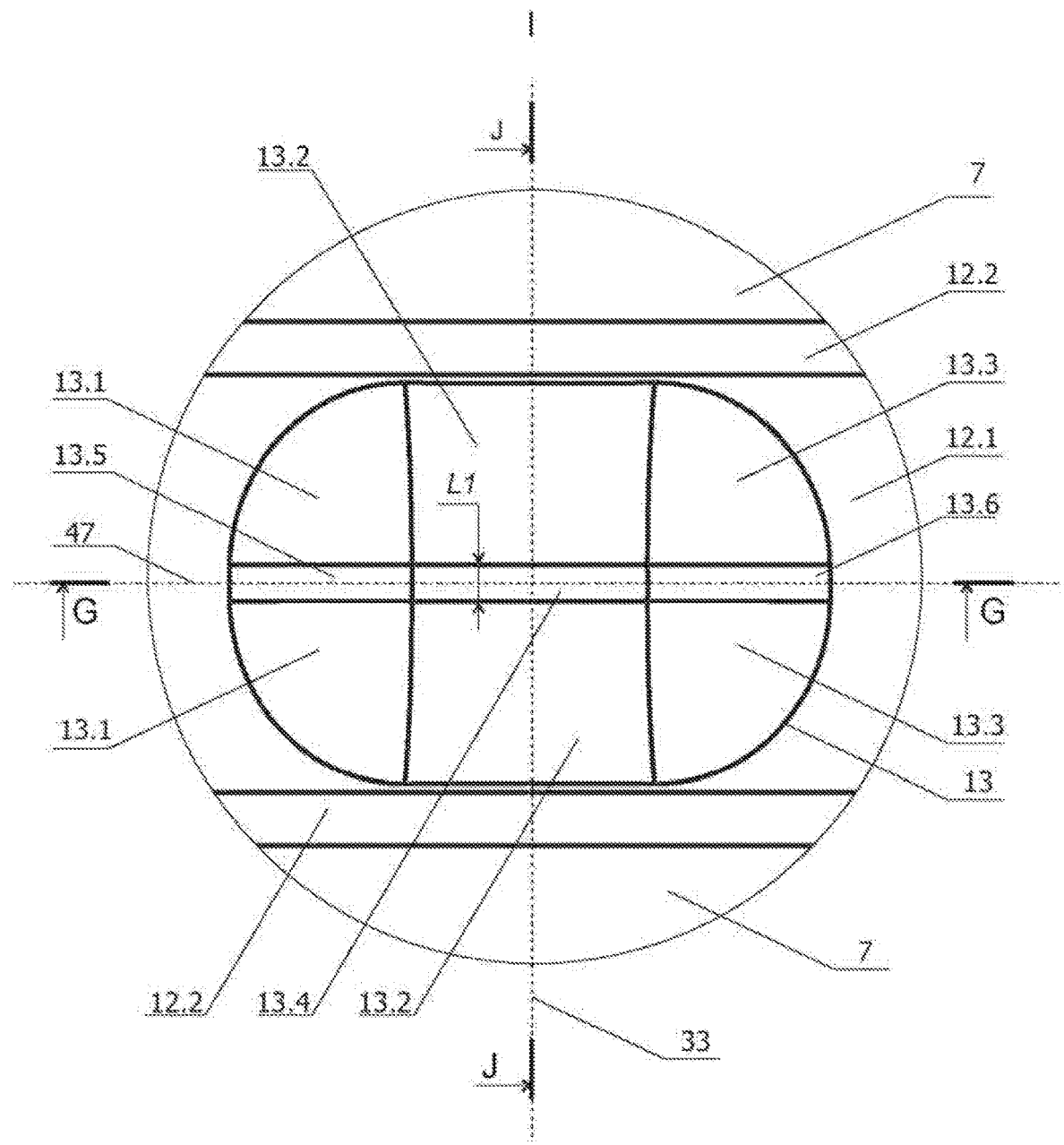

FIG. 4. View I of FIG. 3.

Figure 5:
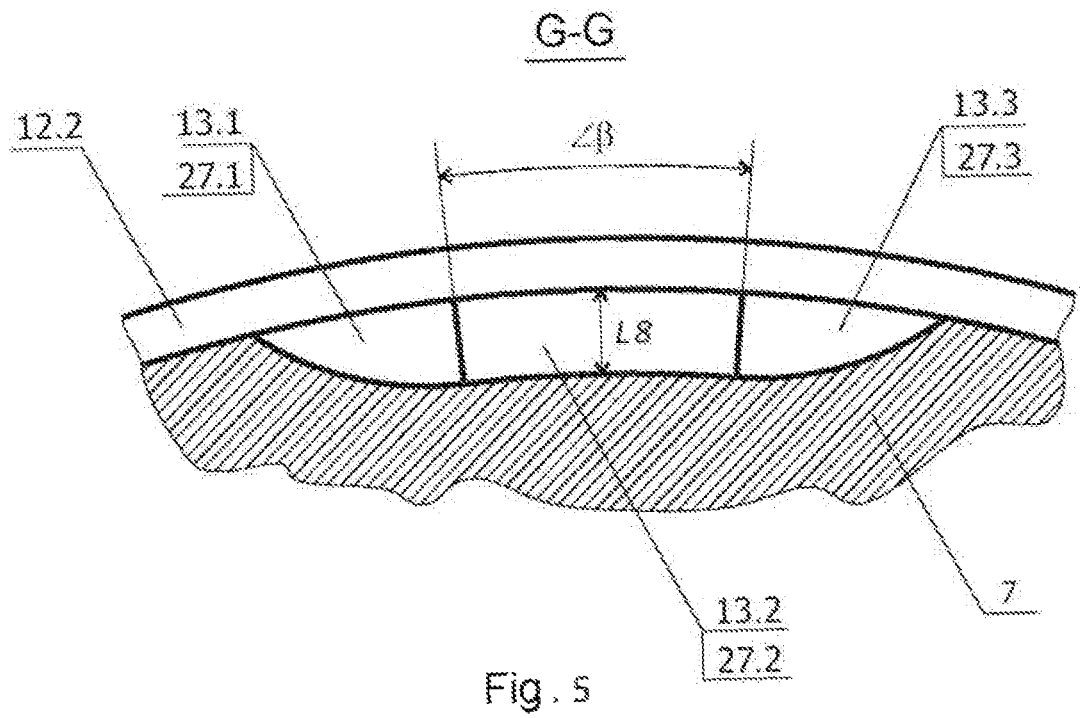

FIG. 5. Cross section along G-G axis in FIG. 4 and FIG. 50.

Figure 6:
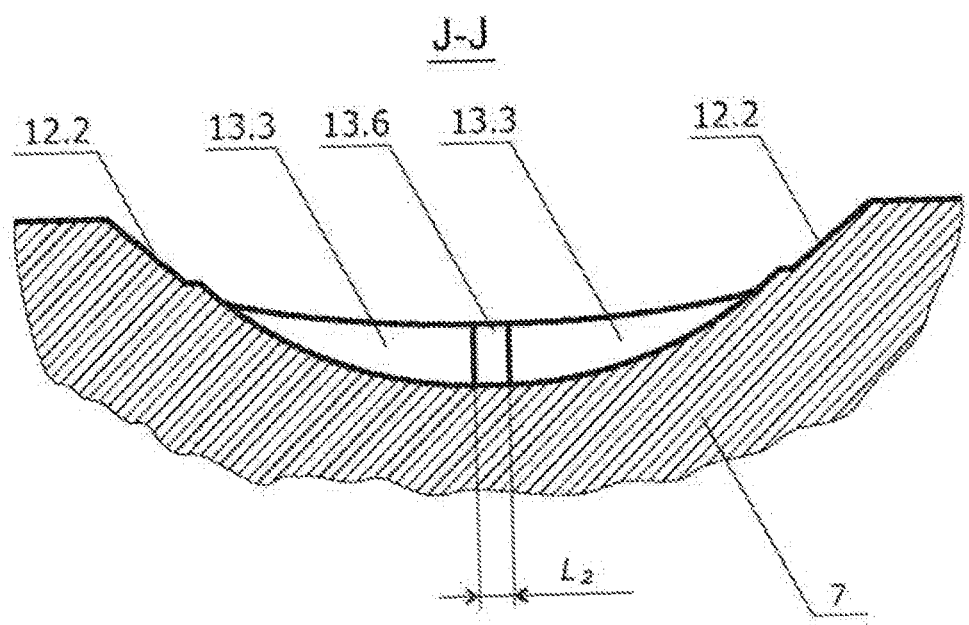

FIG. 6. Cross section along J-J axis in FIG. 4.

Figure 7:
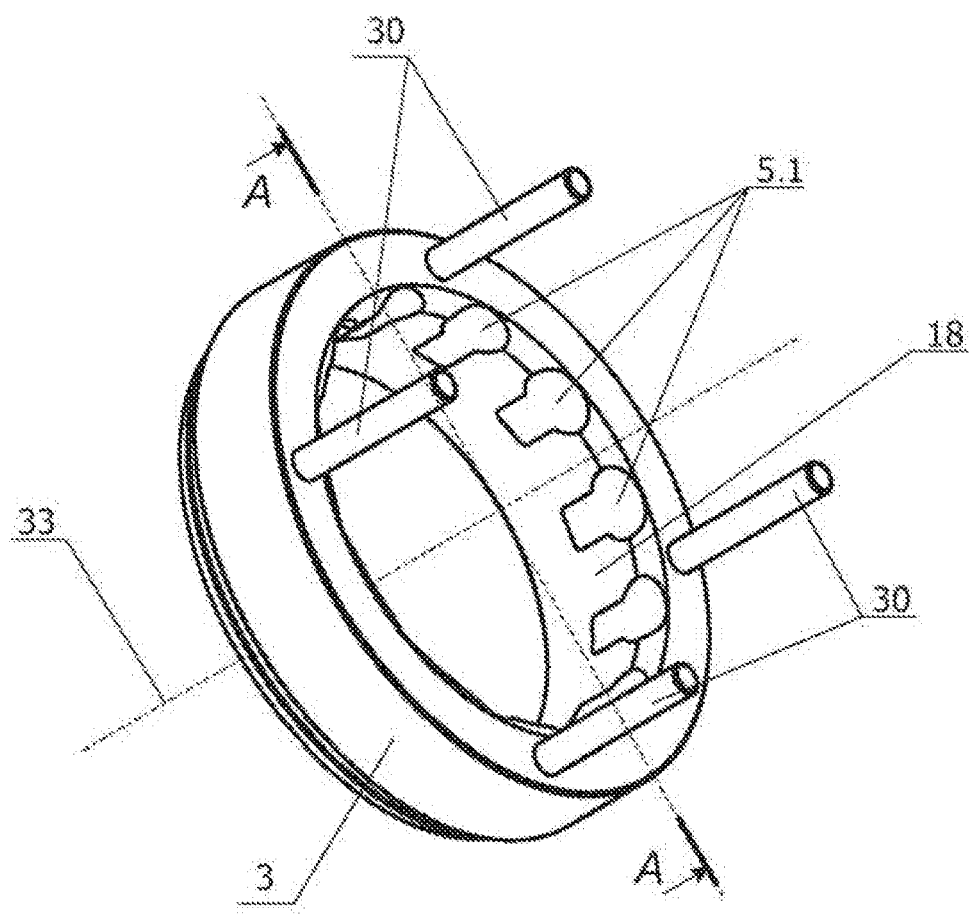

FIG. 7. General view of Lock-Up Clutch 3, according to Option 1.

Figure 8:
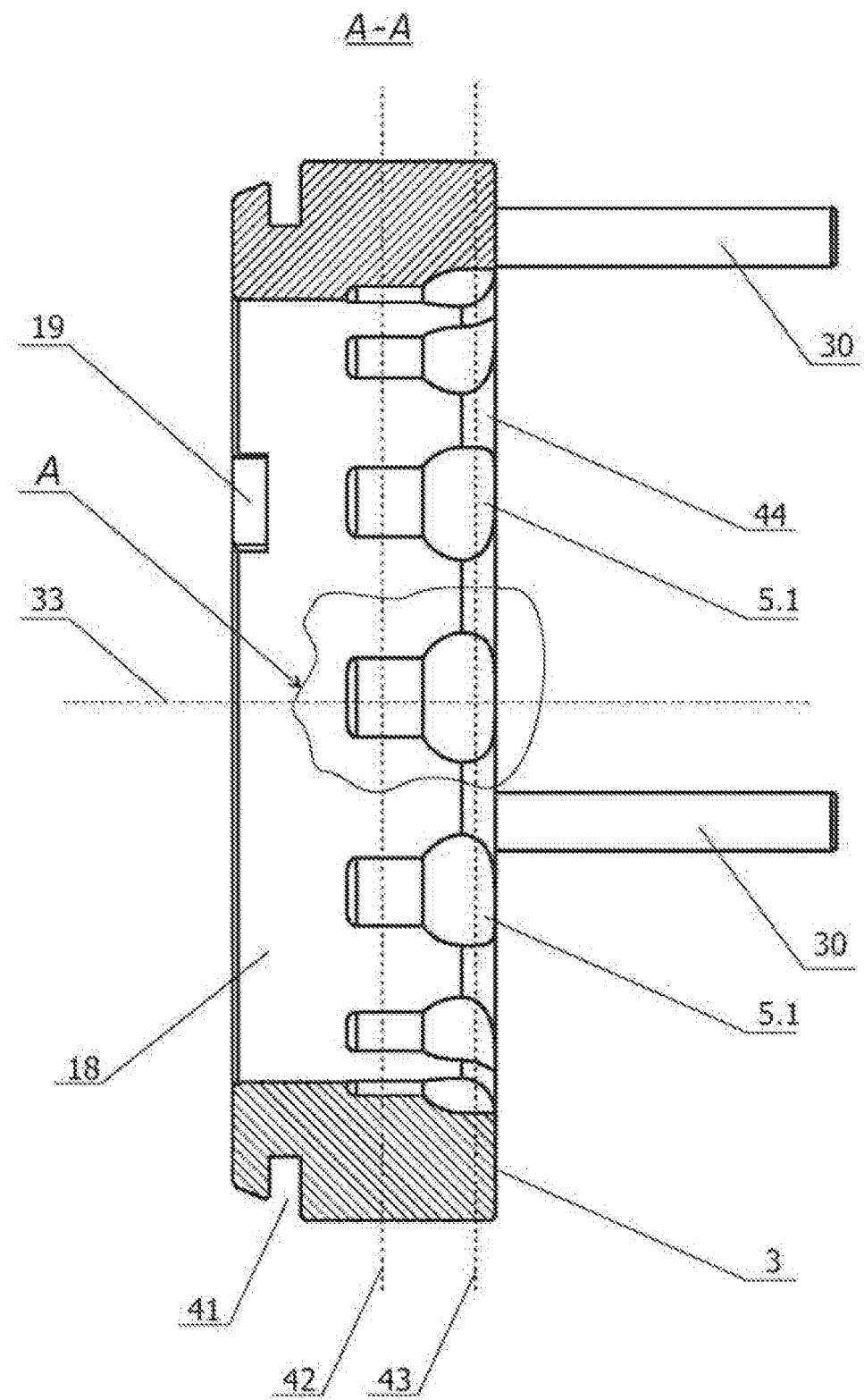

FIG. 8. Cross section A-A in FIG. 7.

Figure 9:
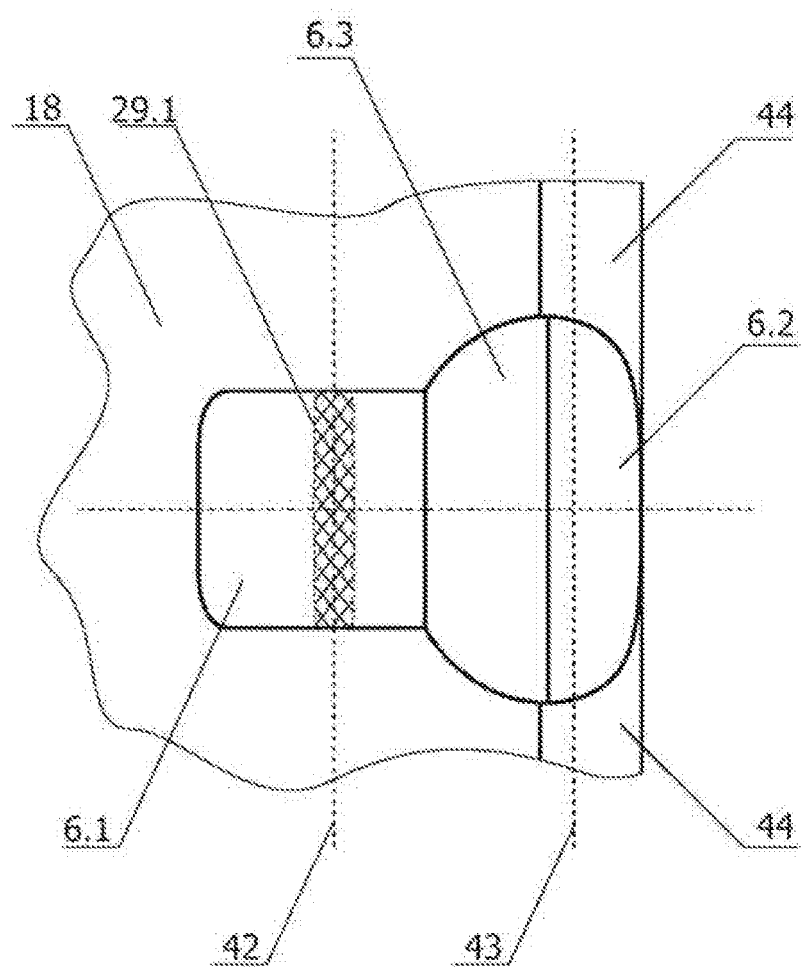

FIG. 9. Groove 5, View A in FIG. 8.

Figure 10:
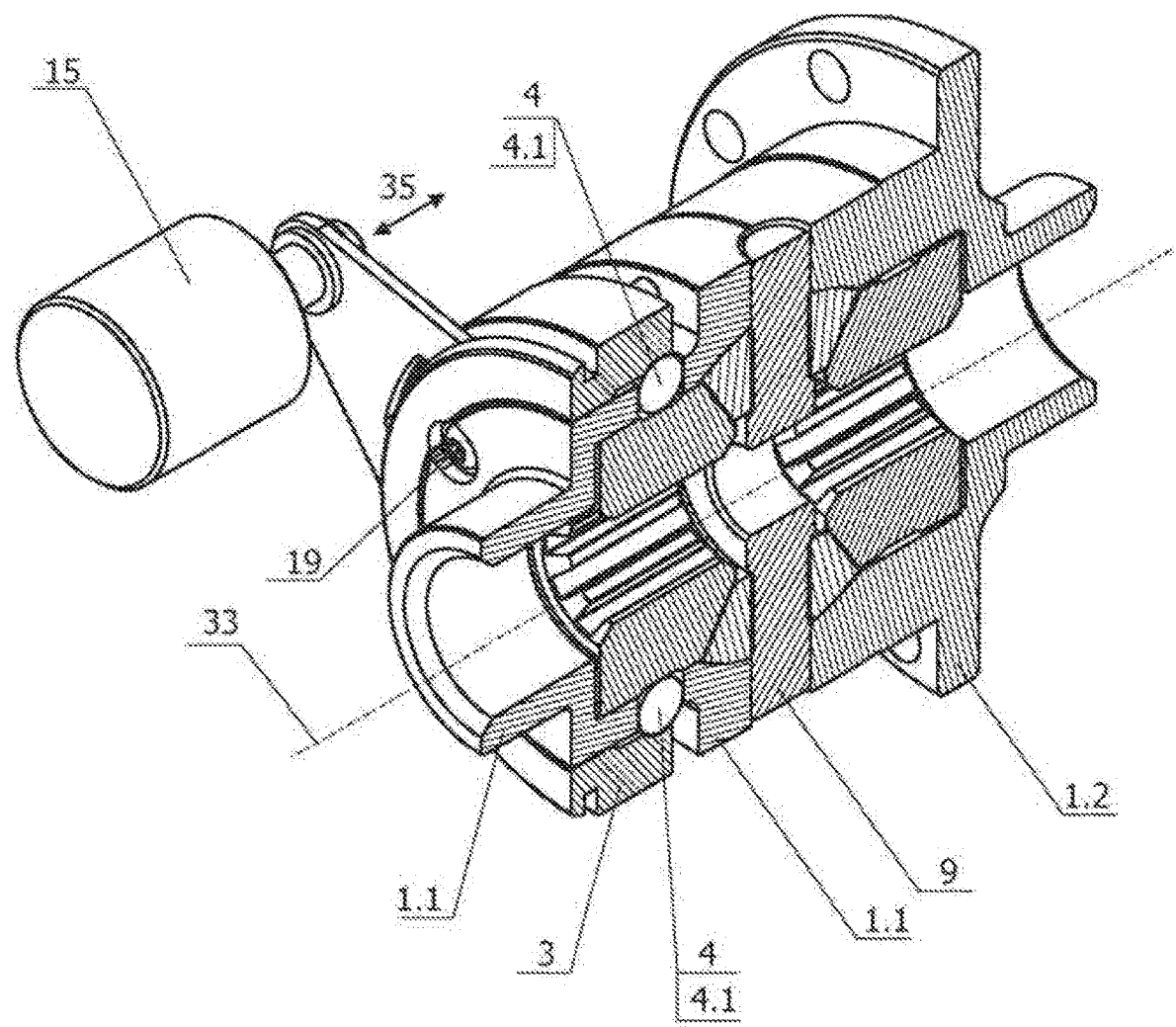

FIG. 10. Diagram of differential in a longitudinal section in unlocked position.

Figure 11:
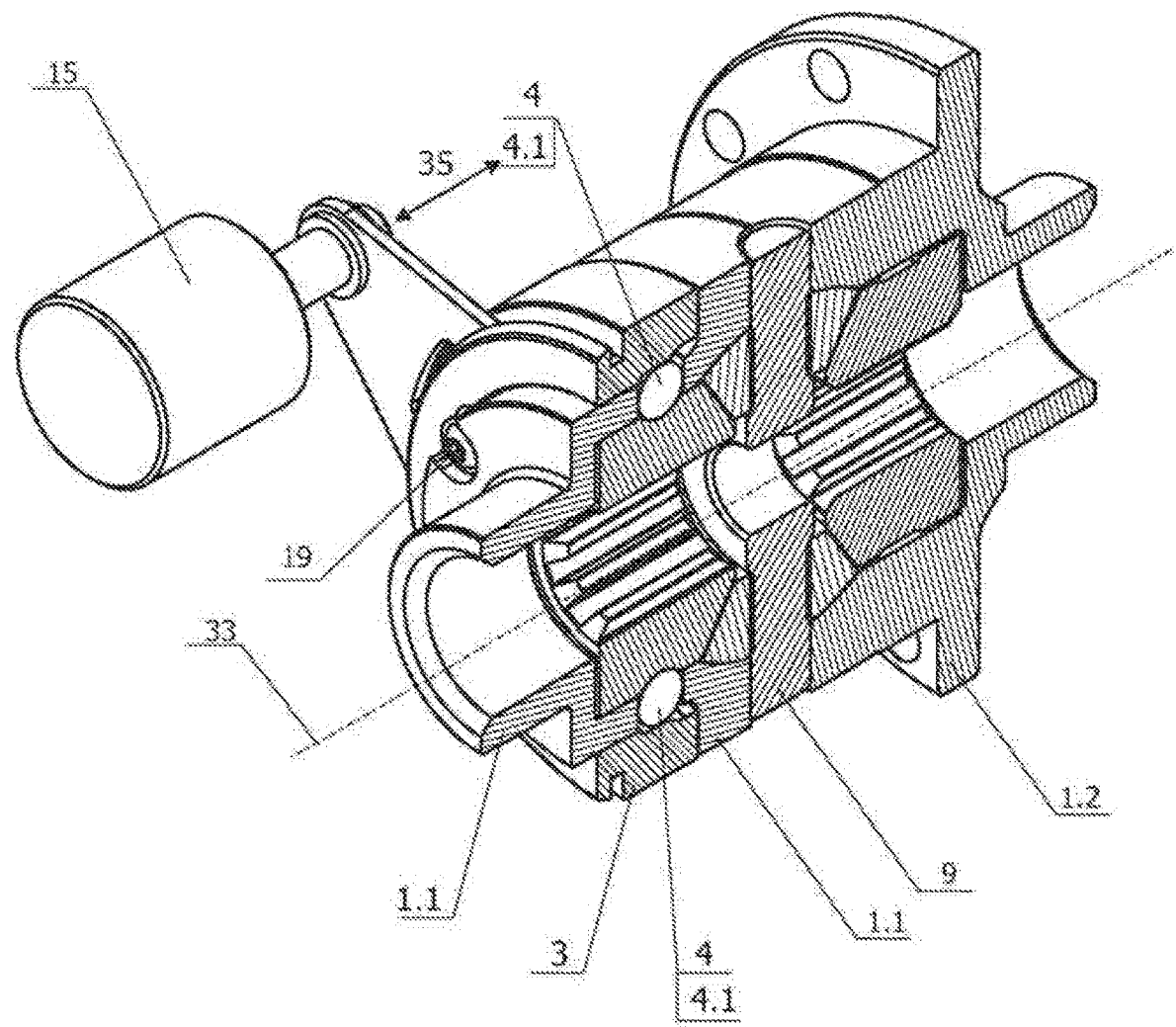

FIG. 11. Diagram of differential in a longitudinal section in locked position.

Figure 12:
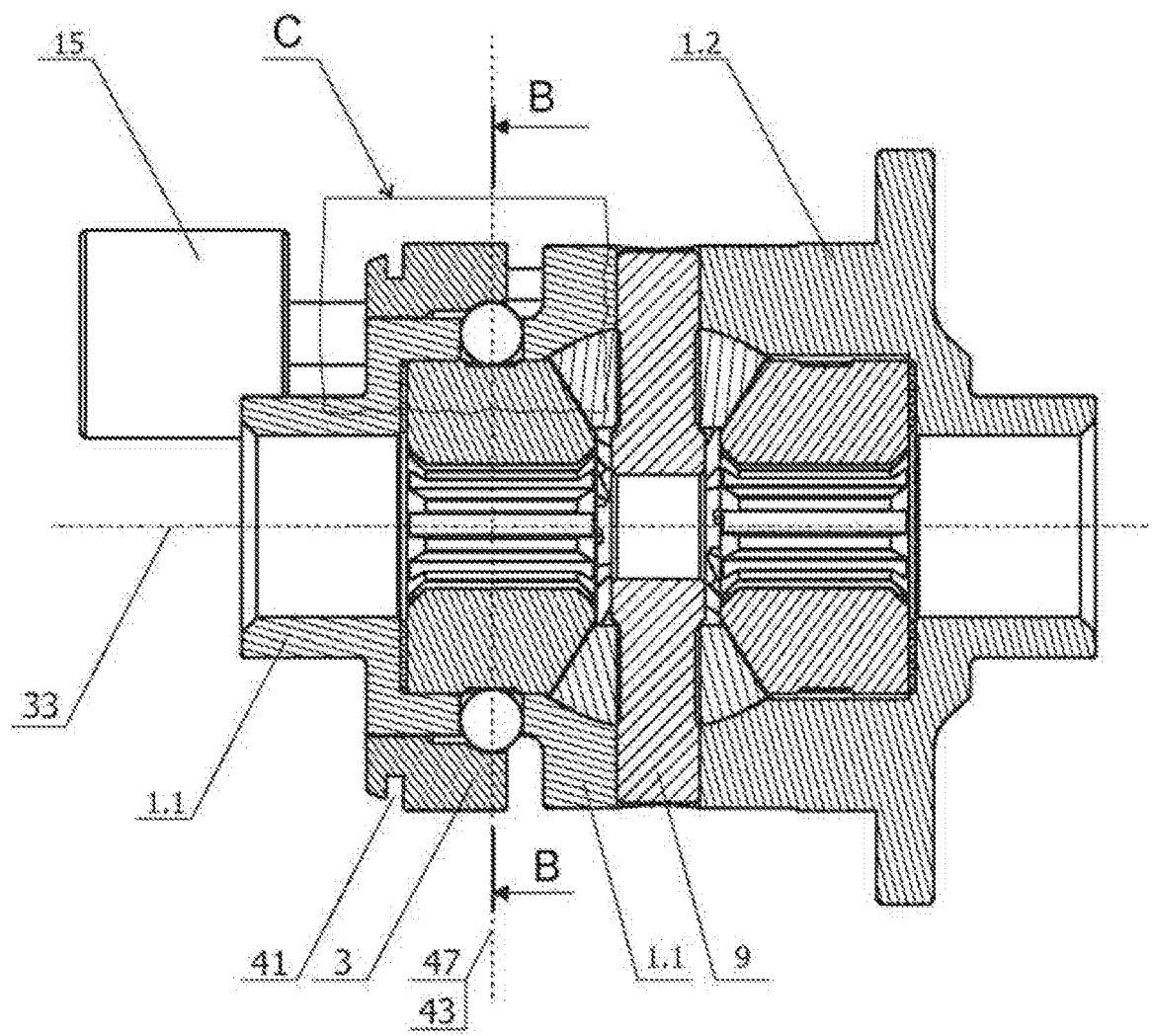

FIG. 12. Longitudinal section in FIG. 10 of the differential in unlocked position.

Figure 13:
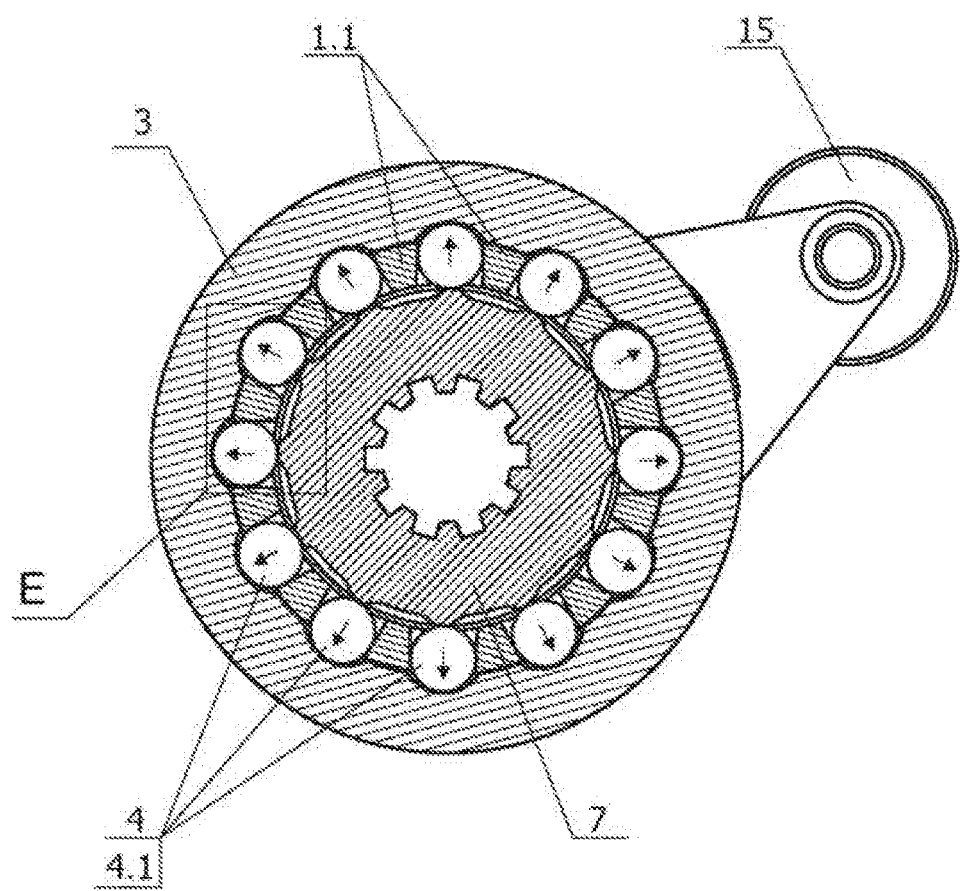

FIG. 13. Cross section along B-B axis in FIG. 12.

Figure 14:
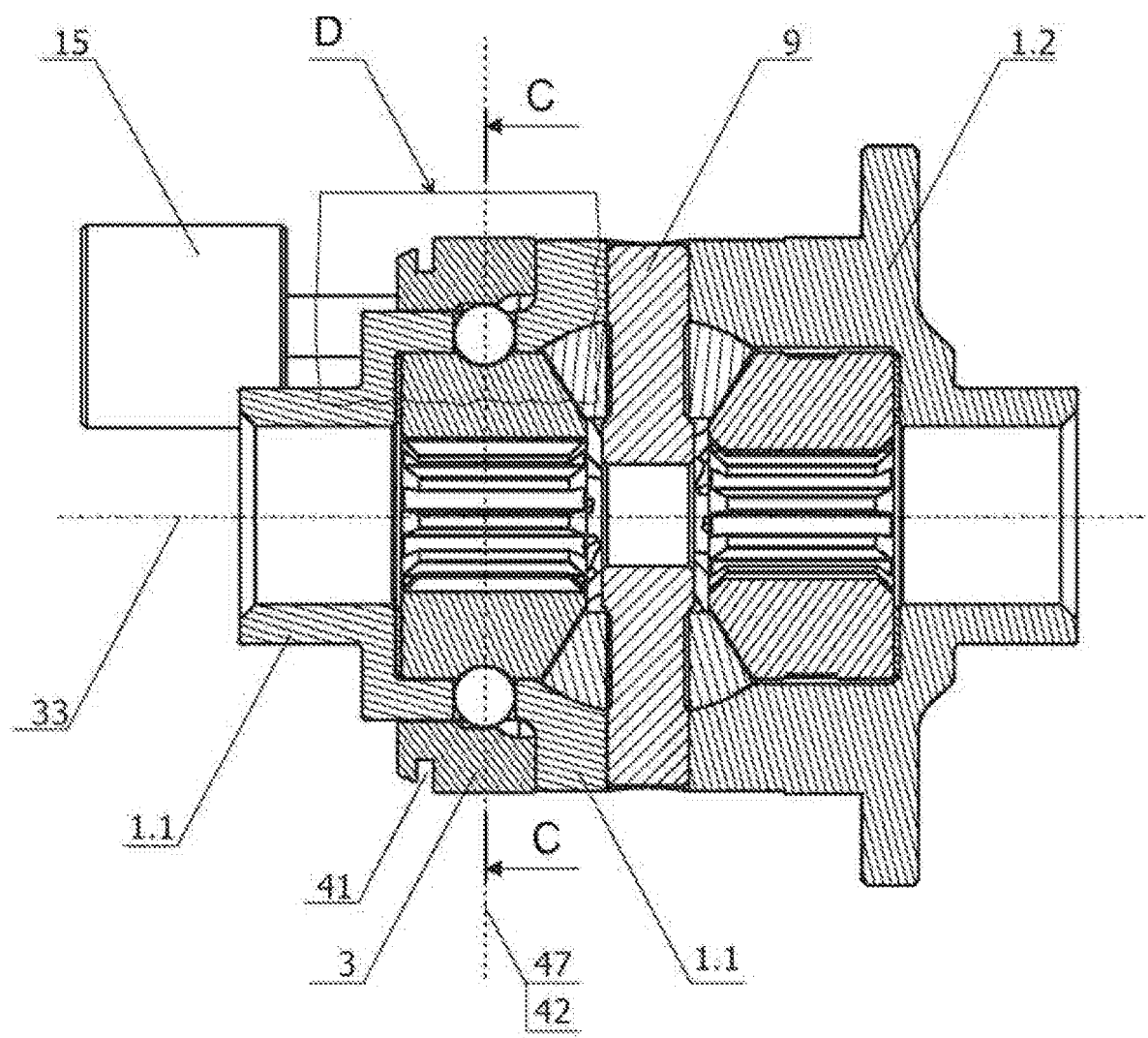

FIG. 14. Longitudinal section in FIG. 11 of the differential in locked position.

Figure 15:
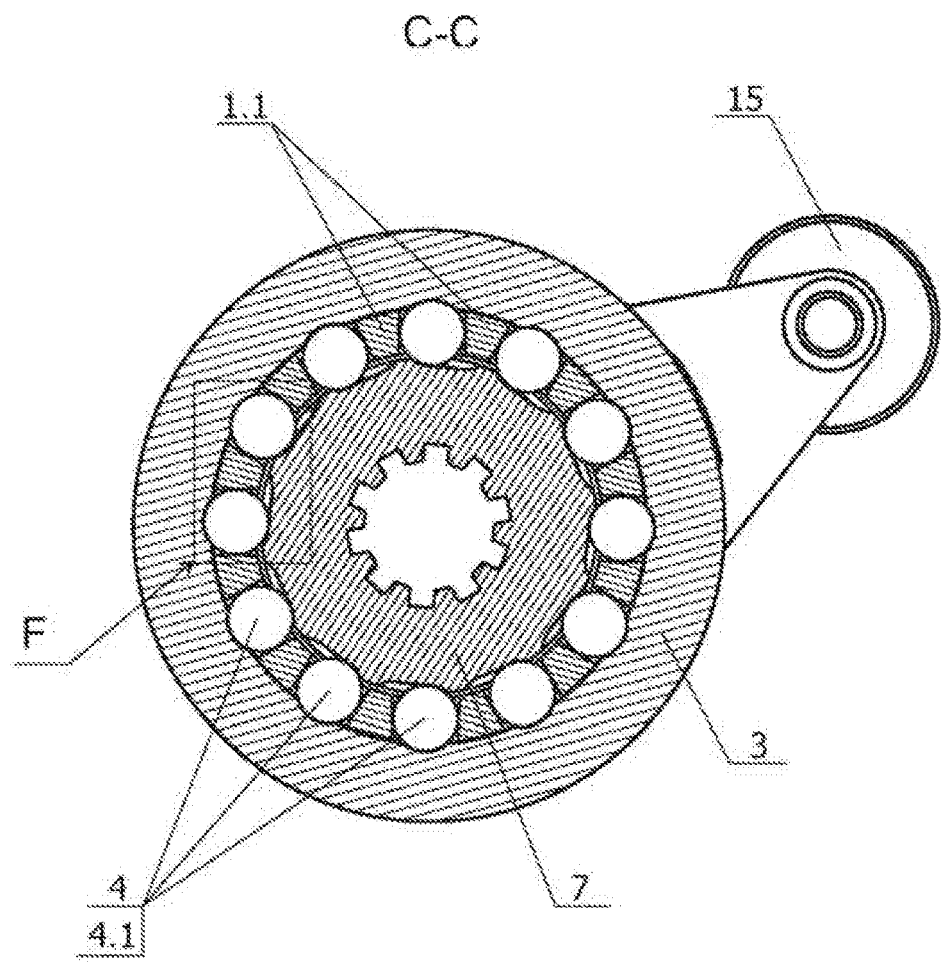

FIG. 15. Cross section along B-B in FIG. 14.

Figure 16:
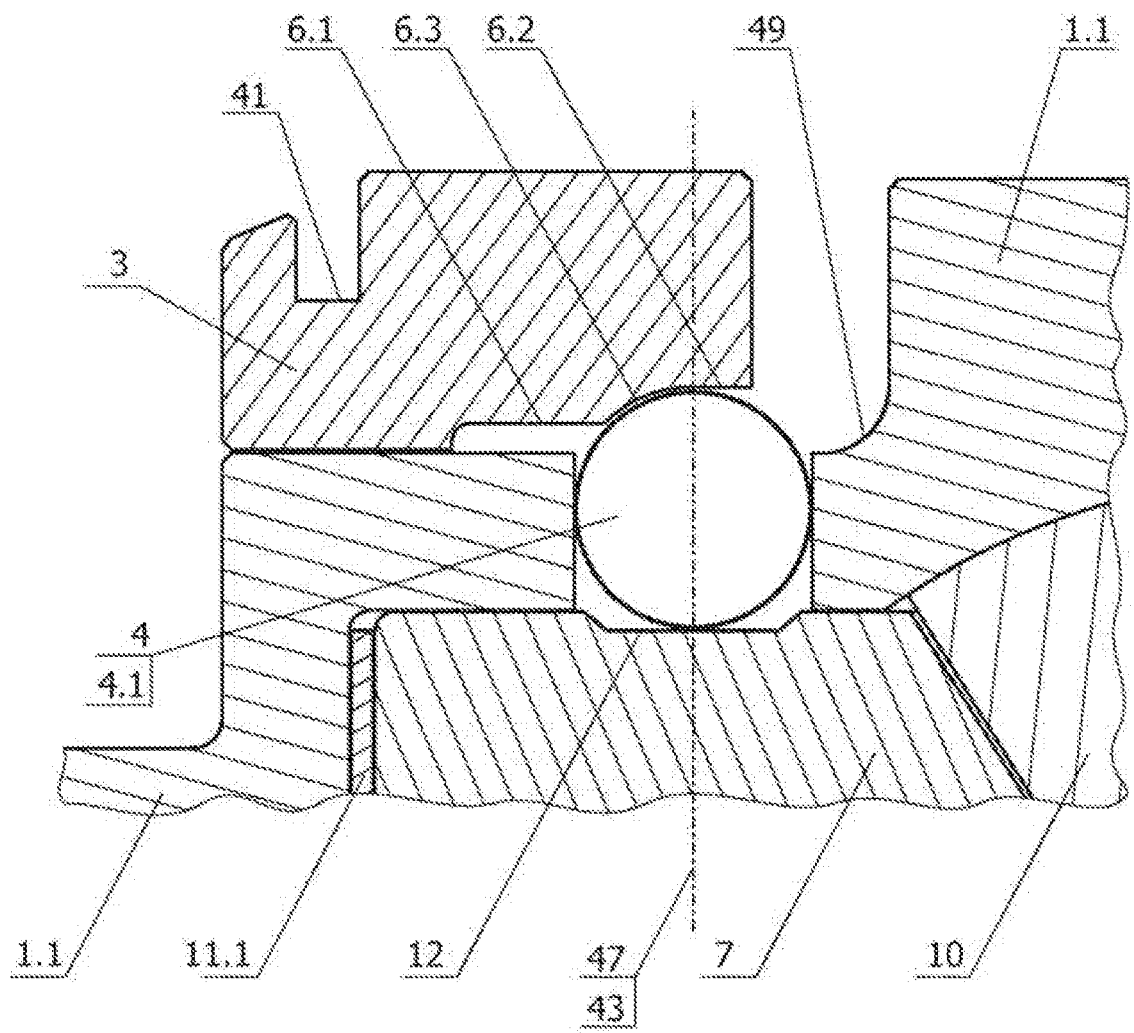

FIG. 16. View C in FIG. 12—Diagram of Locking Element 4 arrangement in the unlocked differential position.

Figure 17:
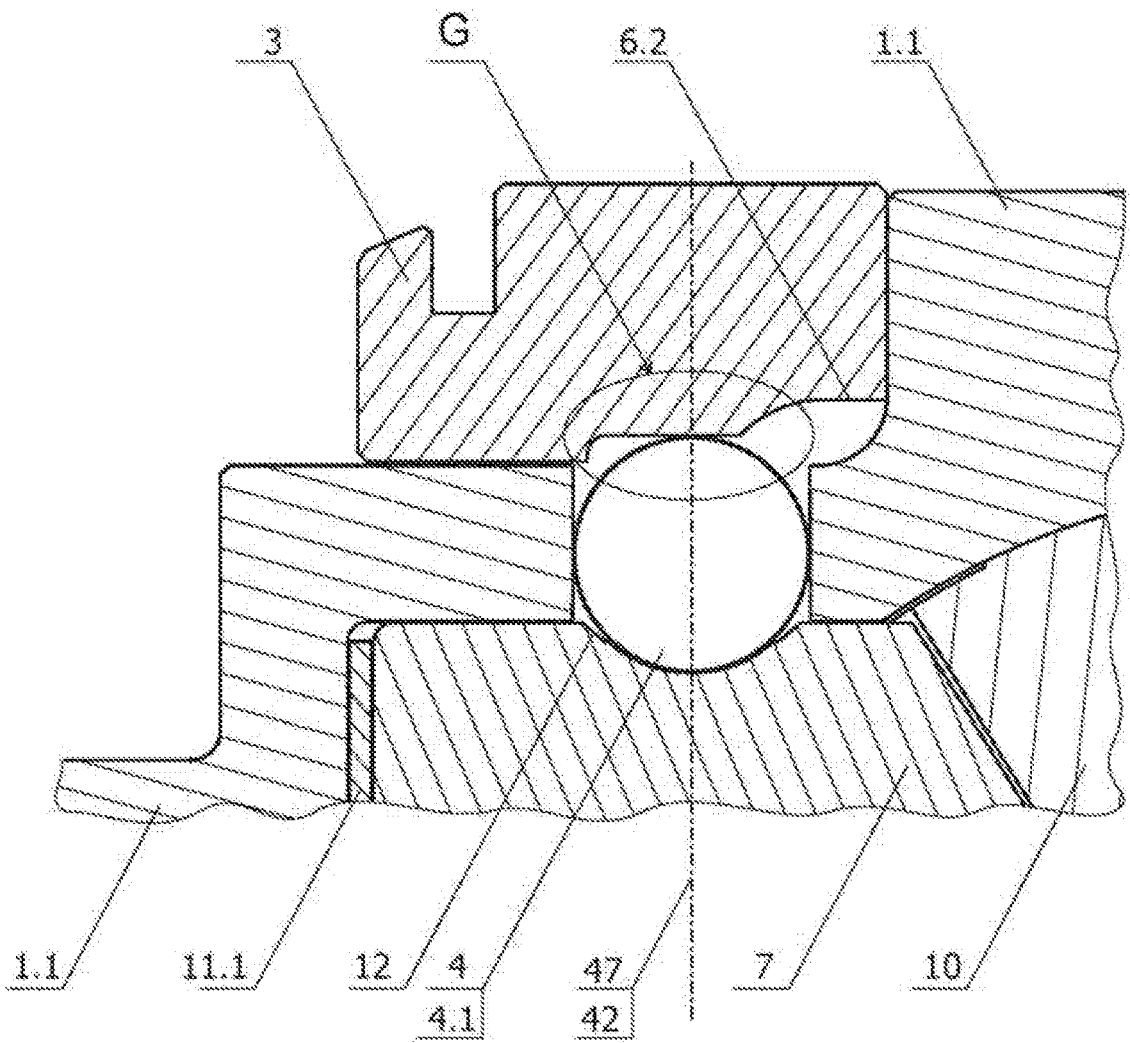

FIG. 17. View D in FIG. 14—Diagram of Locking Element 4 arrangement in the locked differential position.

Figure 18:
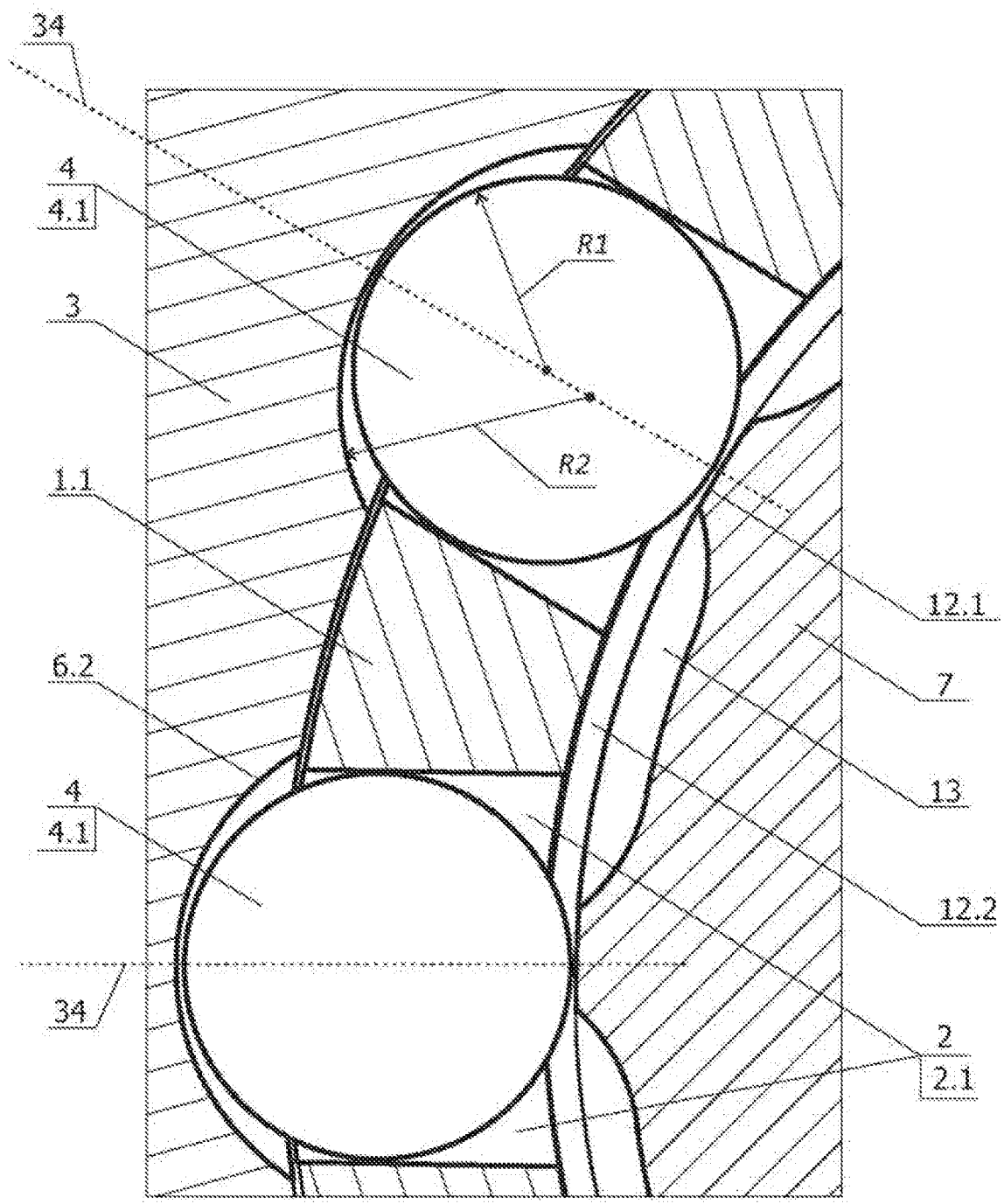

FIG. 18. View E (enlarged) in FIG. 13—Diagram of Locking Element 4 arrangement in the unlocked differential position.

Figure 19:
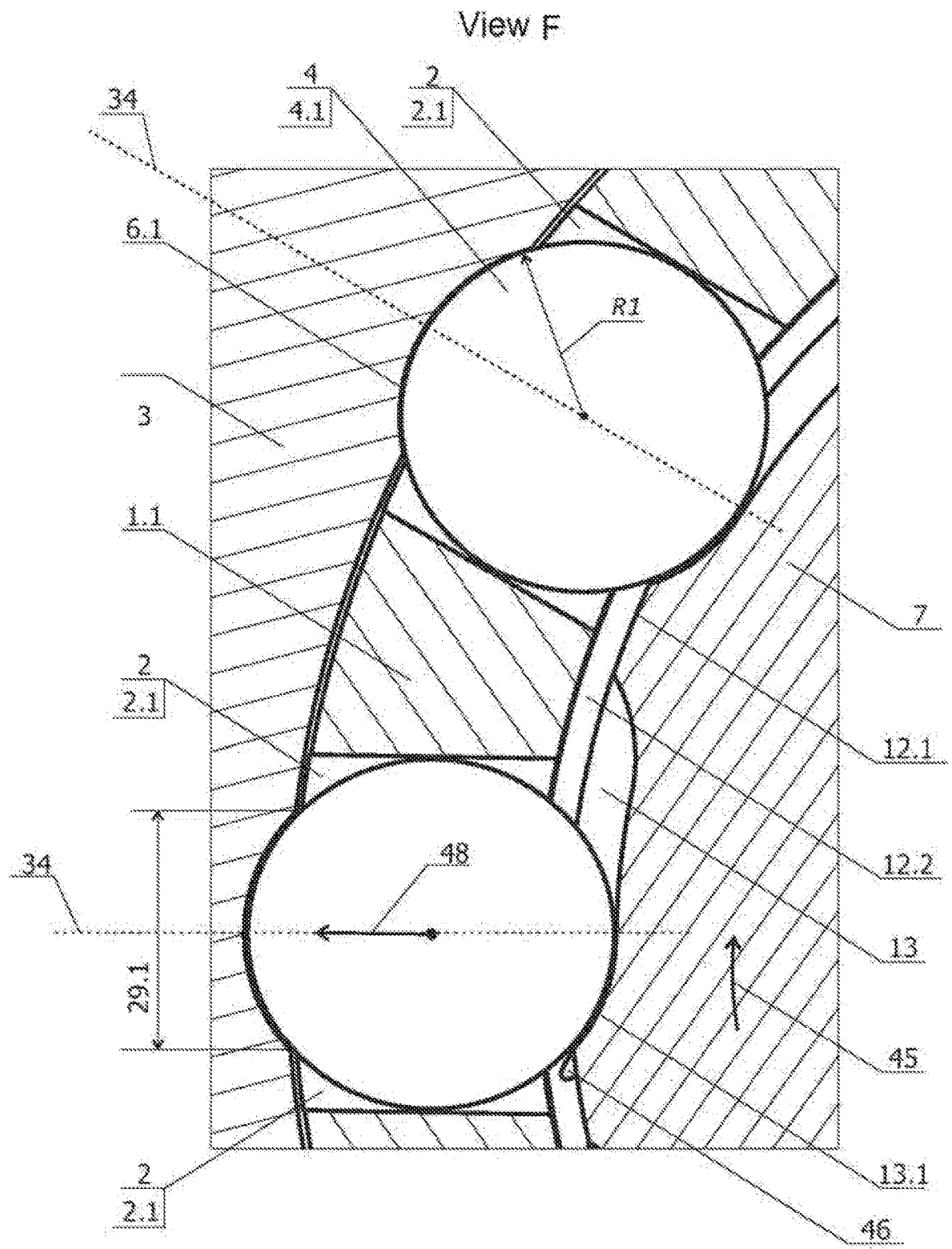

FIG. 19. View F (enlarged) in FIG. 15—Diagram of Locking Element 4 arrangement in the locked differential position.

Figure 20:
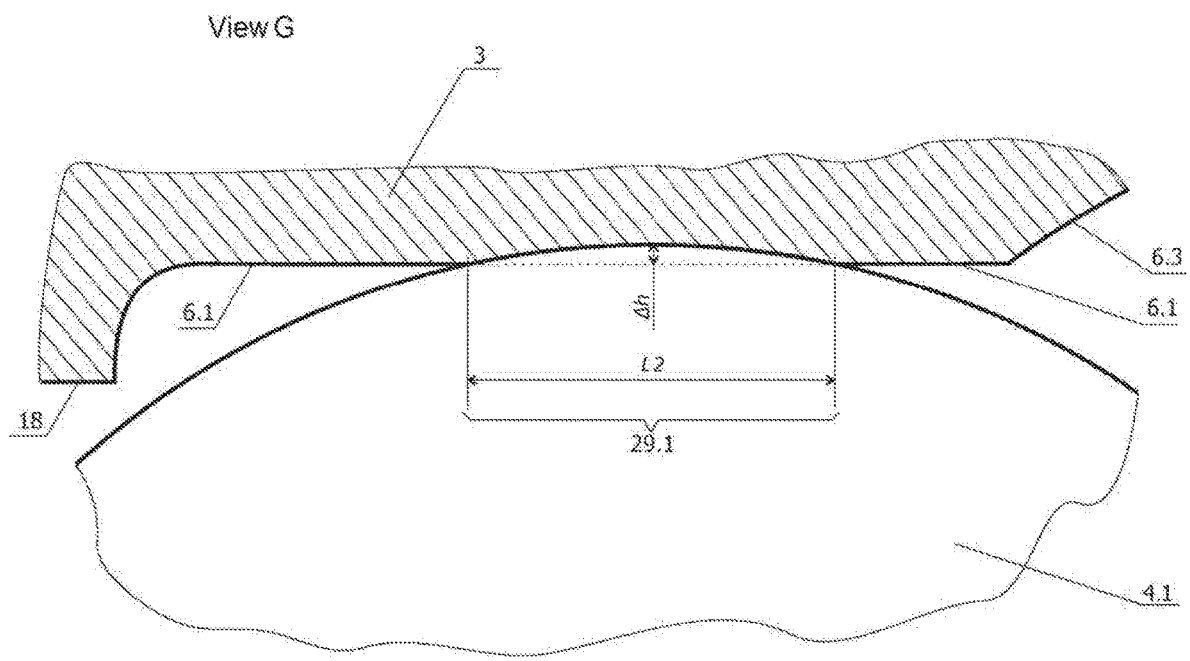

FIG. 20. View G (enlarged) in FIG. 17.

Figure 21:
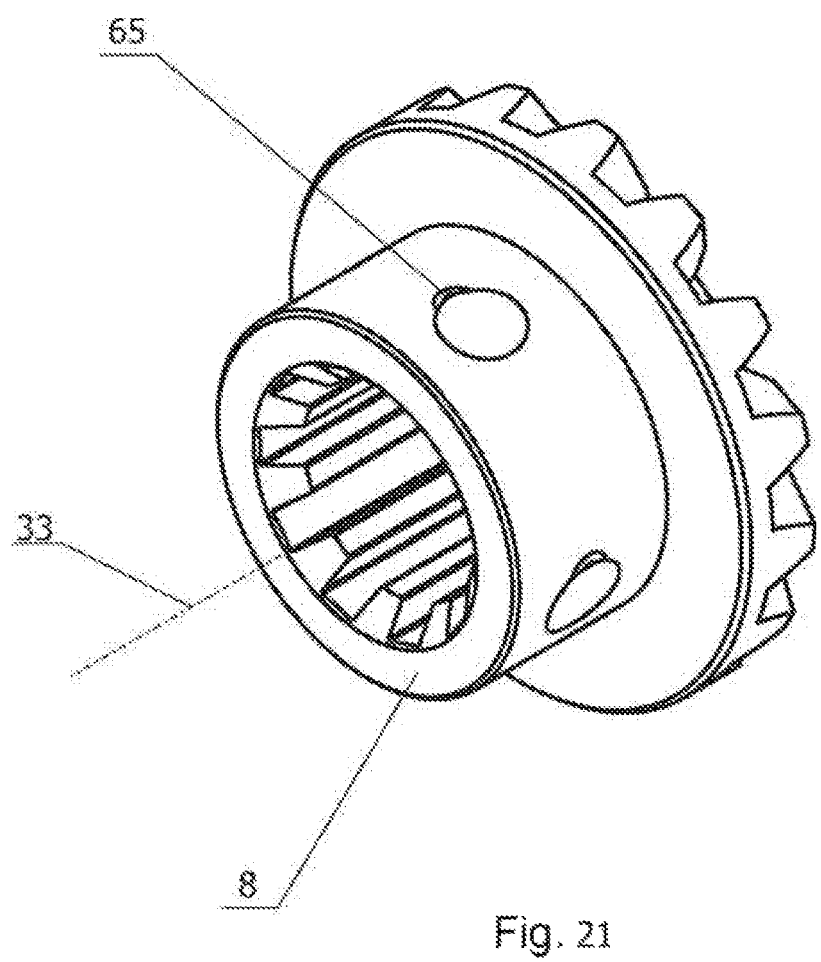

FIG. 21. Scheme of deformation of Area 65 of the prototype differential gear.

Figure 22:
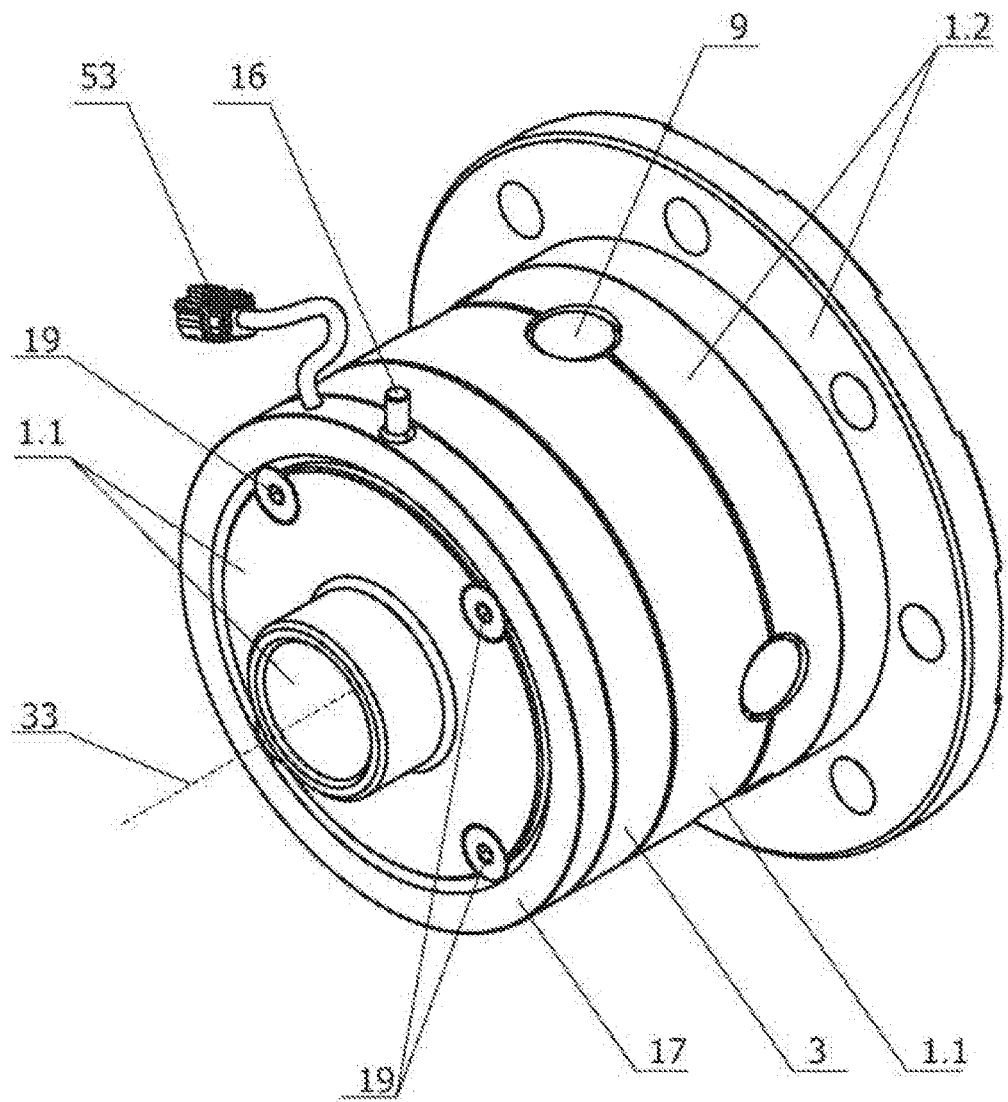

FIG. 22. Differential according to Option 2. General view.

Figure 23:
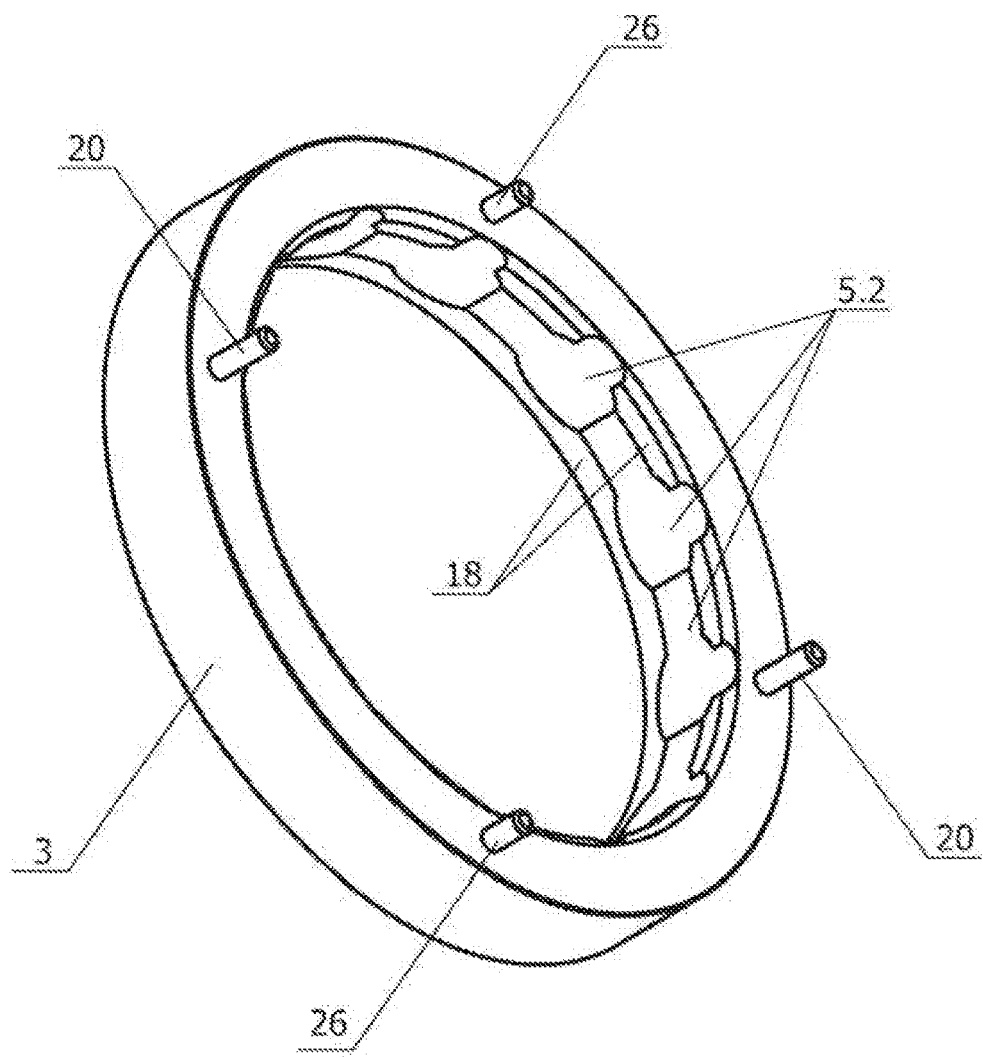

FIG. 23. Lock-up Clutch 3, general view according to Option 2, example 1.

Figure 24:
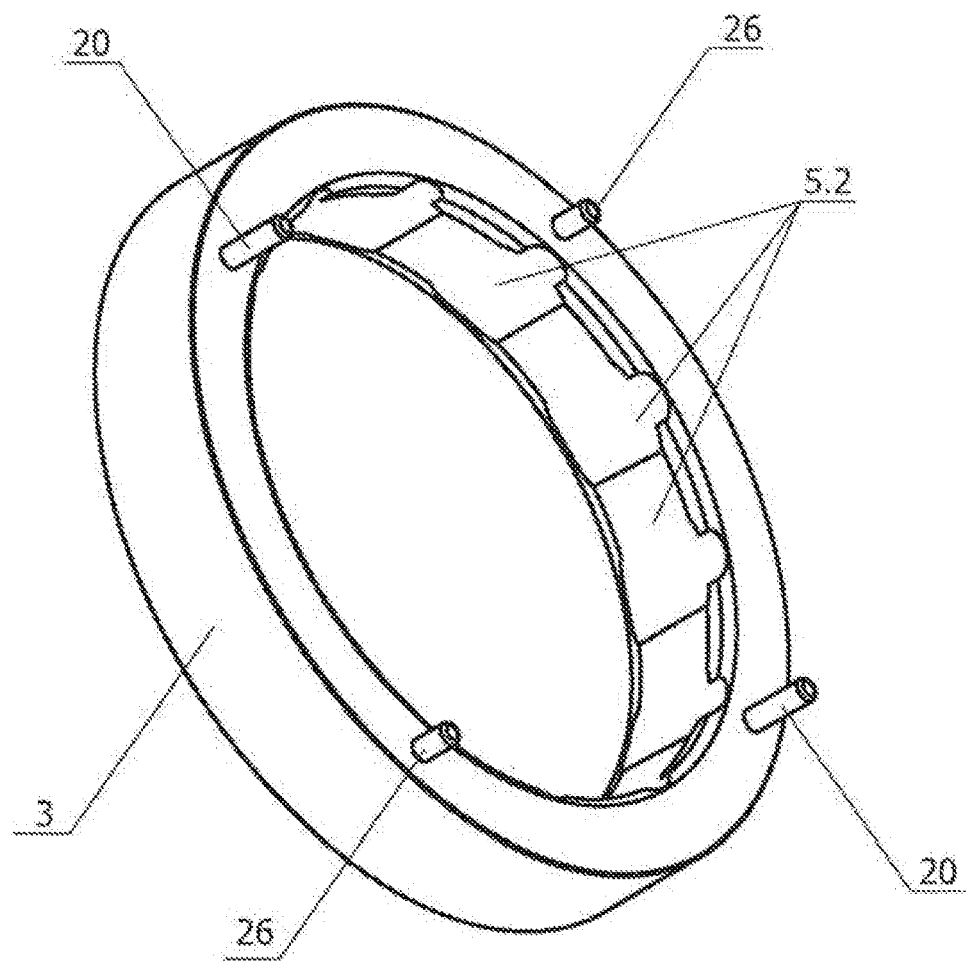

FIG. 24. Lock-up Clutch 3, general view according to Option 2, example 3.

Figure 25:
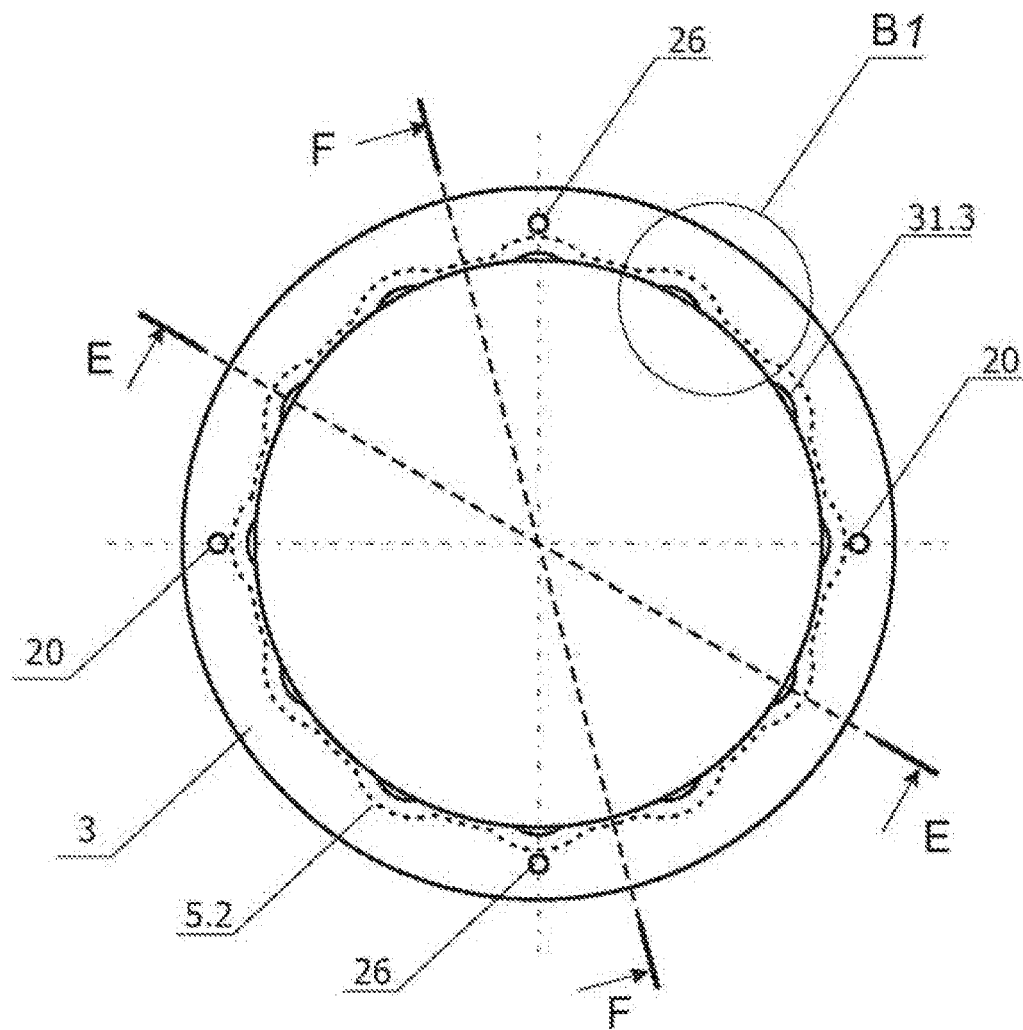

FIG. 25. Lock-up Clutch 3, view from Pins 20 and 26.

Figure 26:
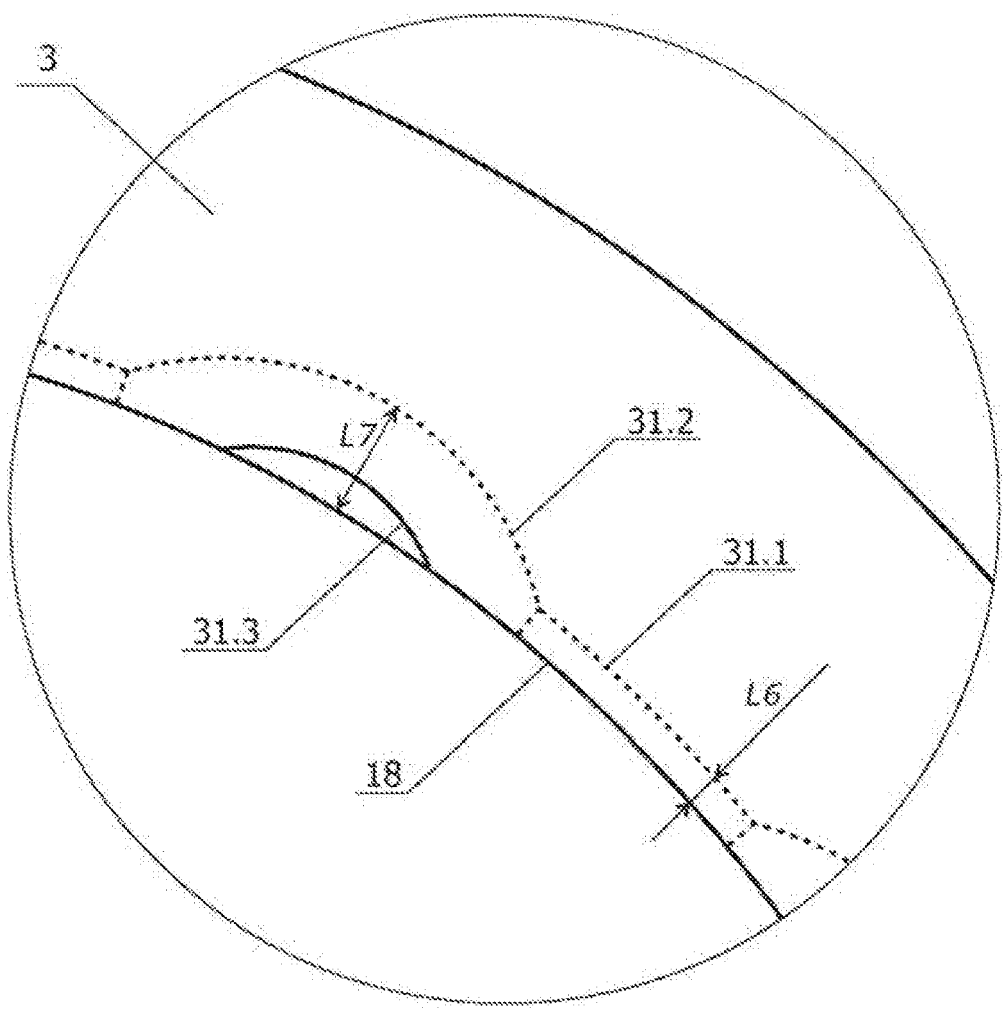

FIG. 26. View B1 in FIG. 25.

Figure 27:
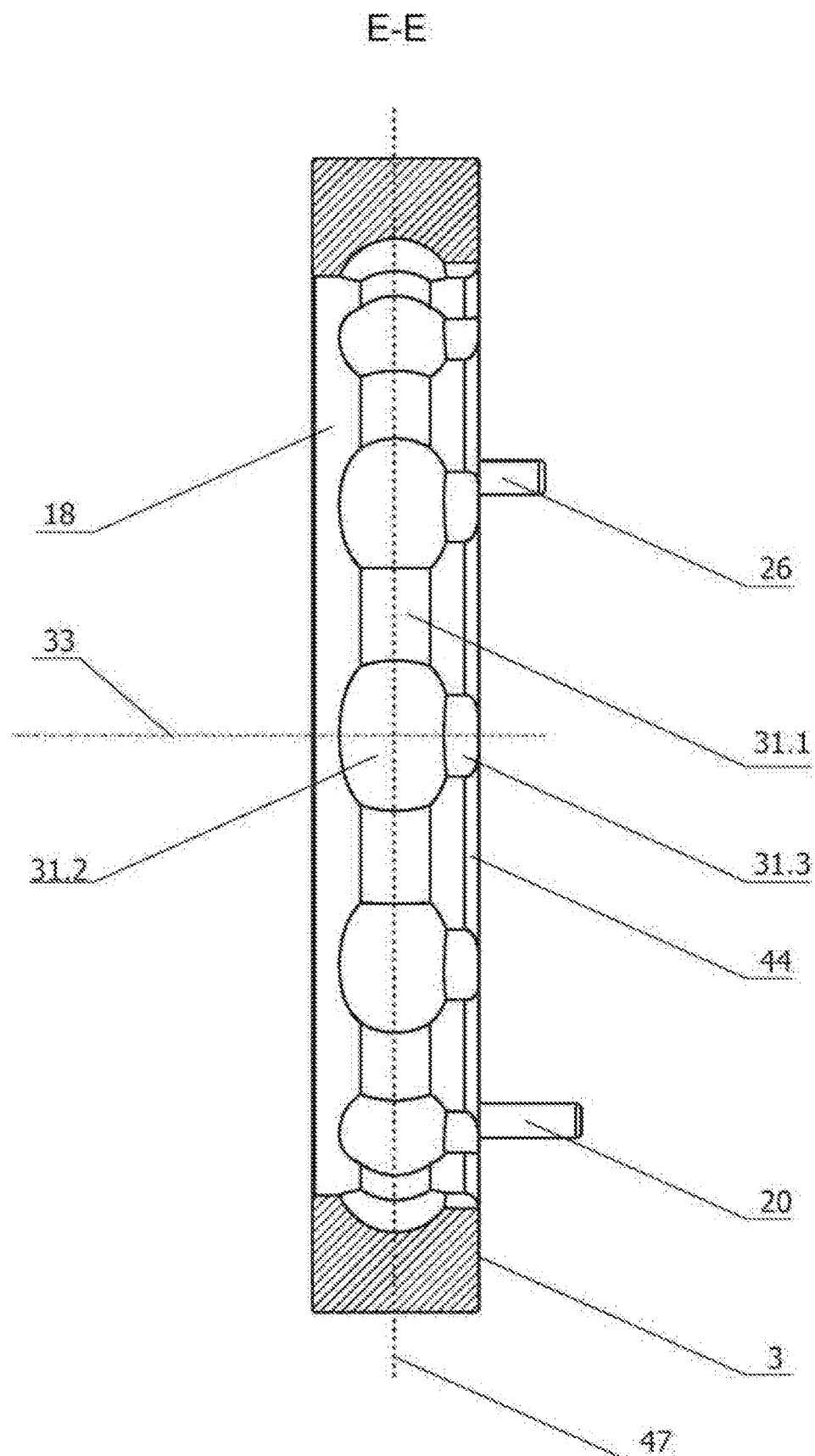

FIG. 27. Section E-E in FIG. 25.

Figure 28:
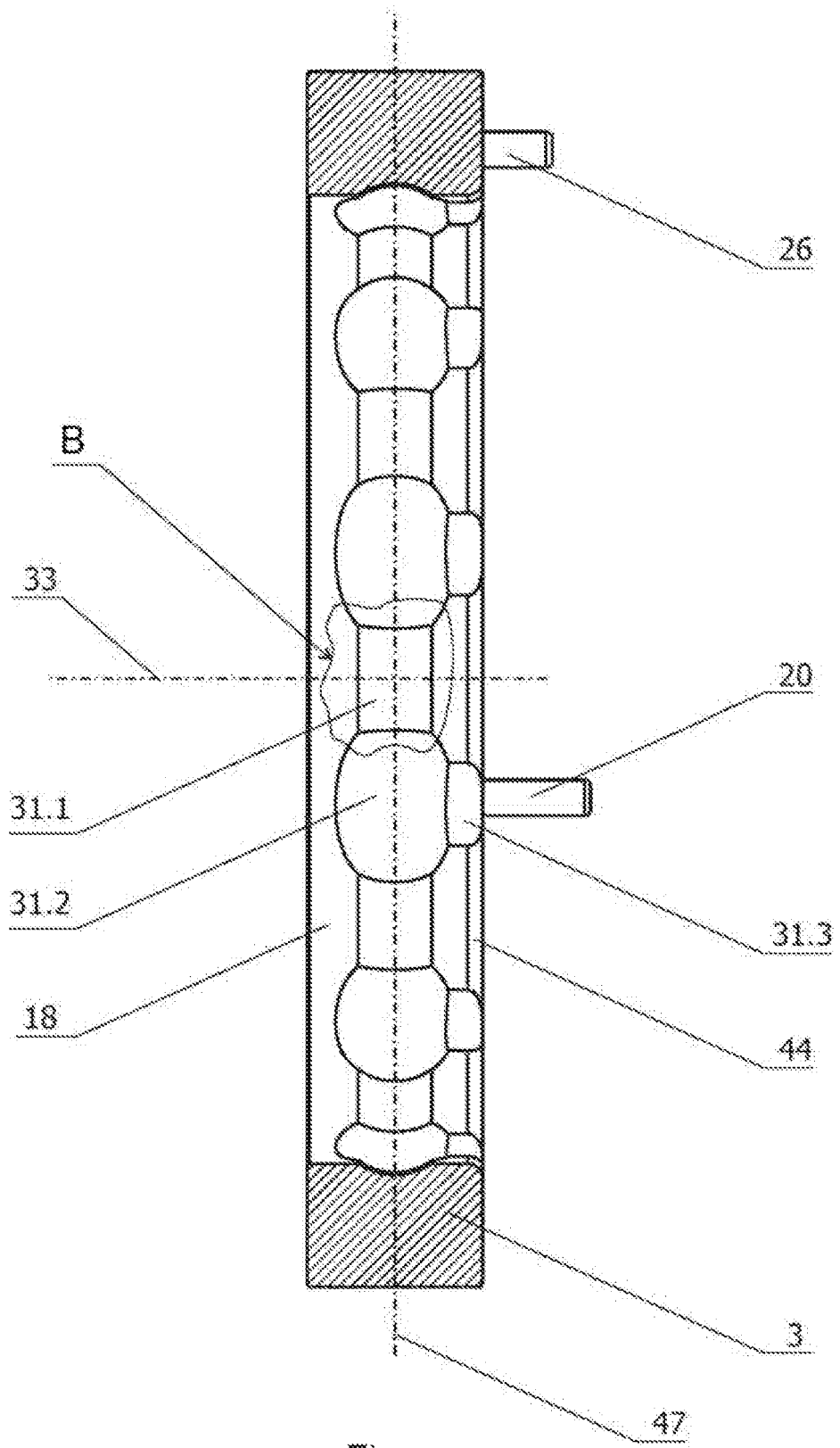

FIG. 28. Section F-F in FIG. 25 for Example 1.

Figure 29:
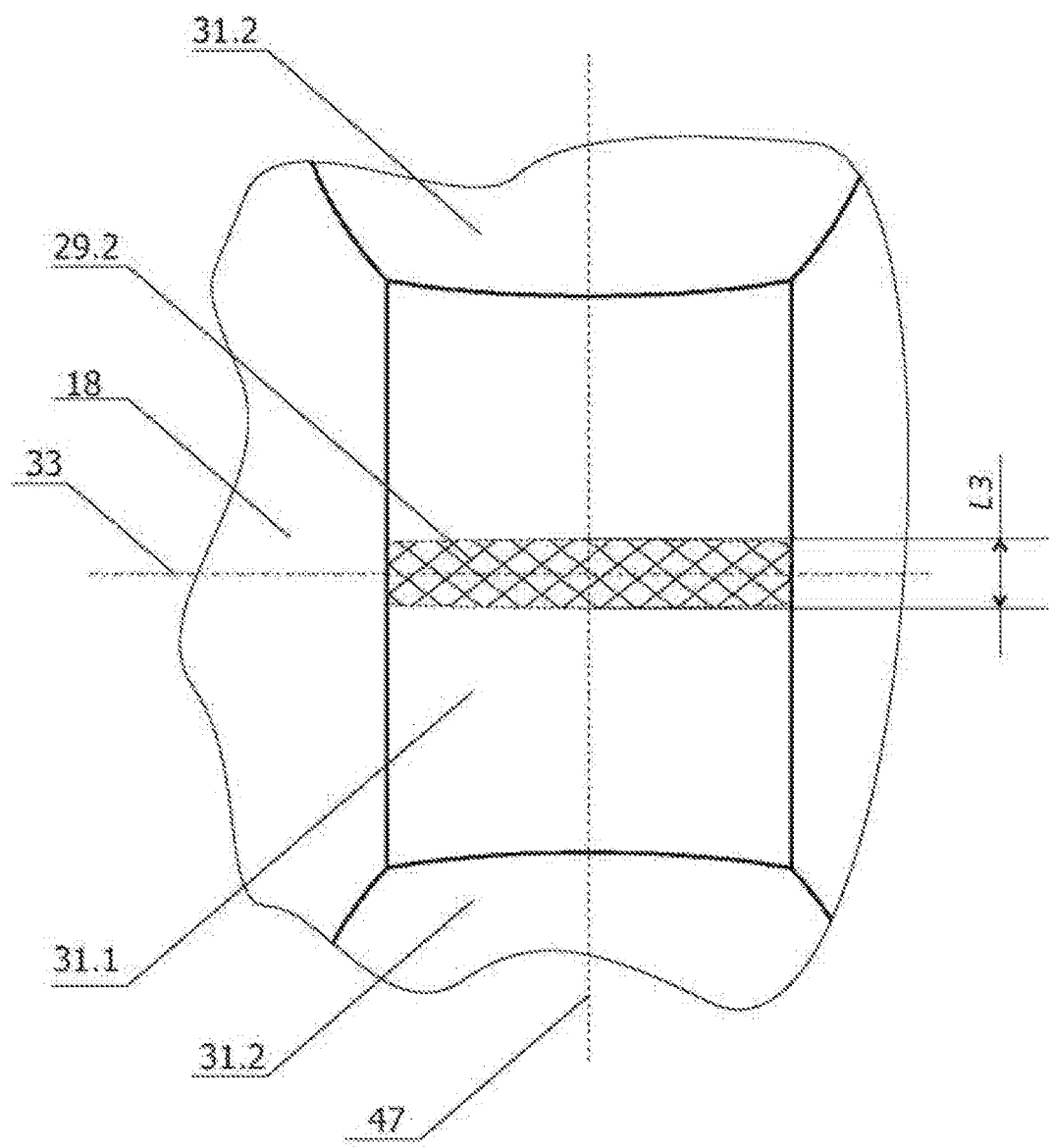

FIG. 29. View B in FIG. 28.

Figure 30:
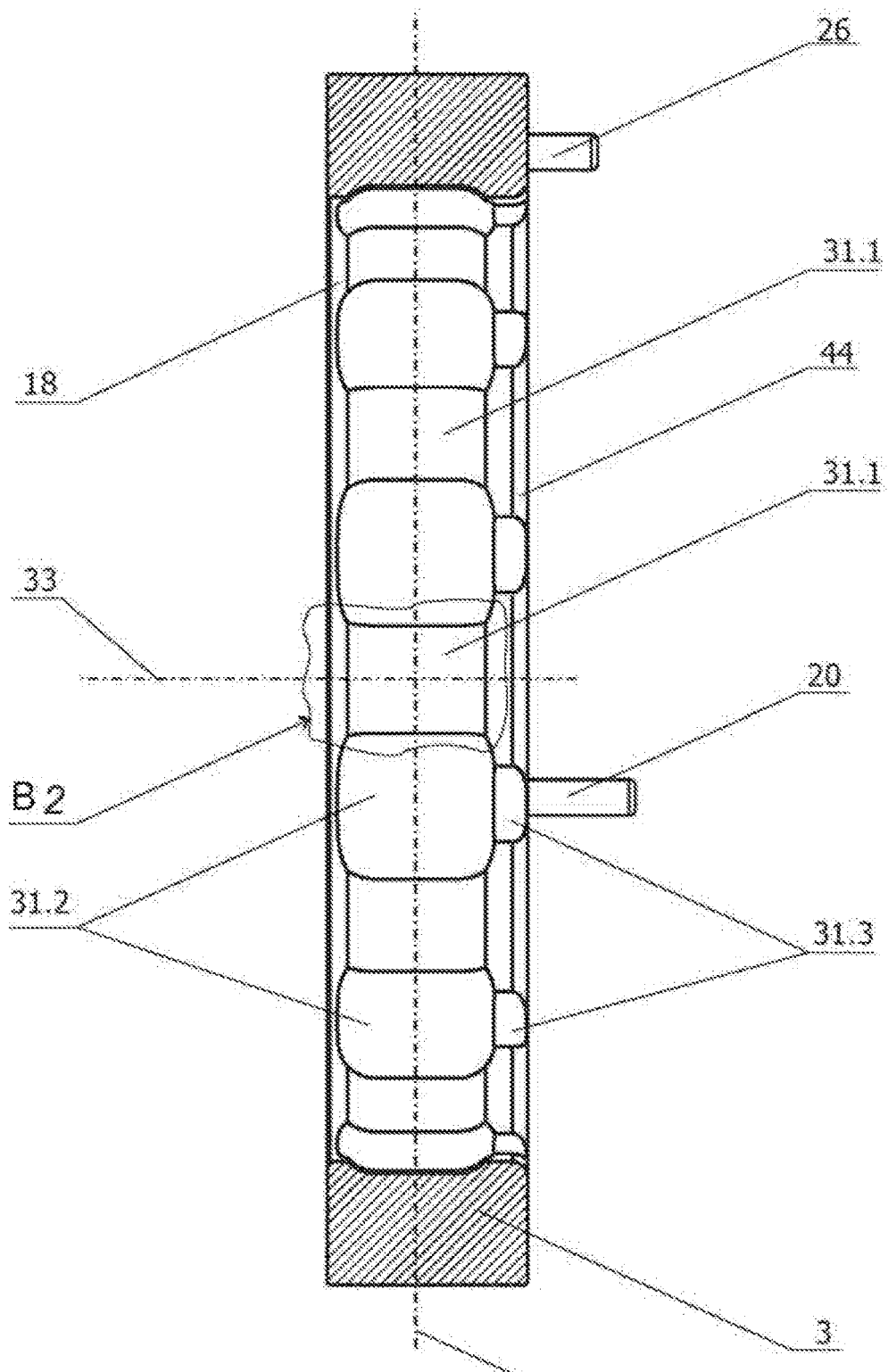

FIG. 30. Section F-F in FIG. 25 for Example 3.

Figure 31:
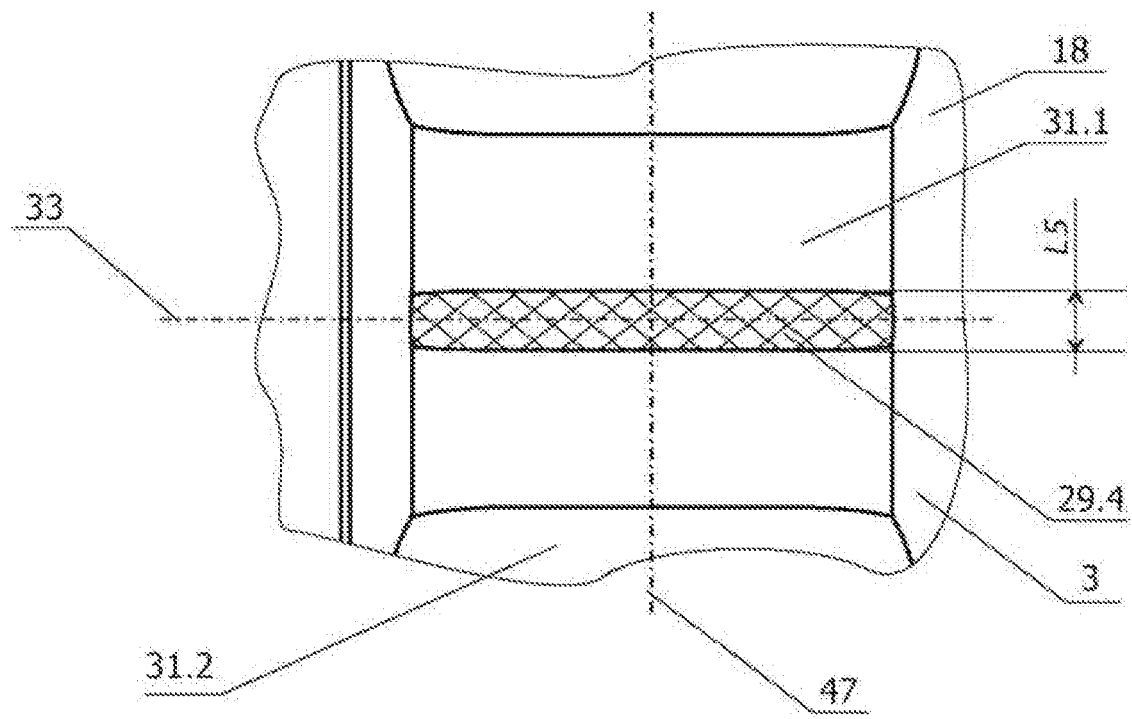

FIG. 31. View B2 in FIG. 30.

Figure 32:
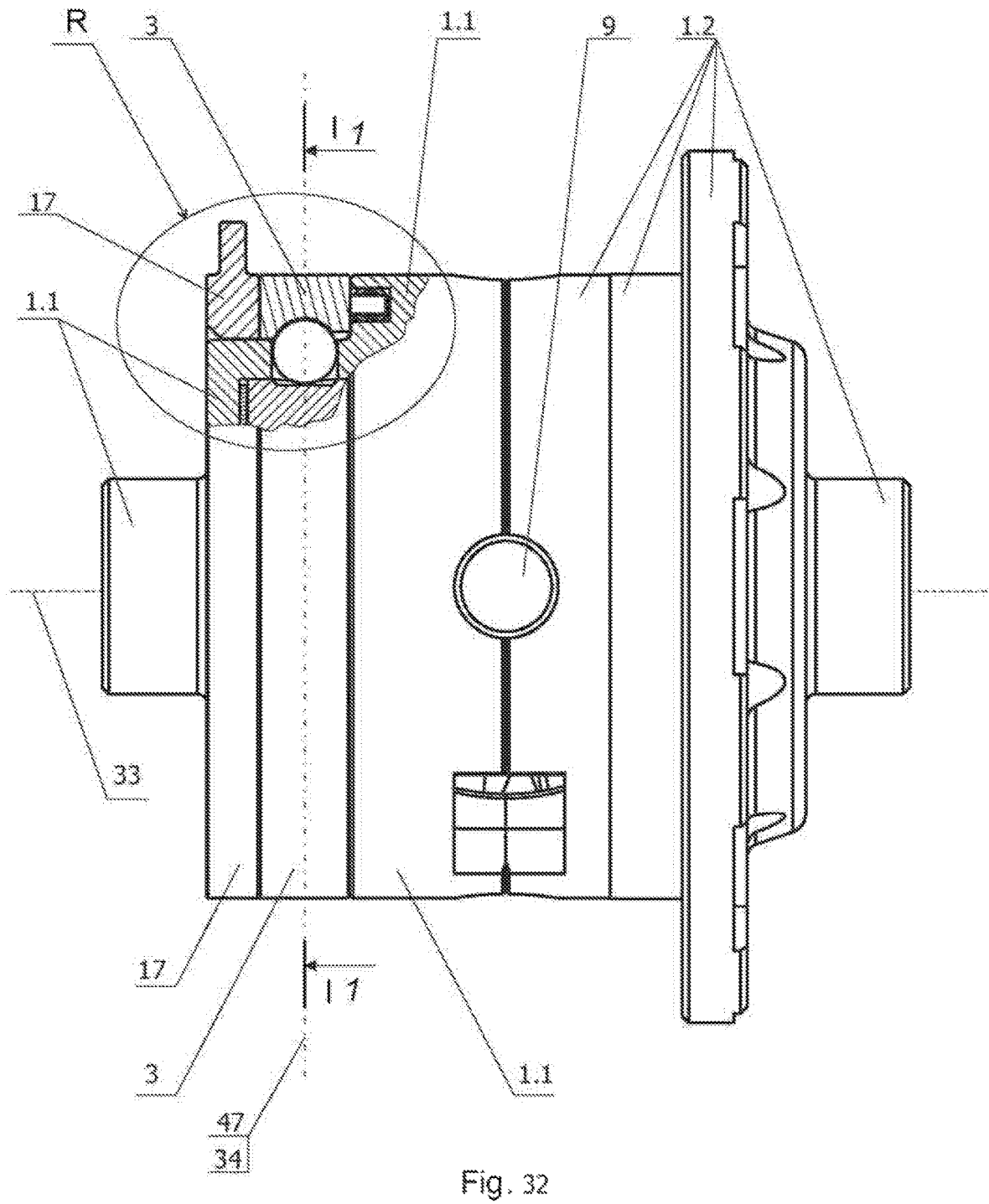

FIG. 32. Differential according to Option 2, Examples 1 and 2 in "Unlocked" position. Side view.

Figure 33:
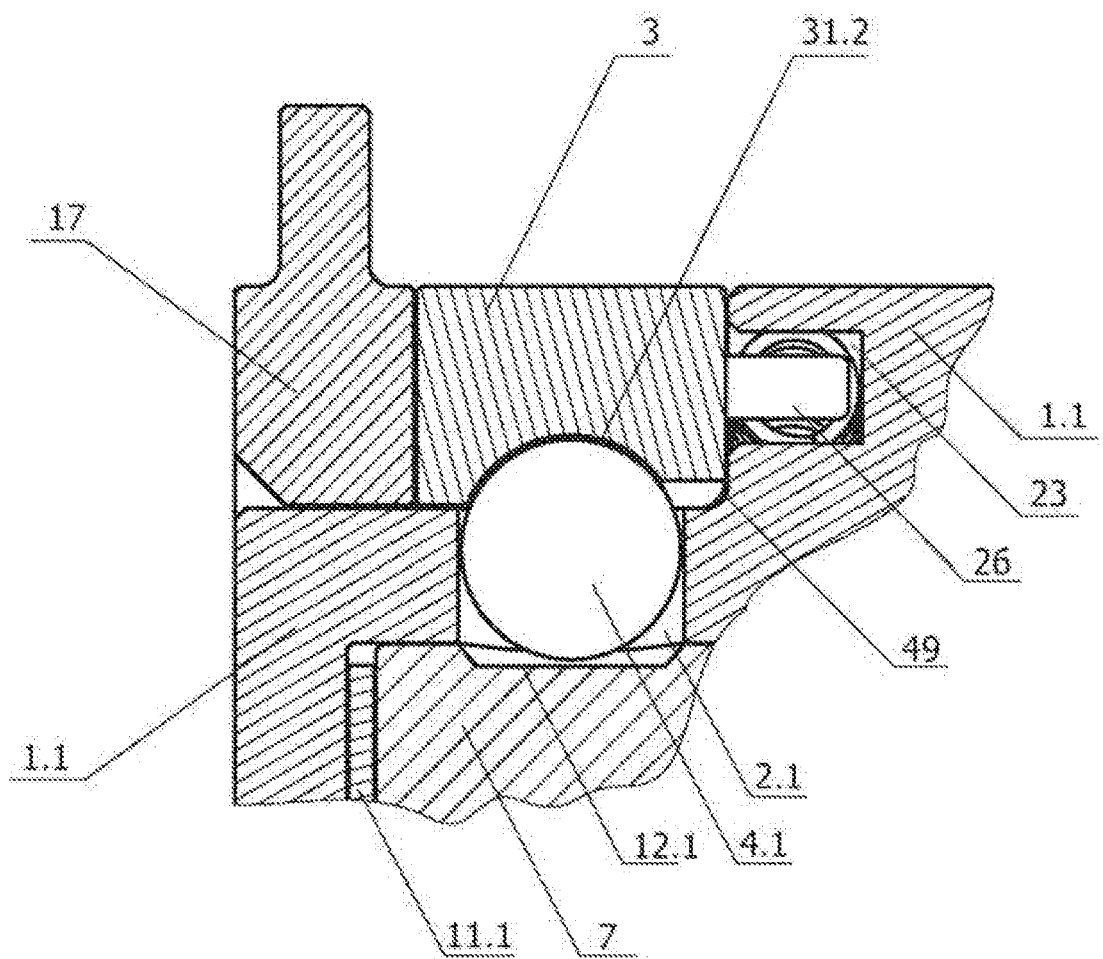

FIG. 33. View R in FIG. 32.

Figure 34:
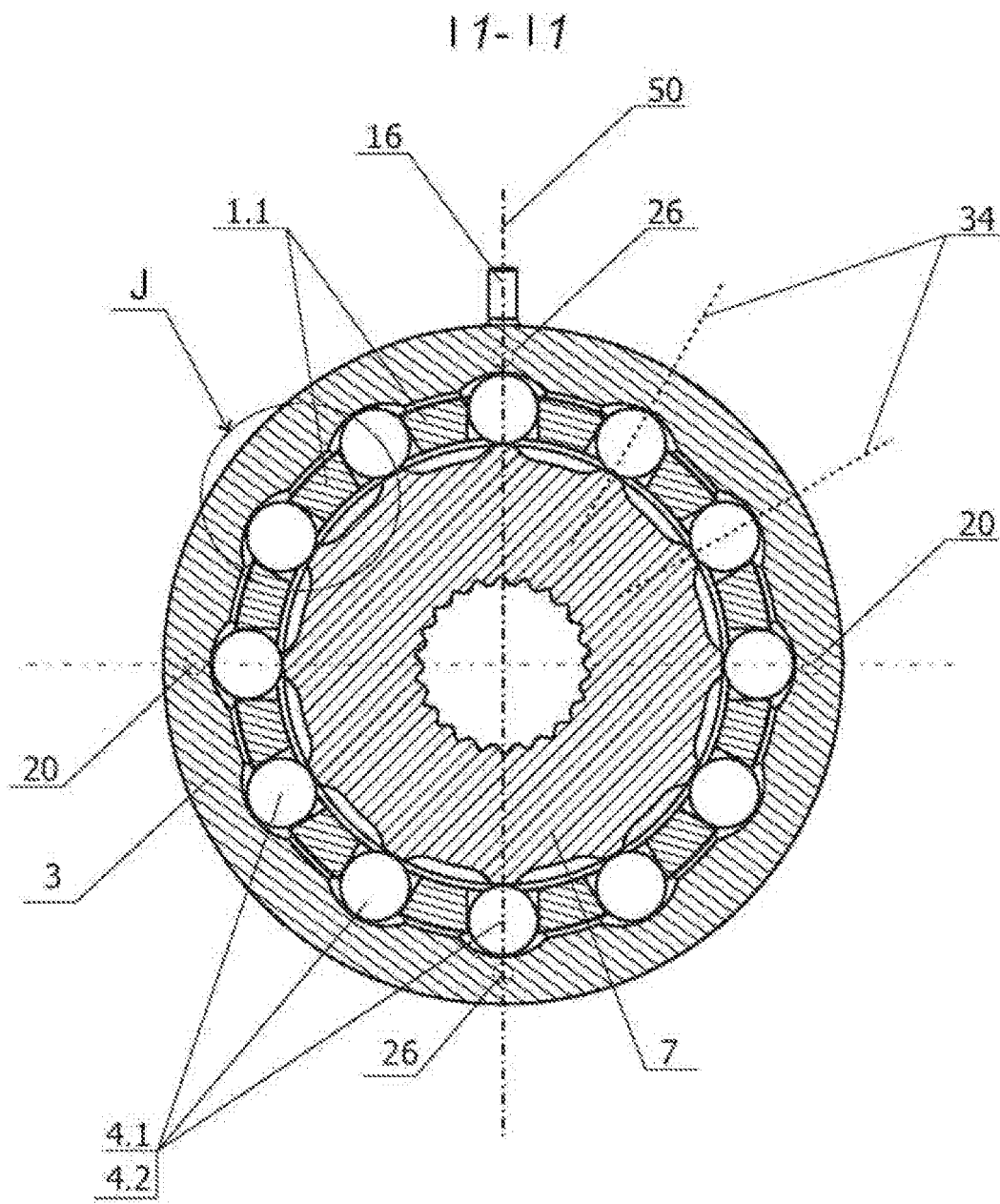

FIG. 34. Section I-I in FIG. 32 for Example 1, Option 2.

Figure 35:
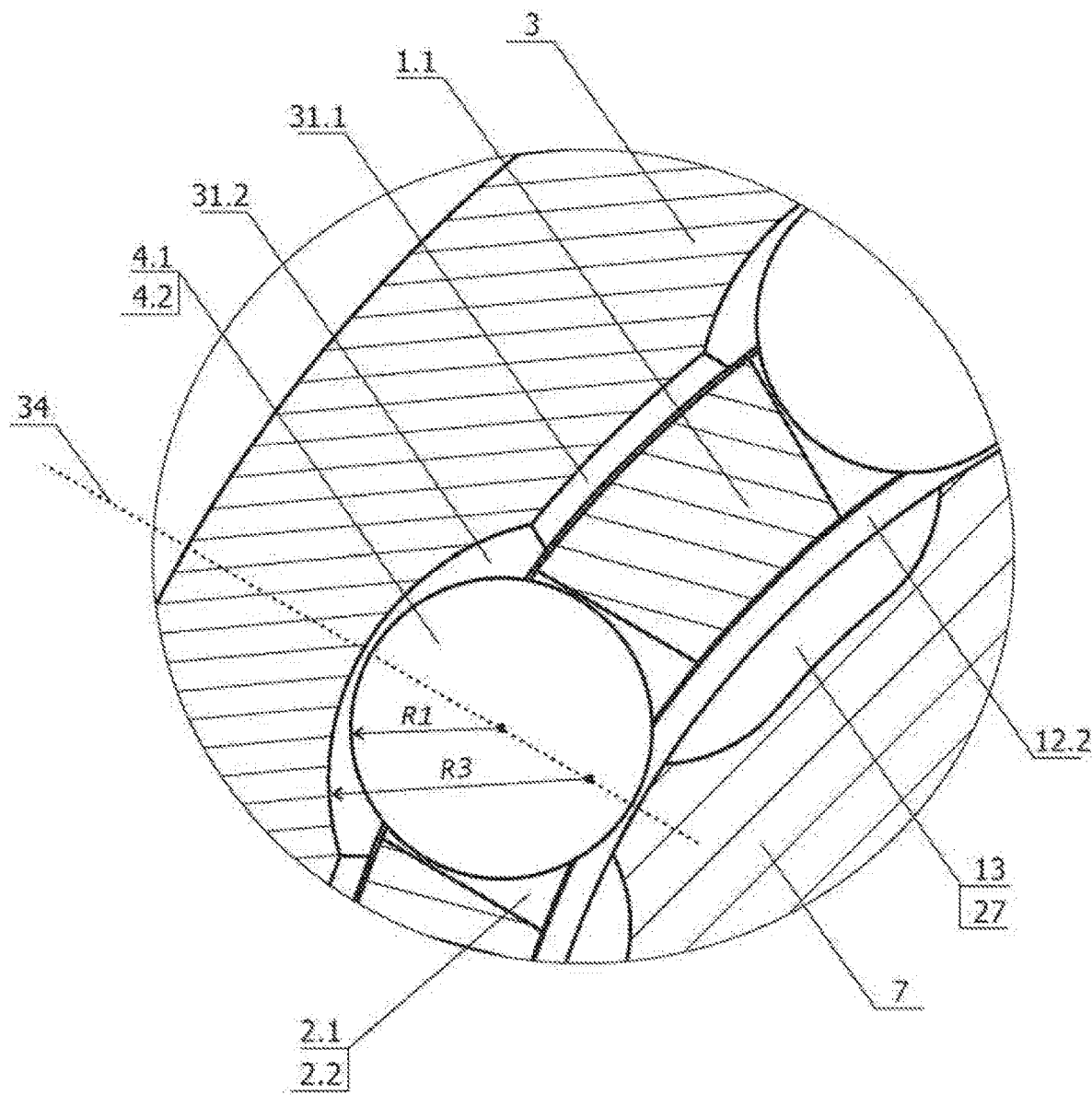

FIG. 35. View J in FIG. 34.

Figure 36:
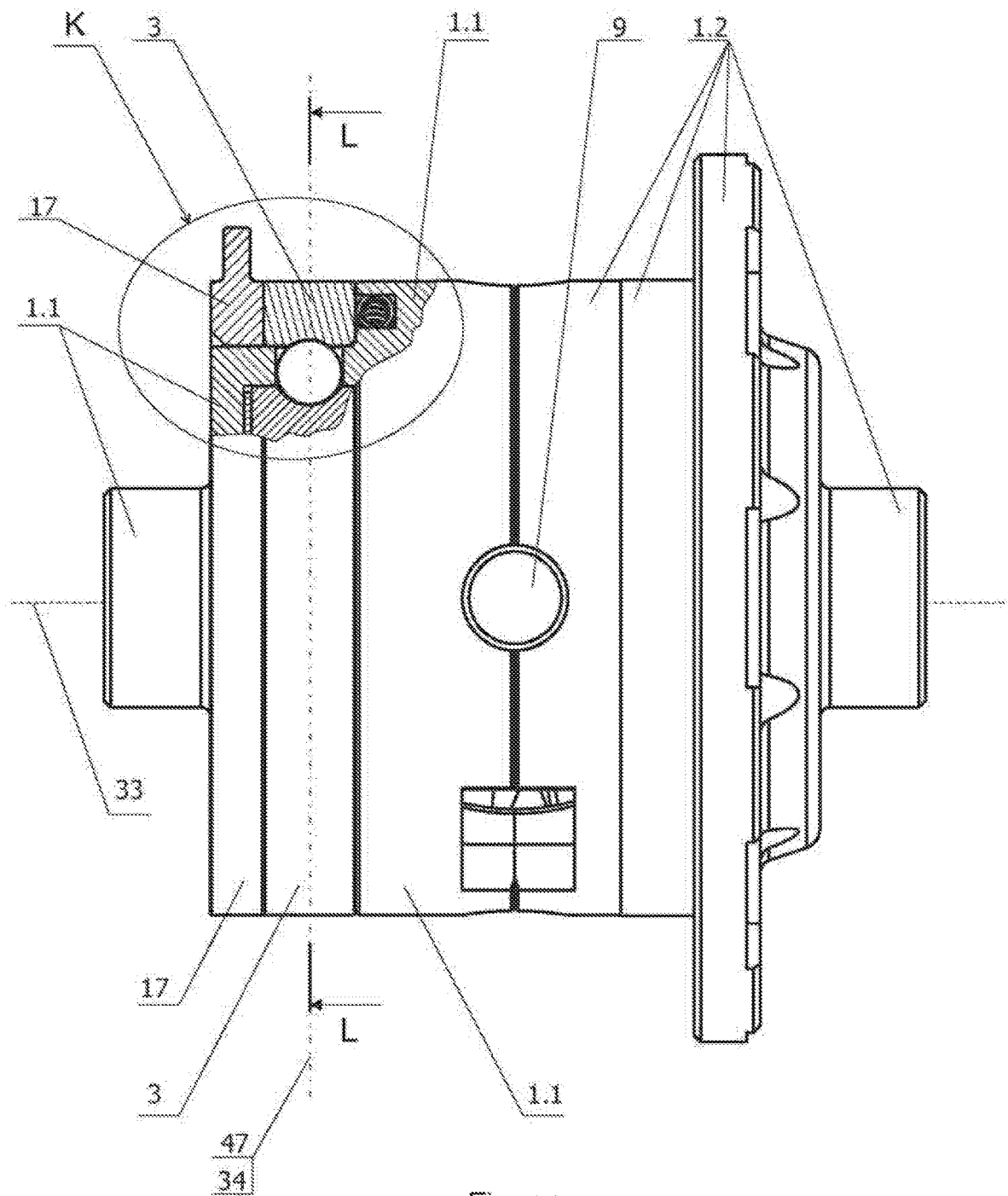

FIG. 36. Differential according to Option 2, Examples 1 and 2, in "Locked" position. Side view.

Figure 37:
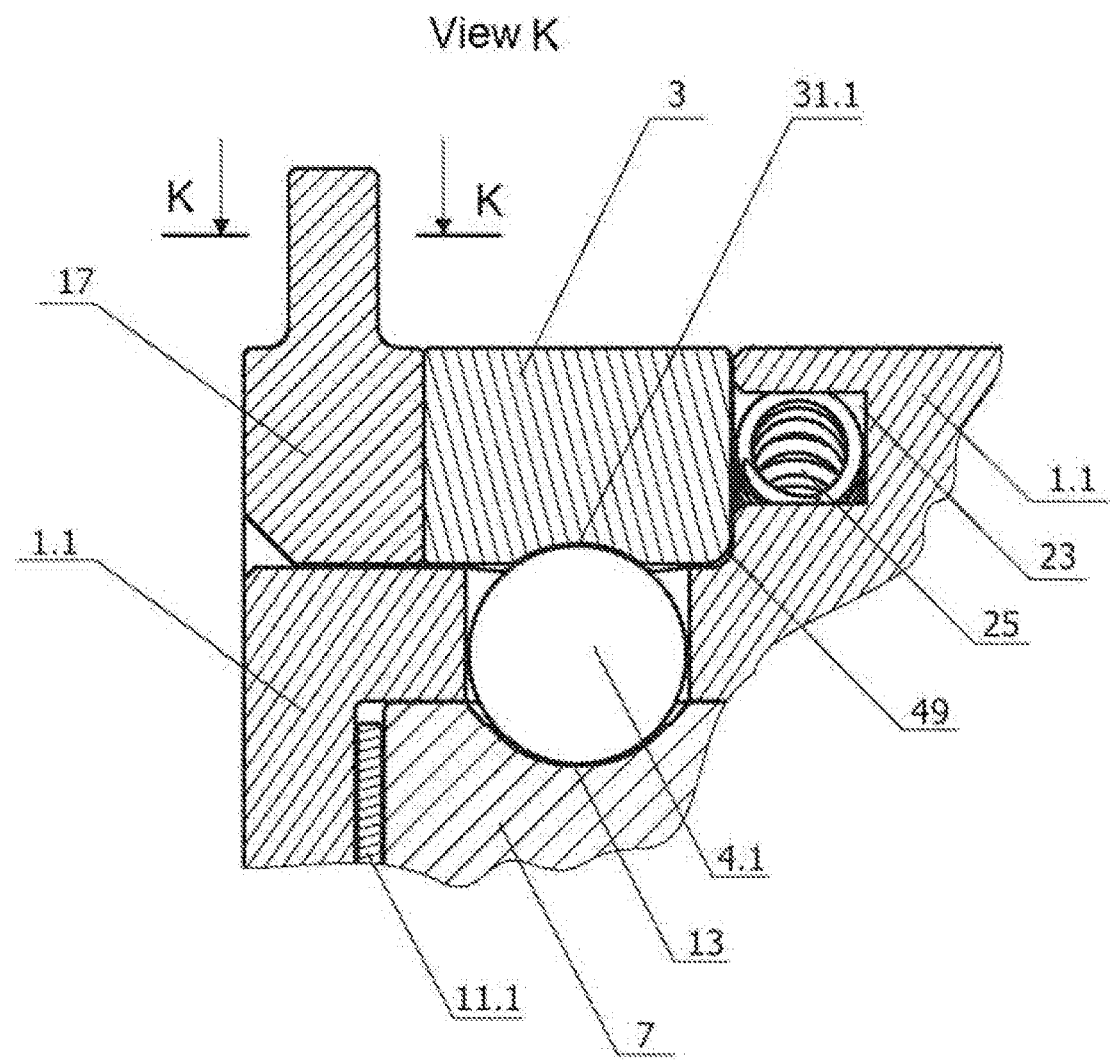

FIG. 37. View K (enlarged) in FIG. 36.

Figure 38:
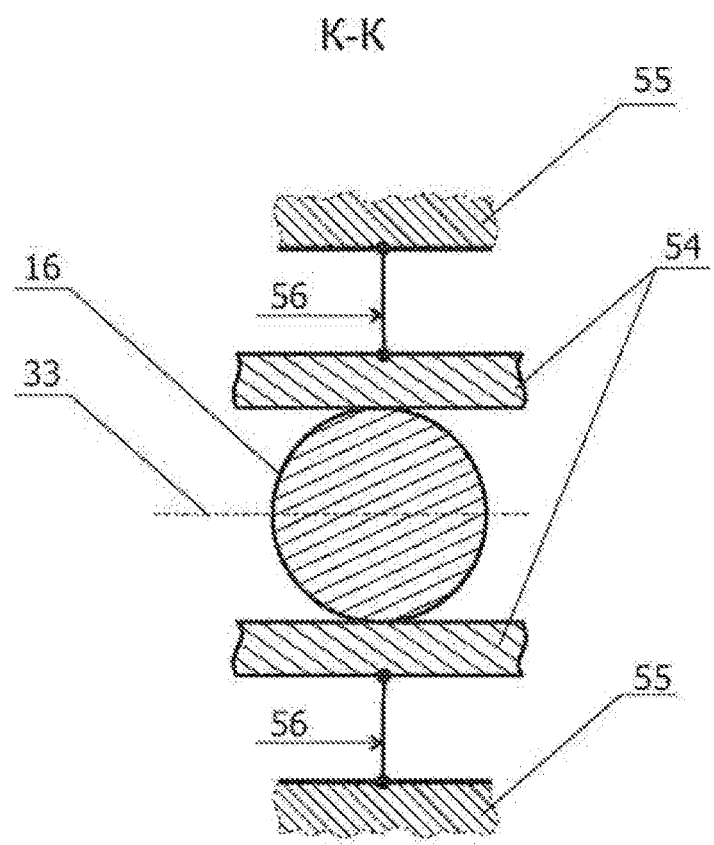

FIG. 38. Section K-K in FIG. 37.

Figure 39:
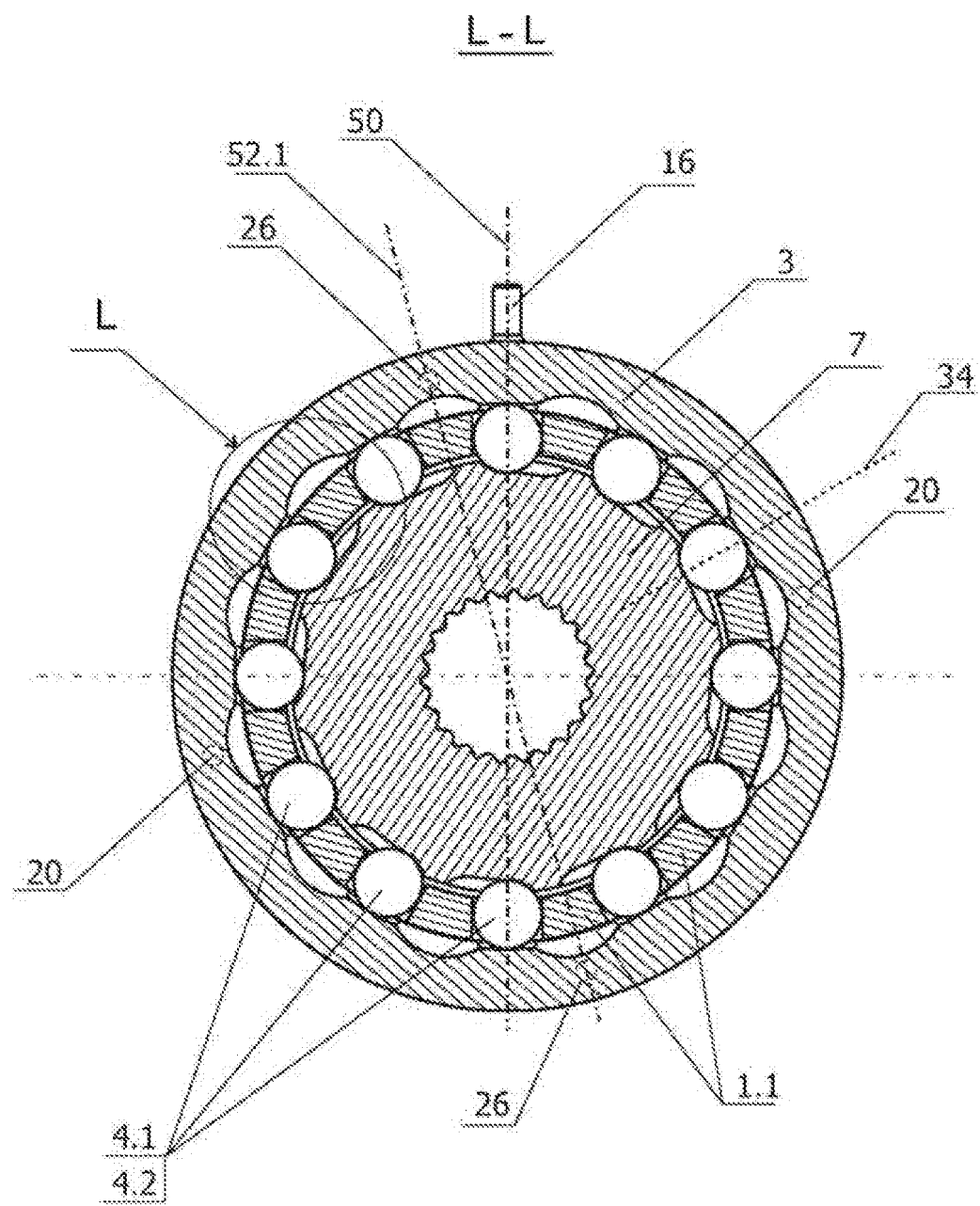

FIG. 39. Section L-L in FIG. 36 for Example 1, Option 2.

Figure 40:
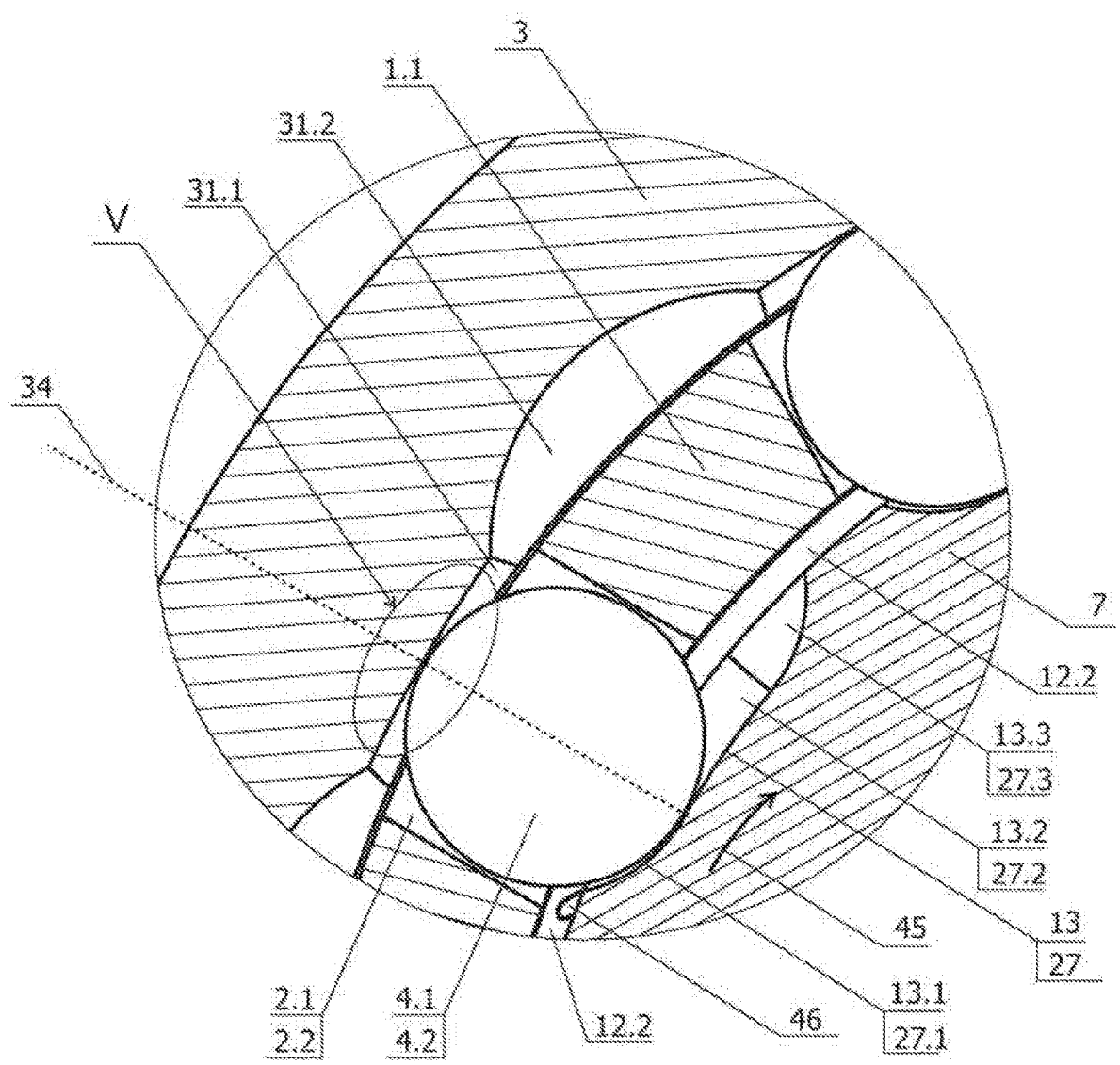

FIG. 40. Section L-cross-section with Operational Plane 47 in FIG. 39.

Figure 41:
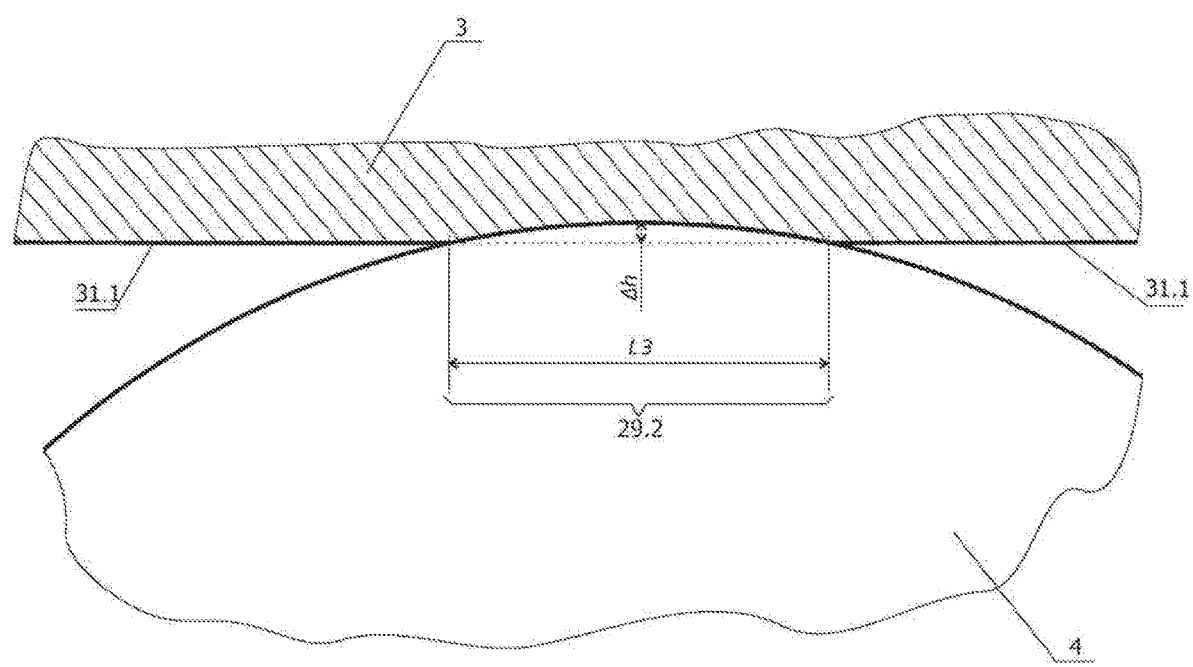

FIG. 41. View V in FIG. 40.

Figure 42:
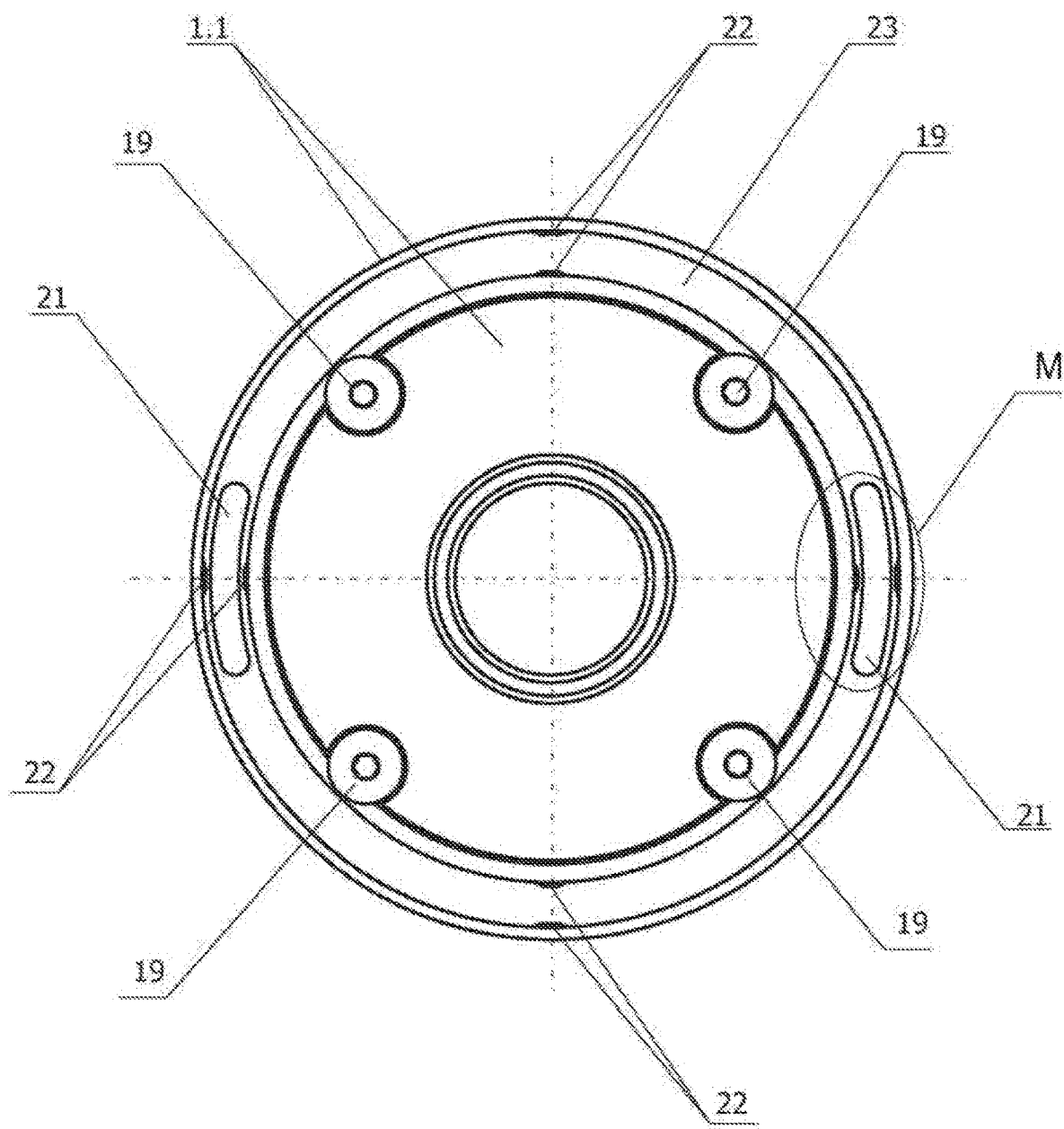

FIG. 42. Part 1 1.1 of Differential Housing 1 for Option 2, Examples 1 and 3. View from mounting of Lock-Up Clutch 3.

Figure 43:
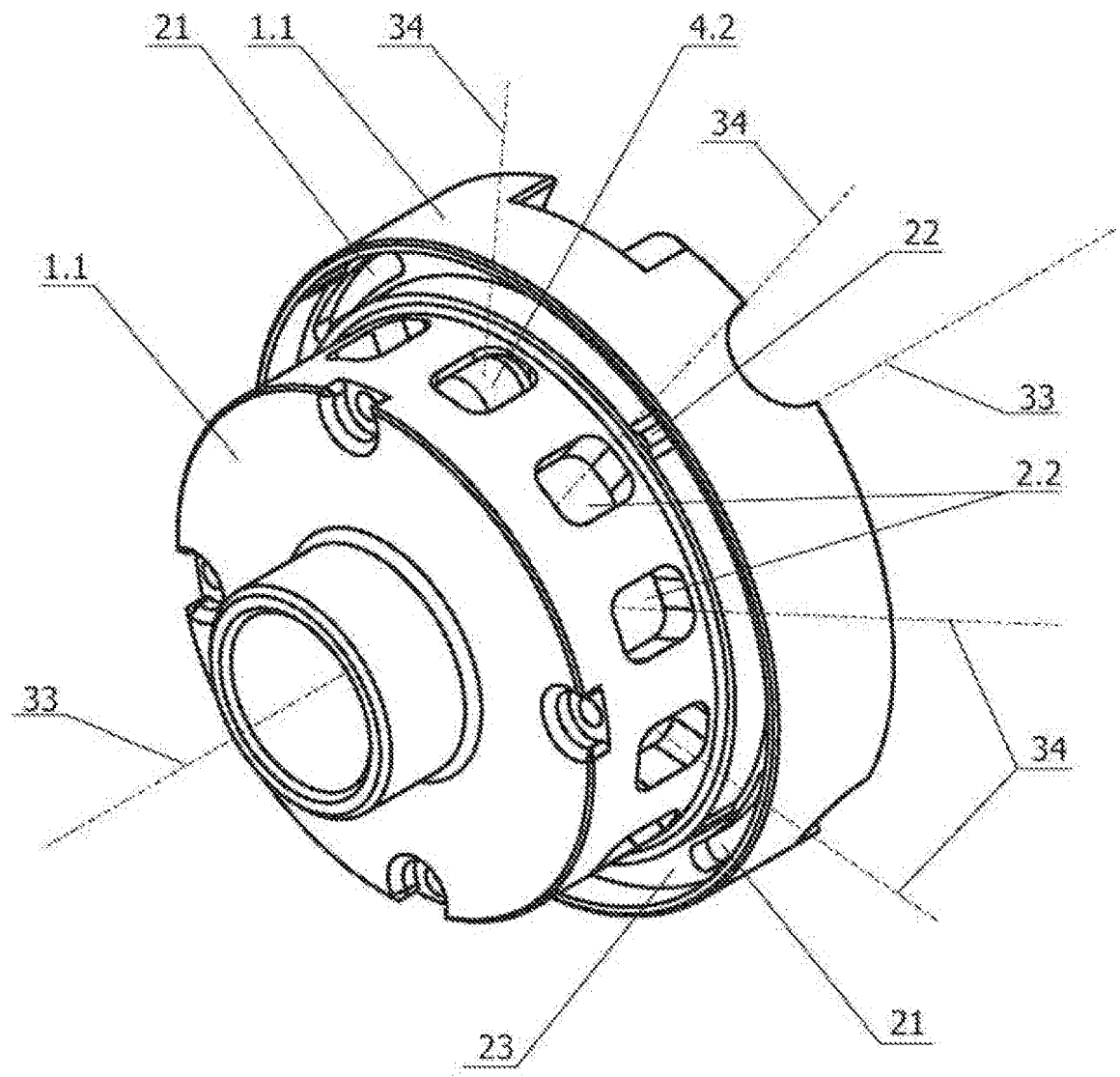

FIG. 43. Part 1 1.1 of Differential Housing 1 for Option 2, Example 3.

Figure 44:
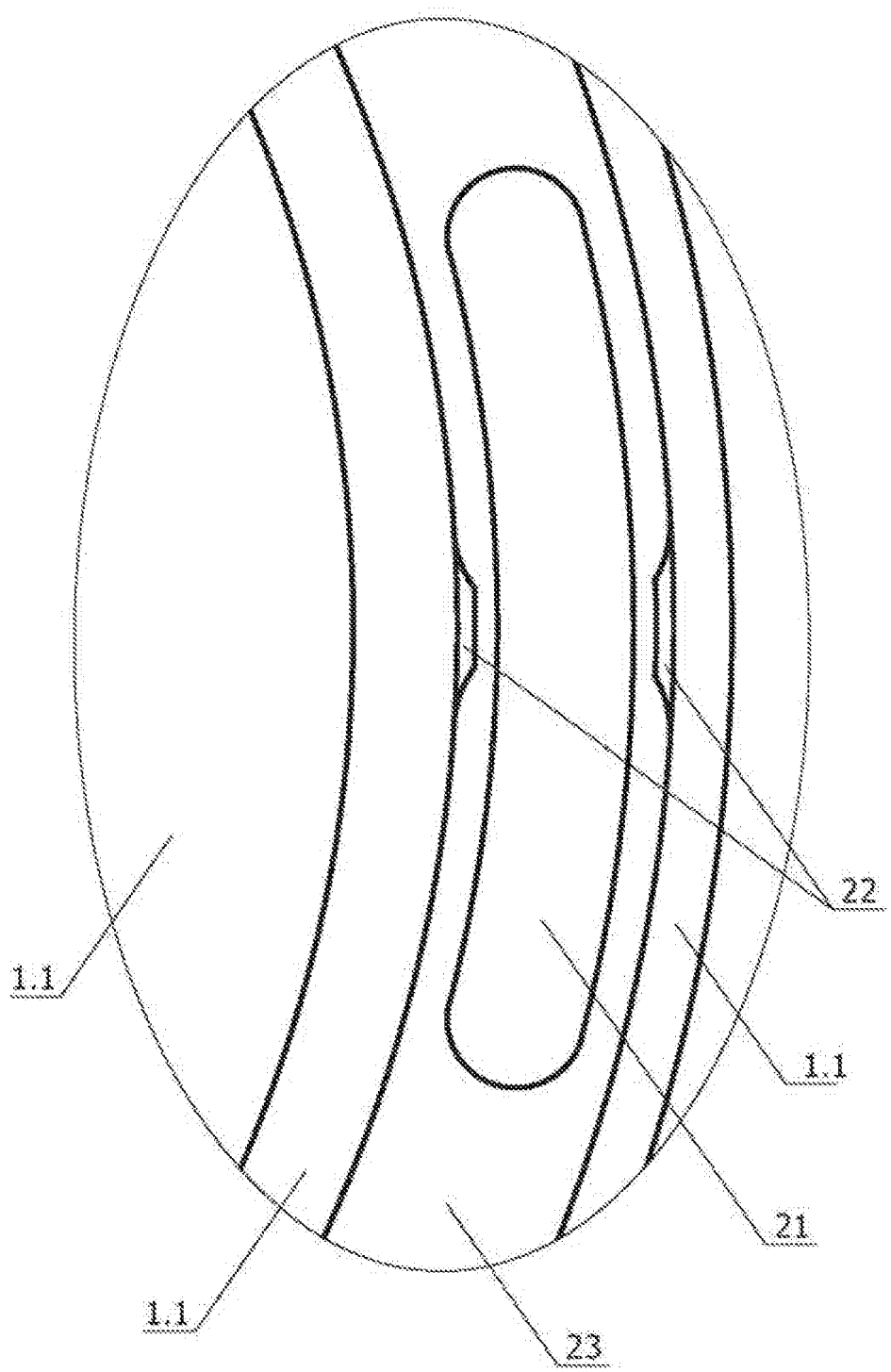

FIG. 44. View M in FIG. 42.

Figure 45:
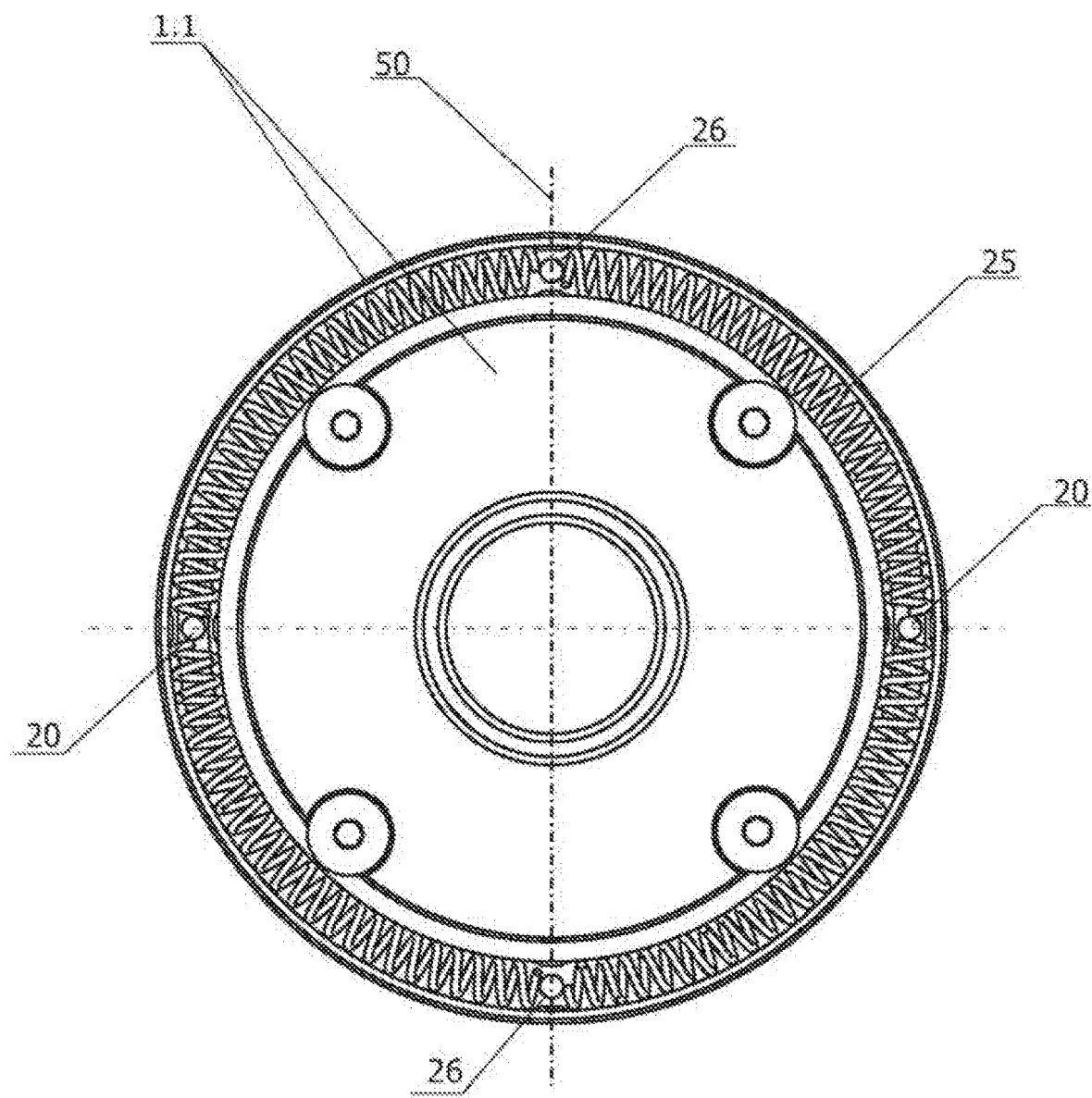

FIG. 45. Part 1 1.1 of Differential Housing 1 with installed Return Springs 25 according to Option 2, Examples 1 and 3. The differential is in "Unlocked" position. View from the installation side of Lock-Up Clutch 3. Pins 20 and 26 are shown conditionally for the position of the lock-up clutch in 1st Fixed Position 50.

Figure 46:
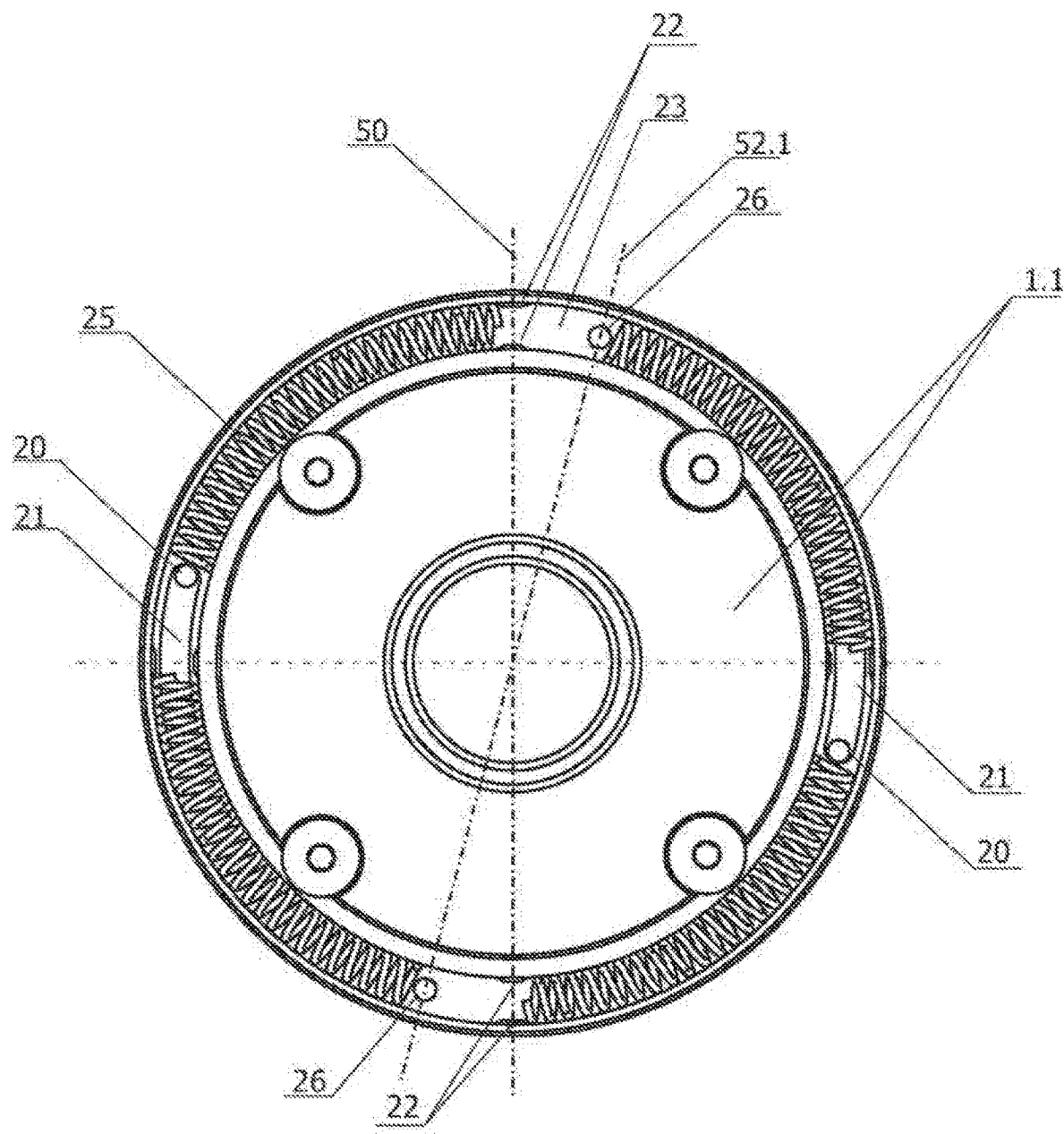

FIG. 46. Part 1 1.1 of Differential Housing 1 with installed Return Springs 25 according to Option 2, Examples 1 and 3. The differential is in "Locked" position. View from the installation side of the Lock-Up Clutch 3. Pins 20 and 26 are shown conditionally for the position of the lock-up clutch in 3rd Fixed Position 52.1.

Figure 47:
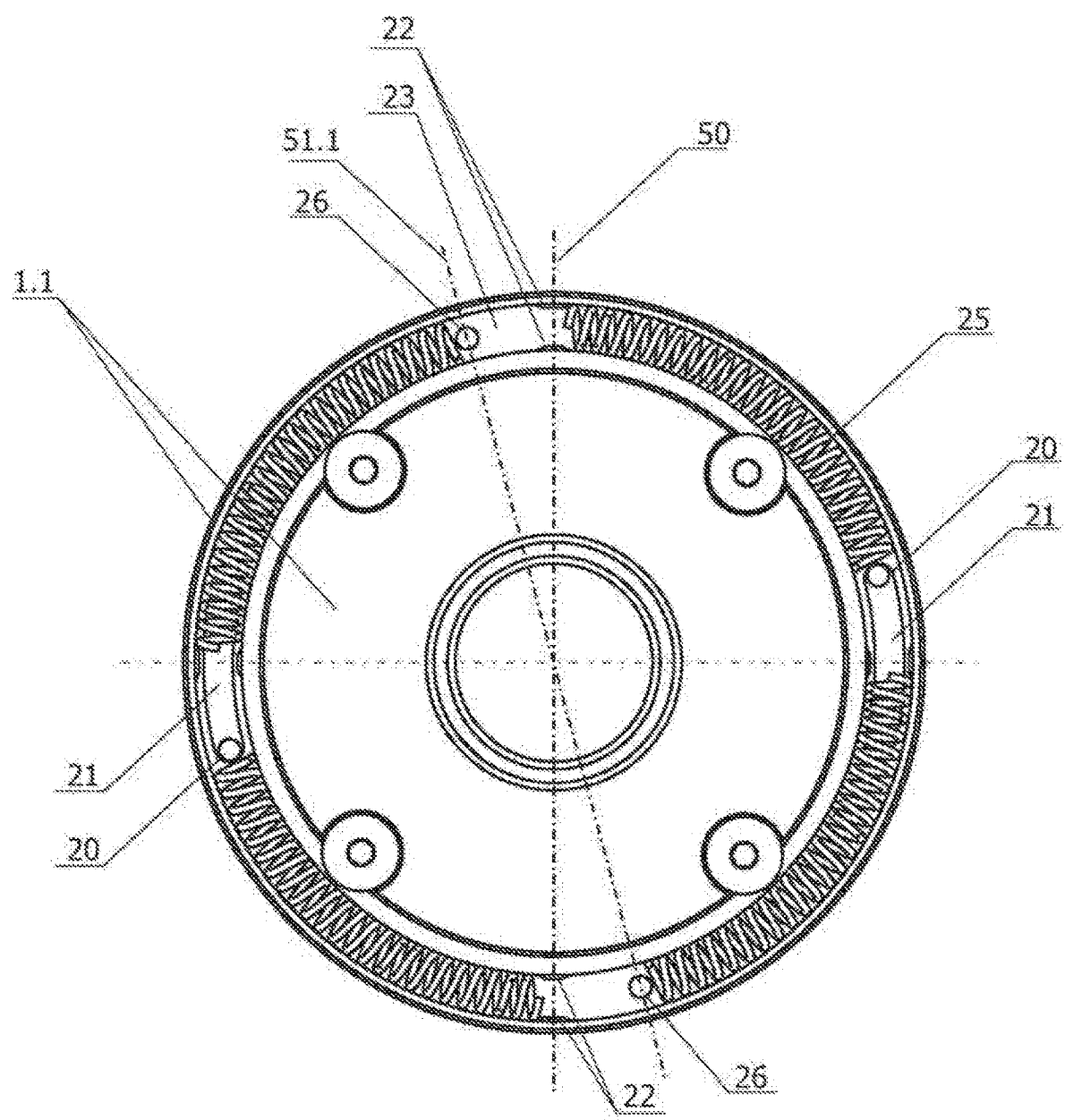

FIG. 47. Part 1 1.1 of Differential Housing 1 with installed Return Springs 25 according to Option 2, Examples 1 and 3. The differential is in "Locked" position. View from the installation side of the Lock-Up Clutch 3. Pins 20 and 26 are shown conditionally for the position of the lock-up clutch 3 in 2nd Fixed Position 51.1.

Figure 48:
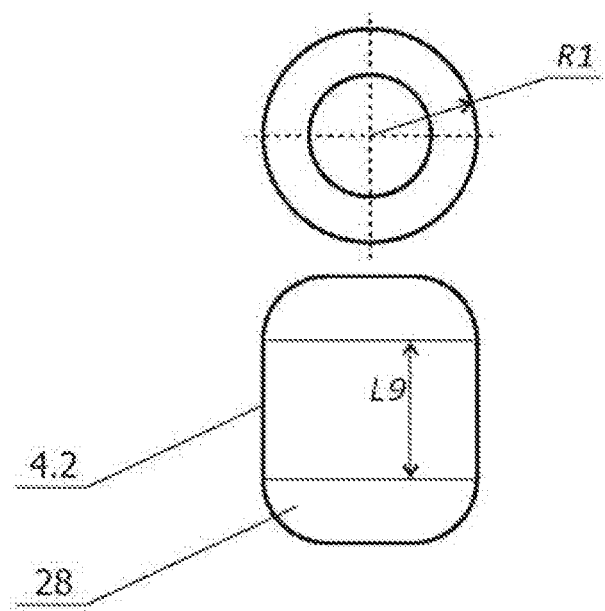

FIG. 48. Locking Element 4.2 shaped as a cylindrical roller.

Figure 49:
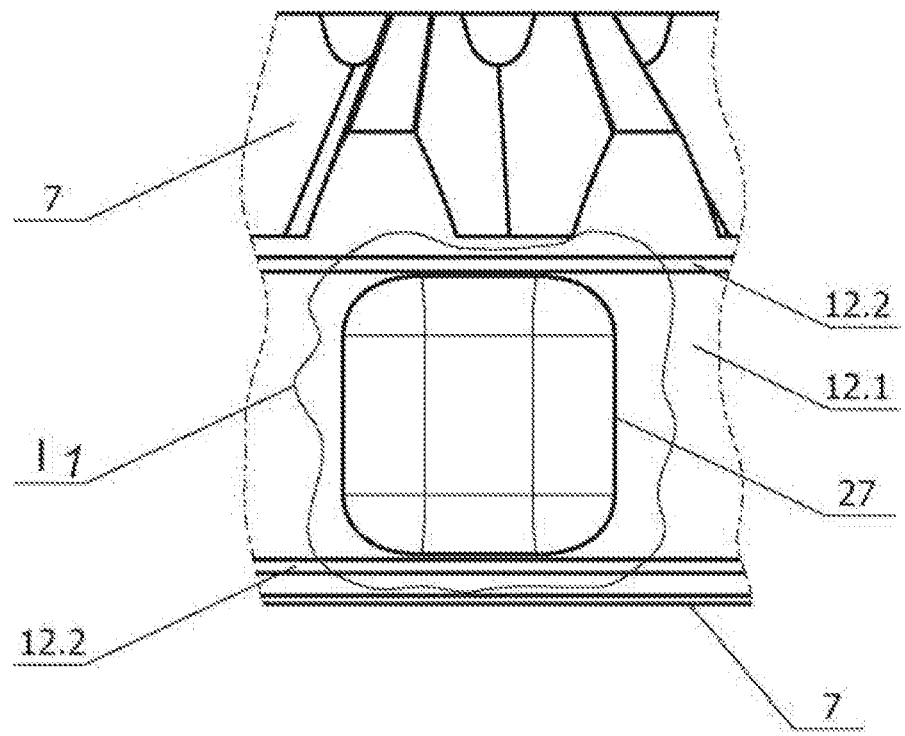

FIG. 49. Gear 7 fragment for Example 3 according to Option 2.

Figure 50:
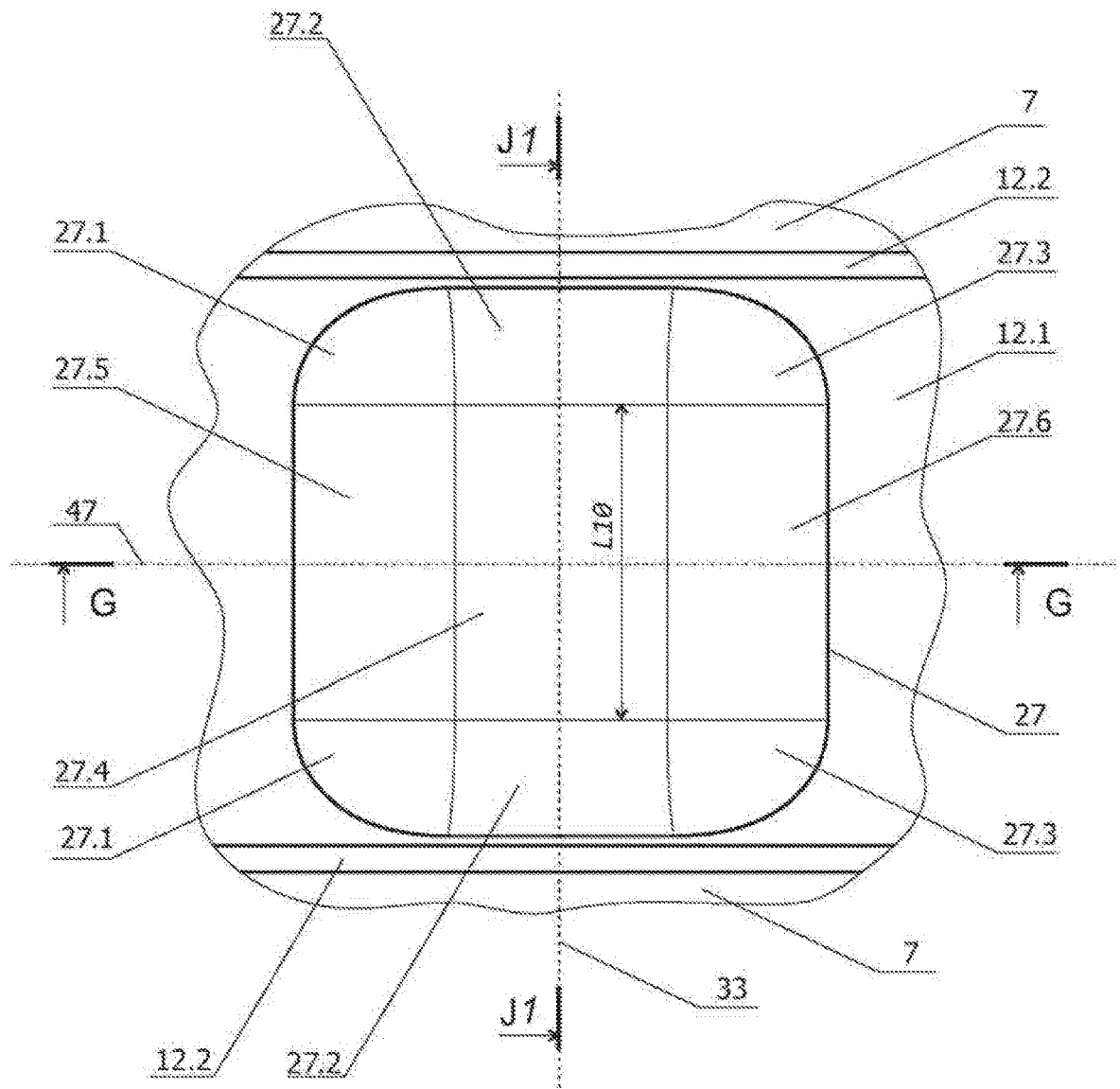

FIG. 50. View I in FIG. 49.

Figure 51:
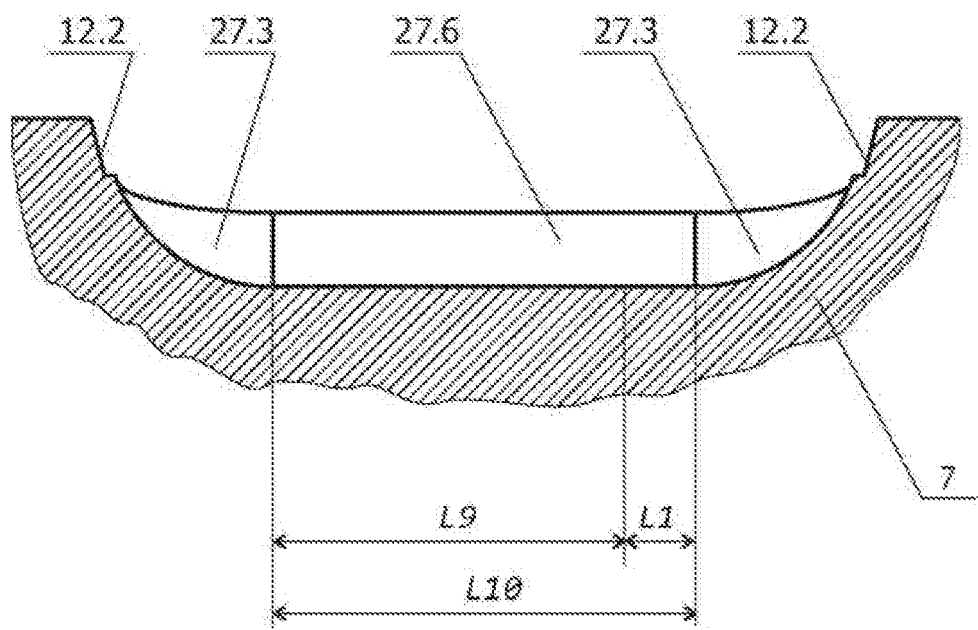

FIG. 51. Section J1-J1 in FIG. 50.

Figure 52:
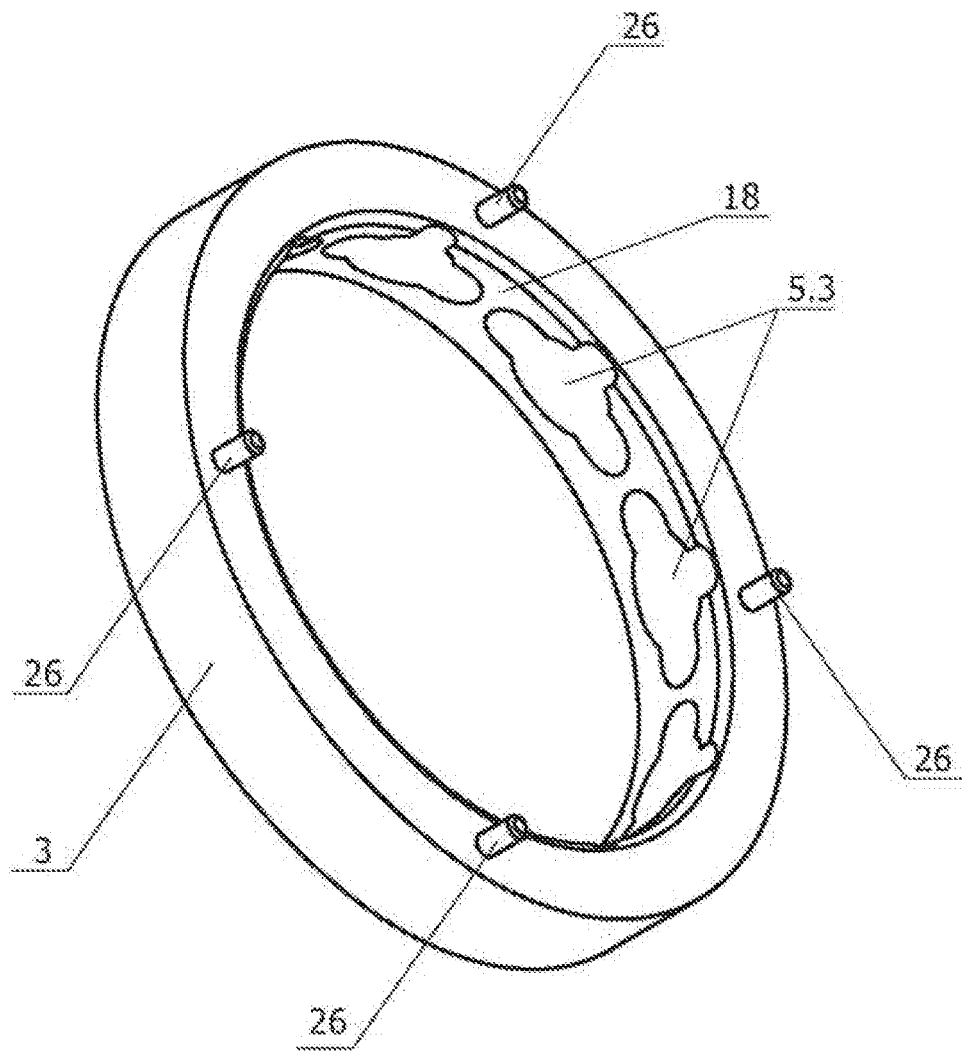

FIG. 52. Lock-Up Clutch 3 according to Option 2, Example 2. General view.

Figure 53:
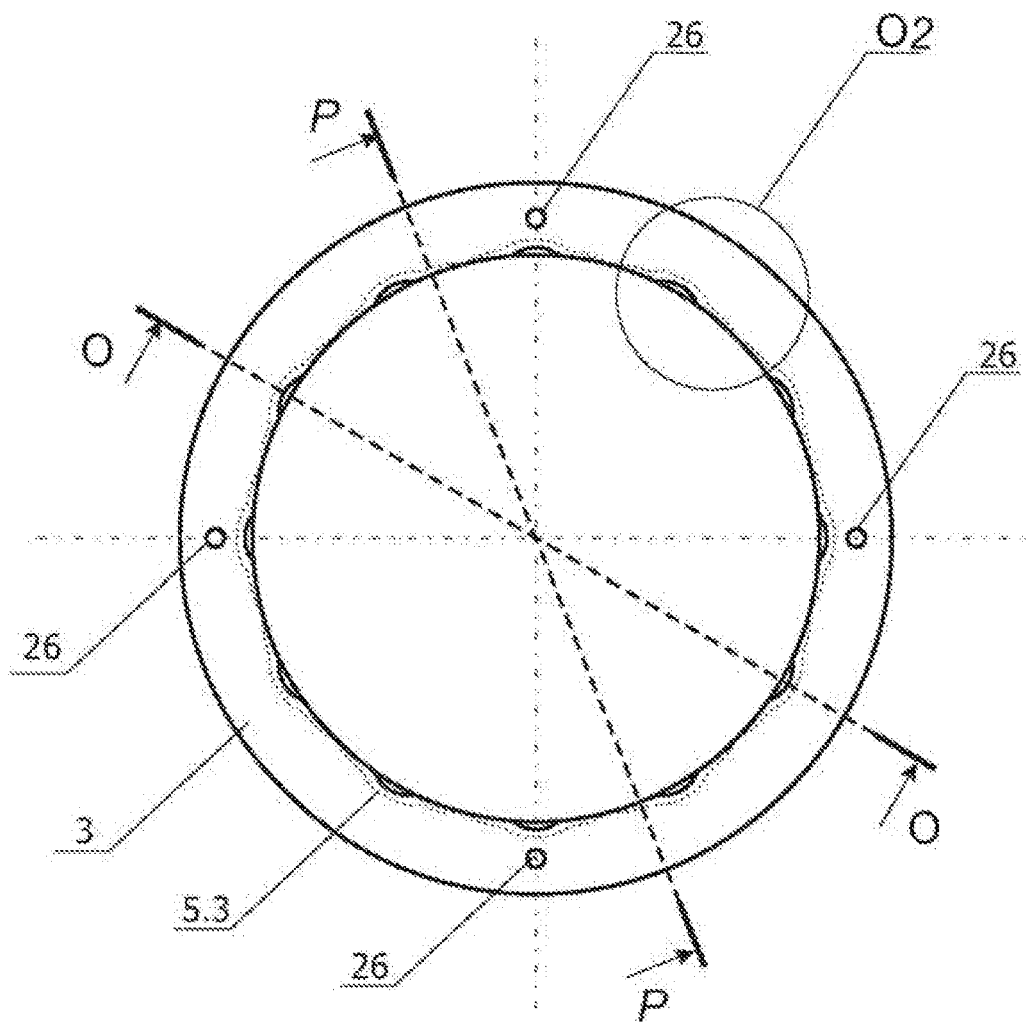

FIG. 53. Lock-Up Clutch 3 according to Option 2, Example 2. View from Pins 26 side.

Figure 54:
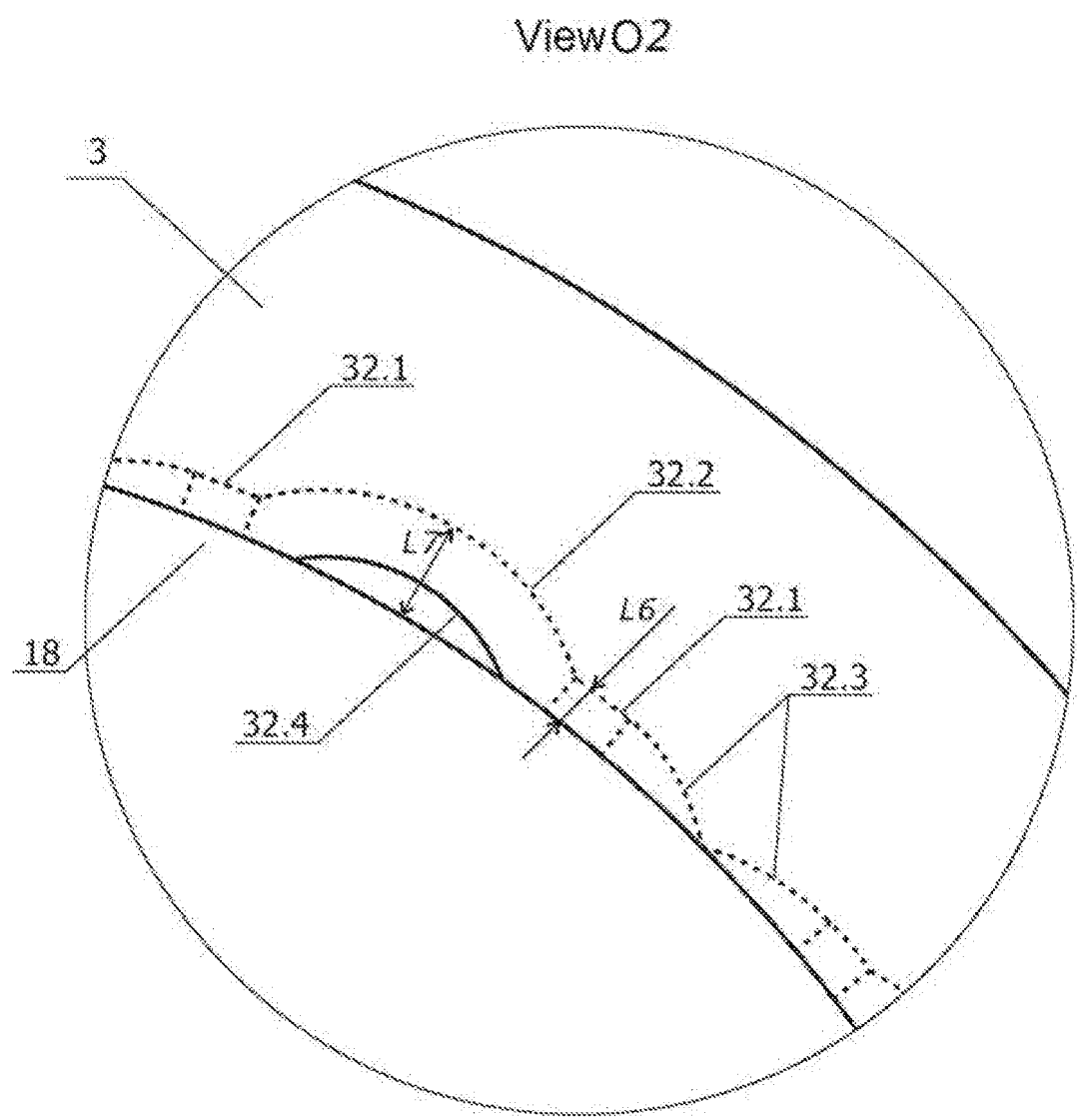

FIG. 54. Lock-Up Clutch 3 according to Option 2, Example 2. View O2 in FIG. 53.

Figure 55:
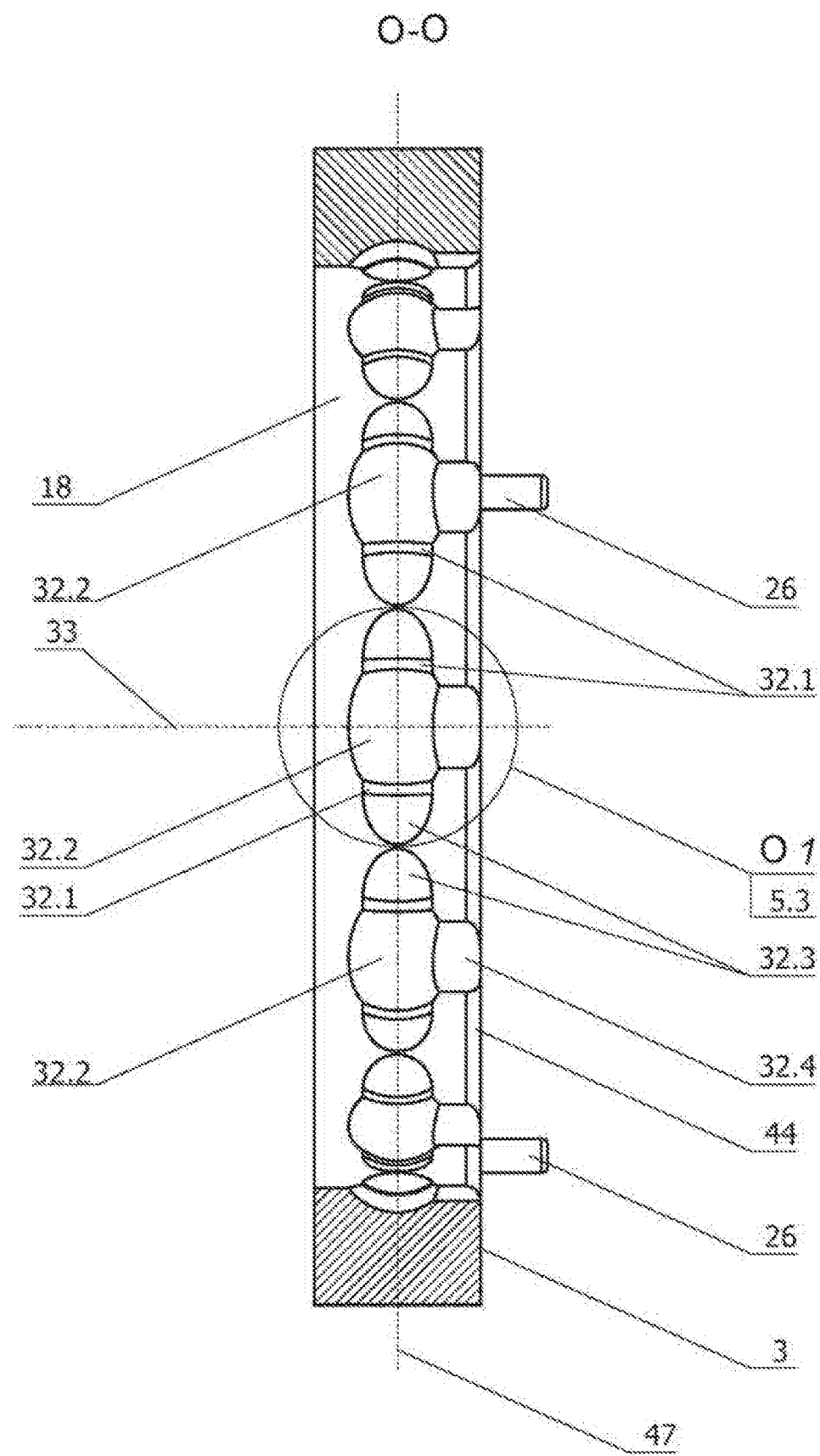

FIG. 55. Lock-Up Clutch 3 according to Option 2, Example 2. Section O-O in FIG. 53.

Figure 56:
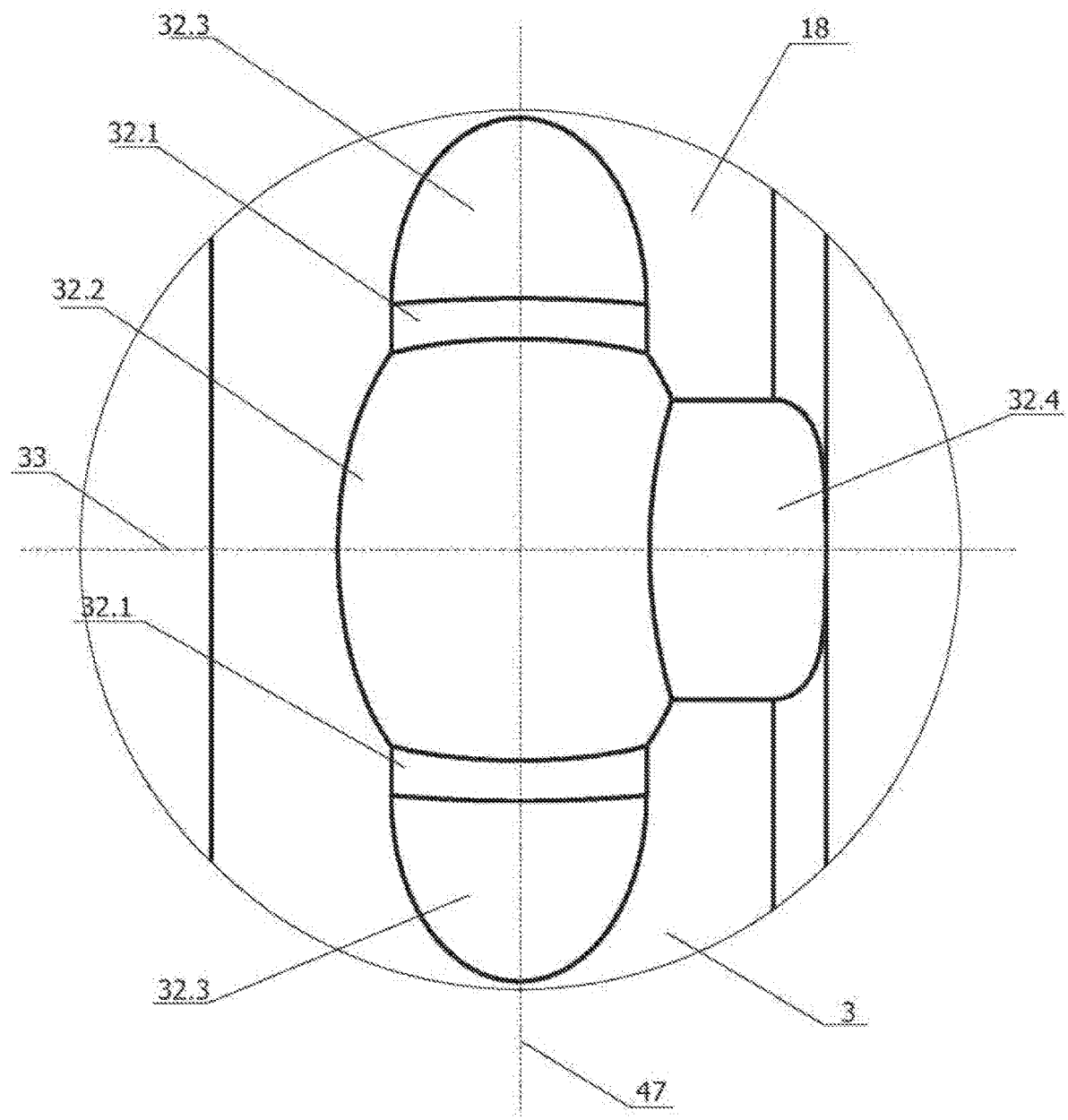

FIG. 56. Lock-Up Clutch 3 according to Option 2, Example 2. View O 1 in FIG. 55.

Figure 57:
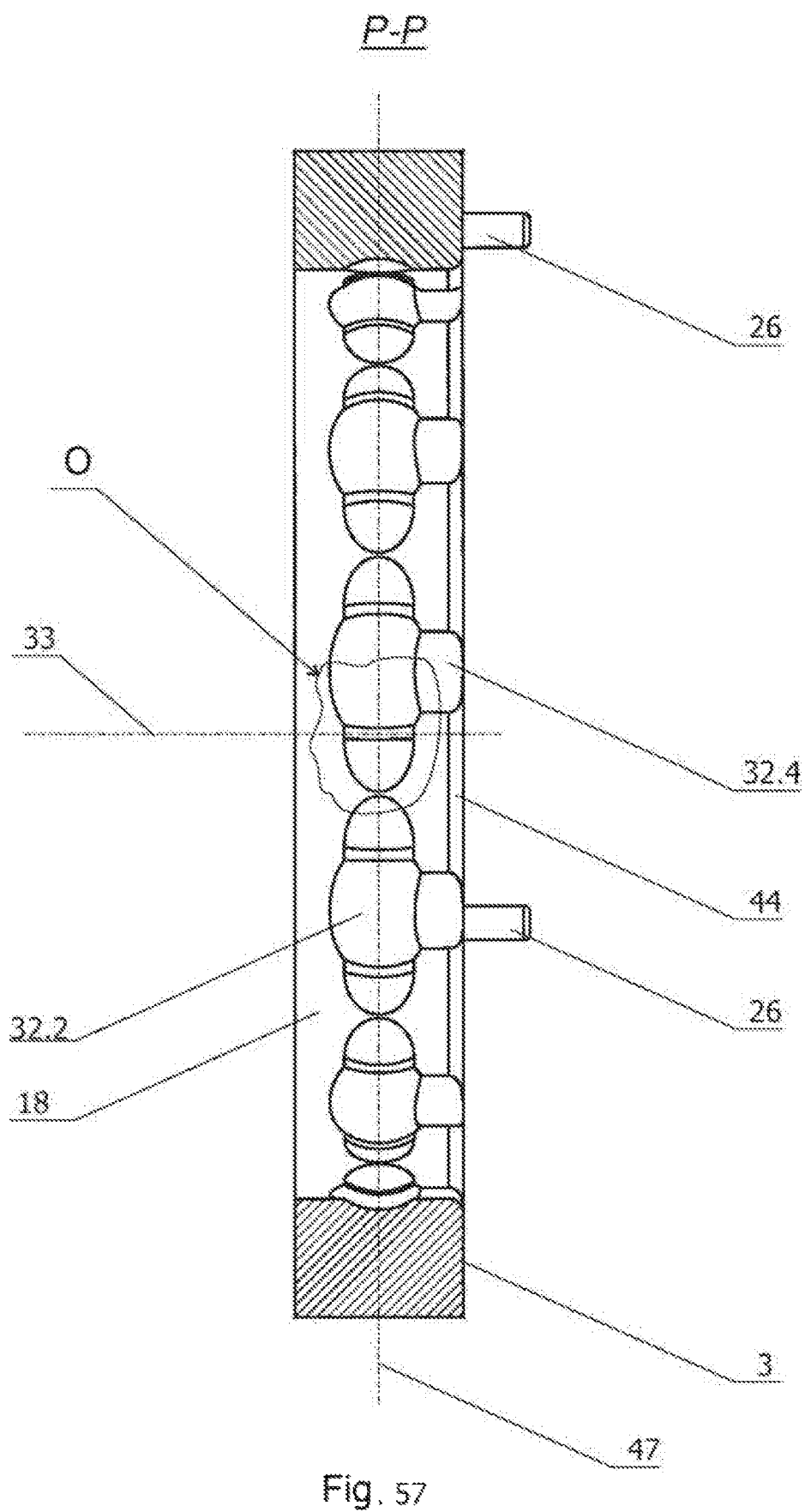

FIG. 57. Lock-Up Clutch 3 according to Option 2, Example 2. Section P-P in FIG. 53.

Figure 58:
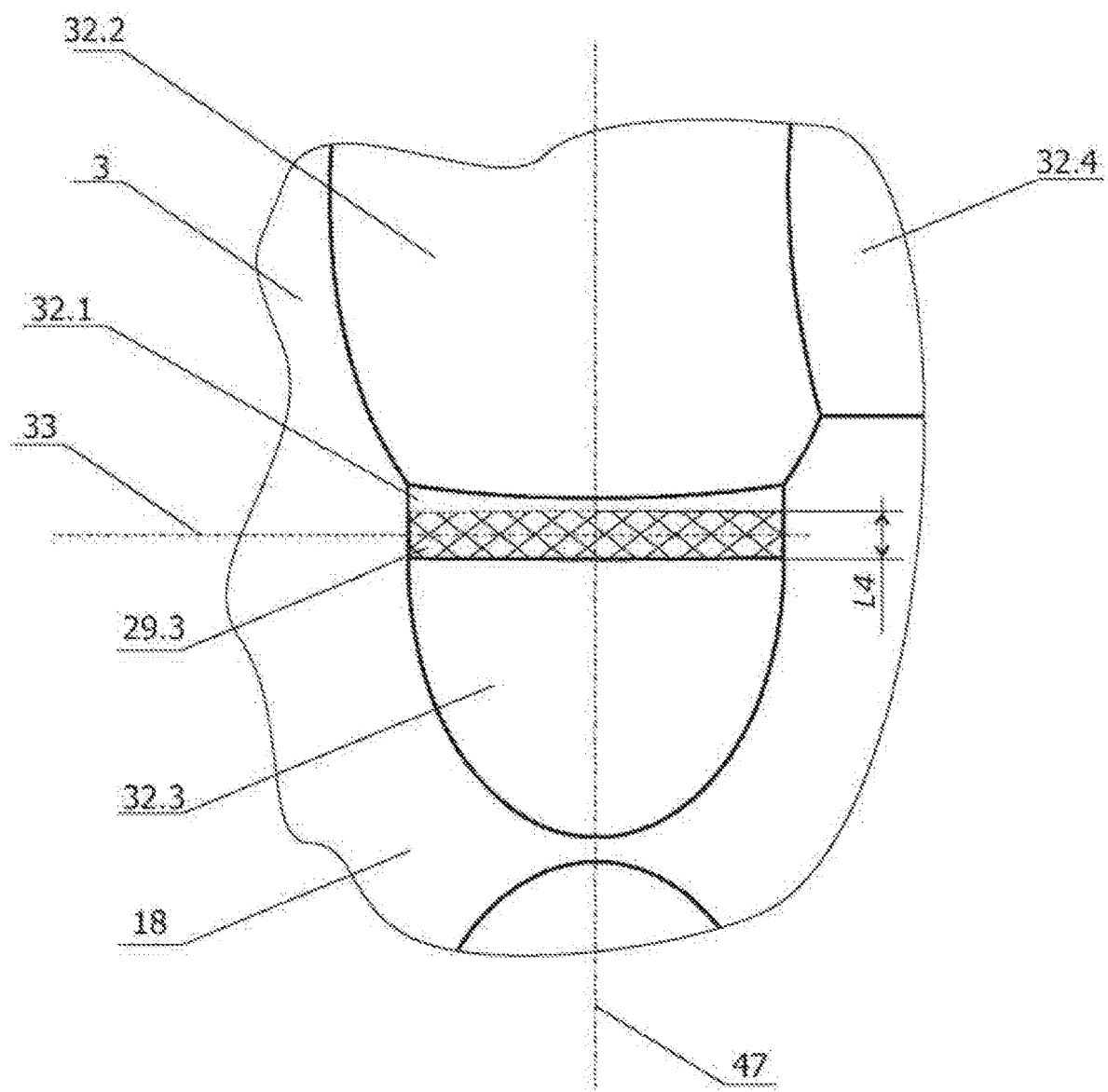

FIG. 58. Lock-Up Clutch 3 according to Option 2, Example 2. View O in FIG. 57.

Figure 59:
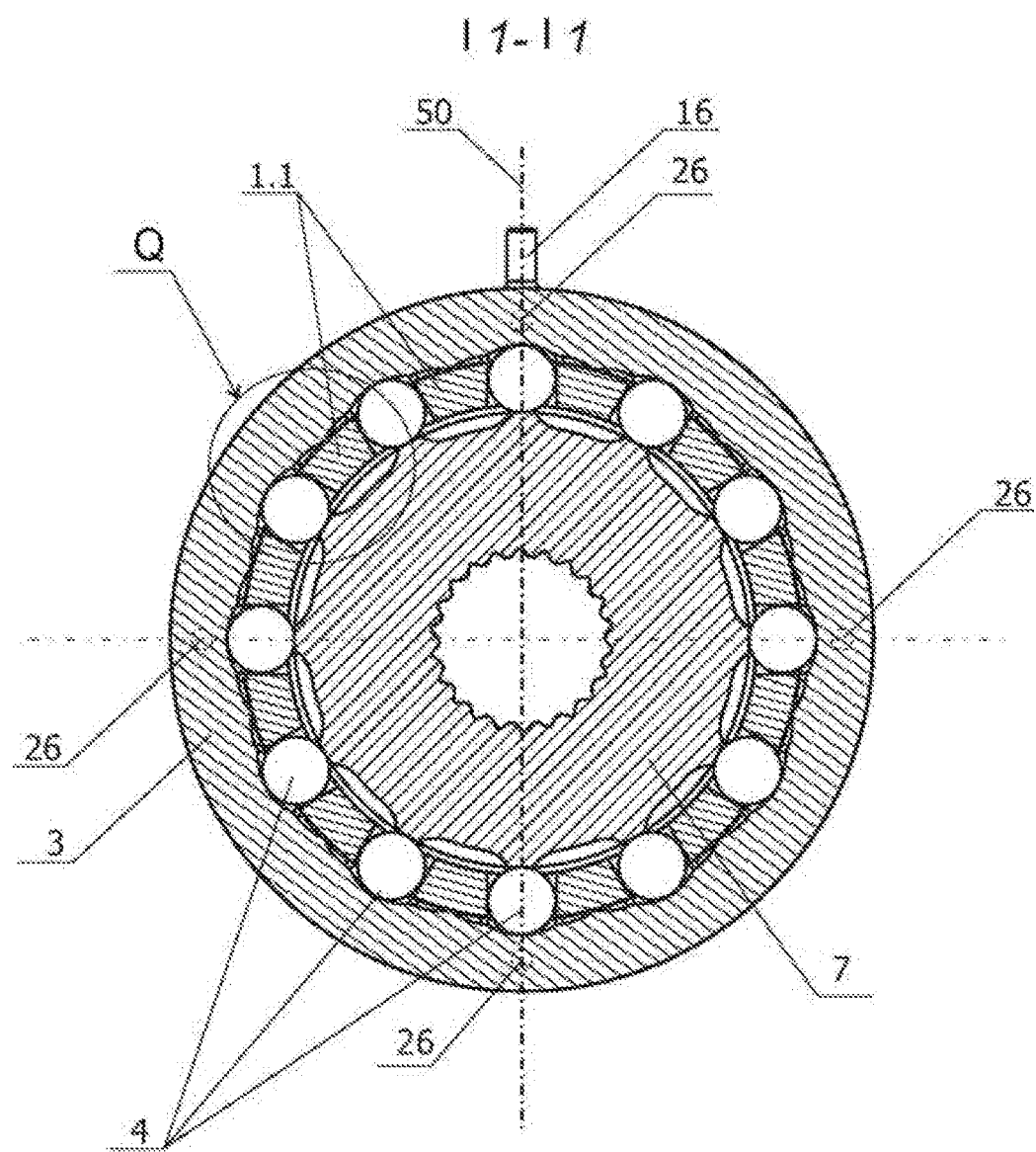

FIG. 59. Section I1-I1 in FIG. 32 for Option 2, Example 2.

Figure 60:
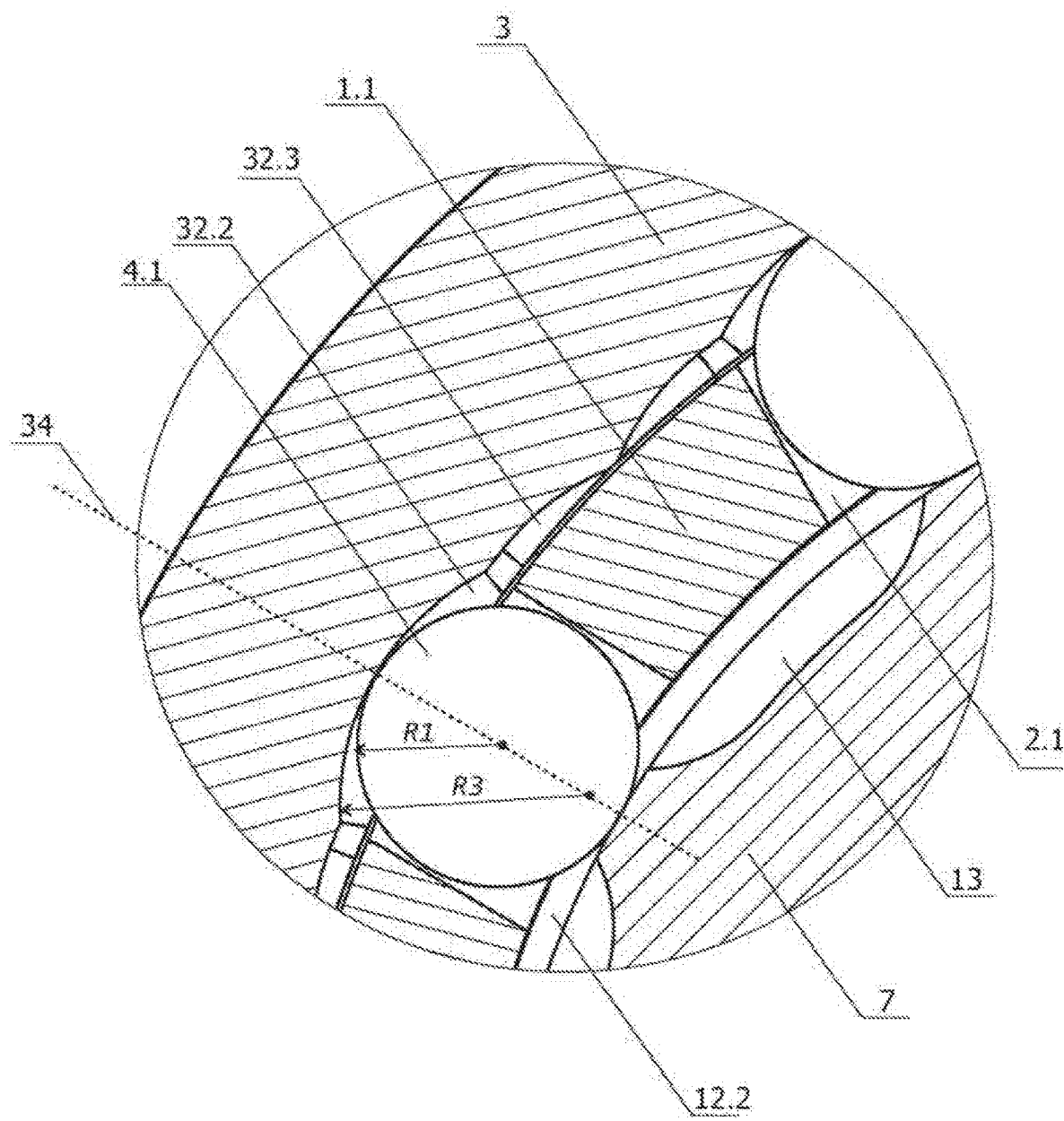

FIG. 60. View Q (enlarged) in FIG. 59.

Figure 61:
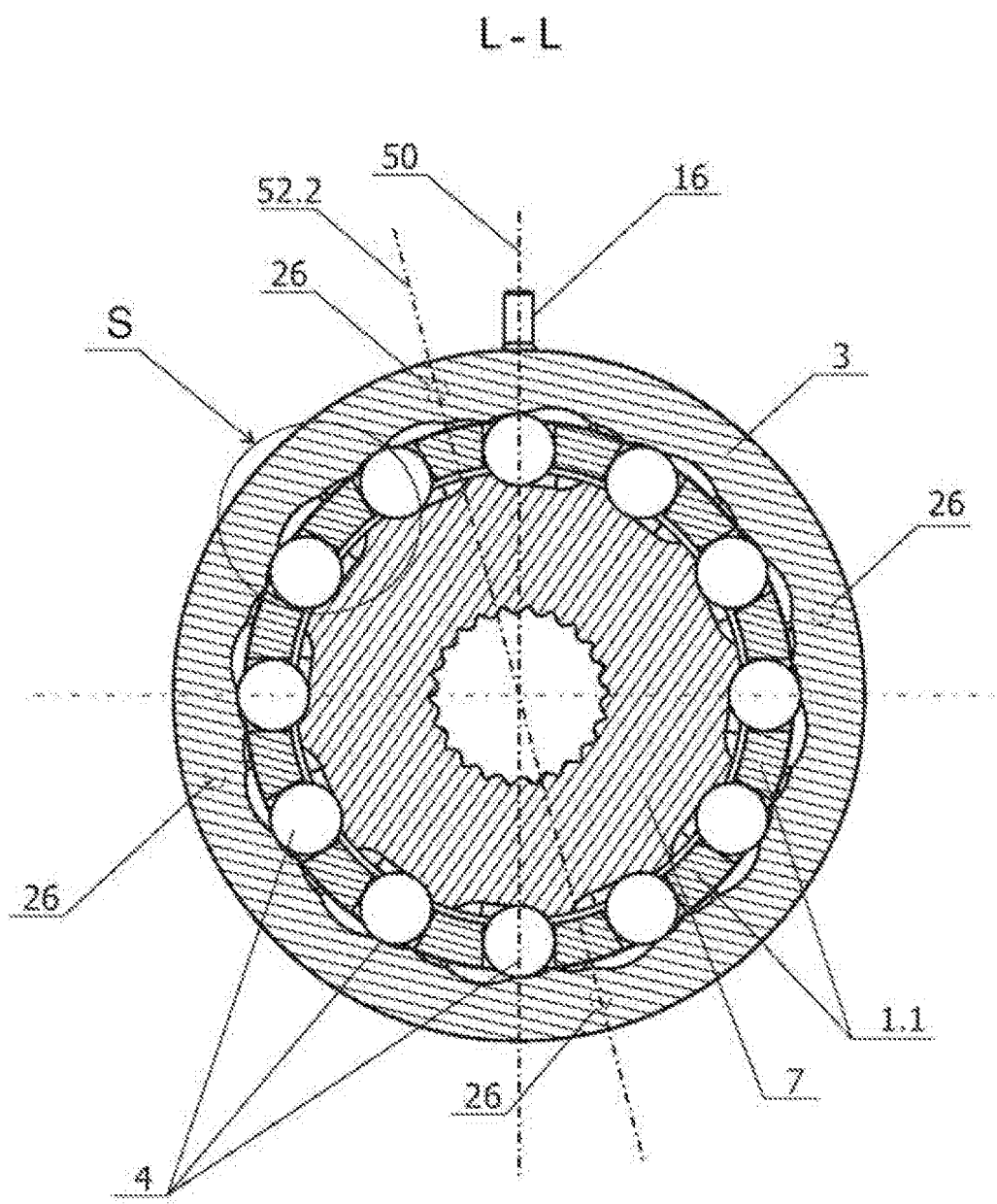

FIG. 61. Section L-L in FIG. 36 according to Option 2, Example 2.

Figure 62:
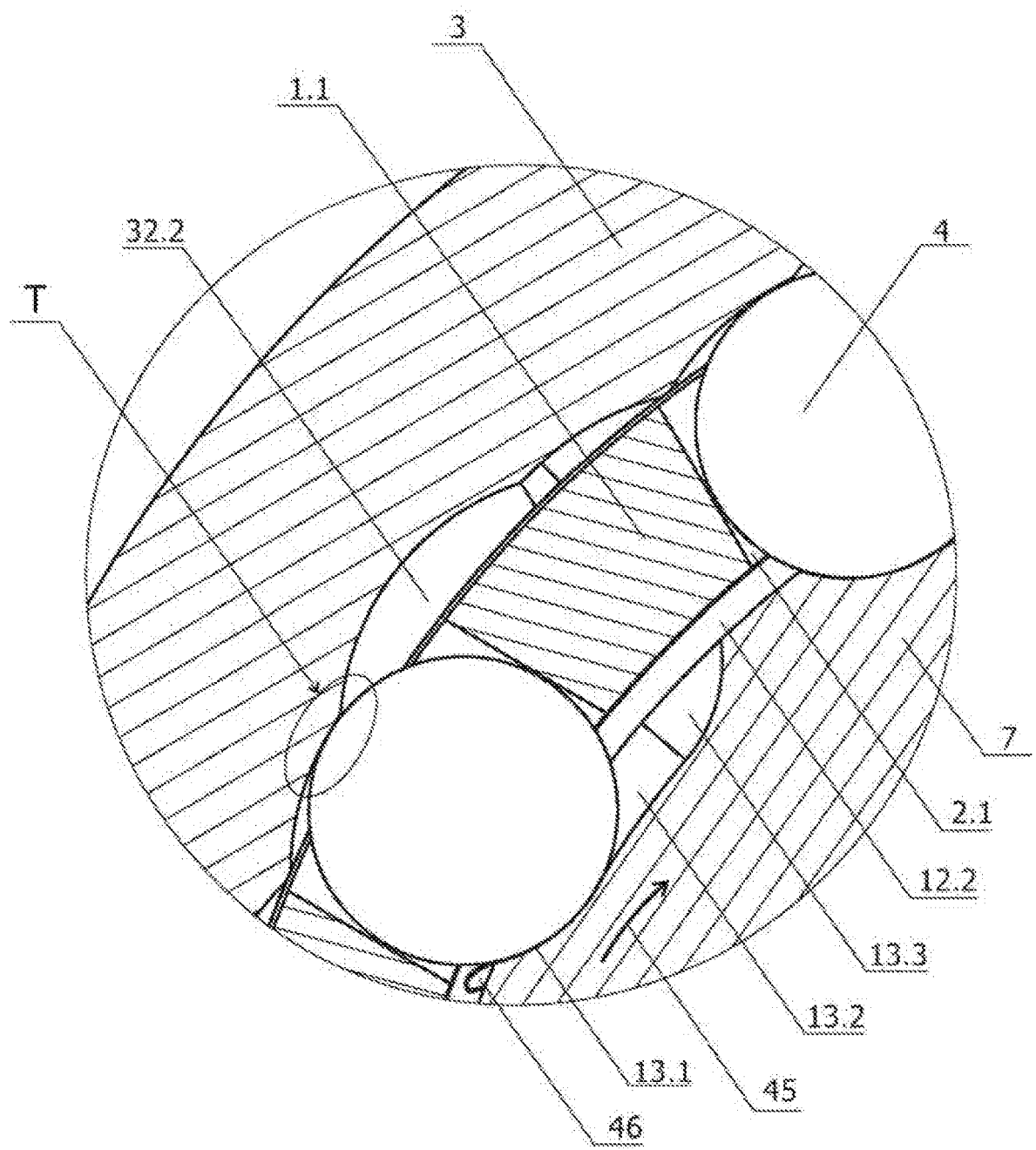

FIG. 62. View S (enlarged) in FIG. 61.

Figure 63:
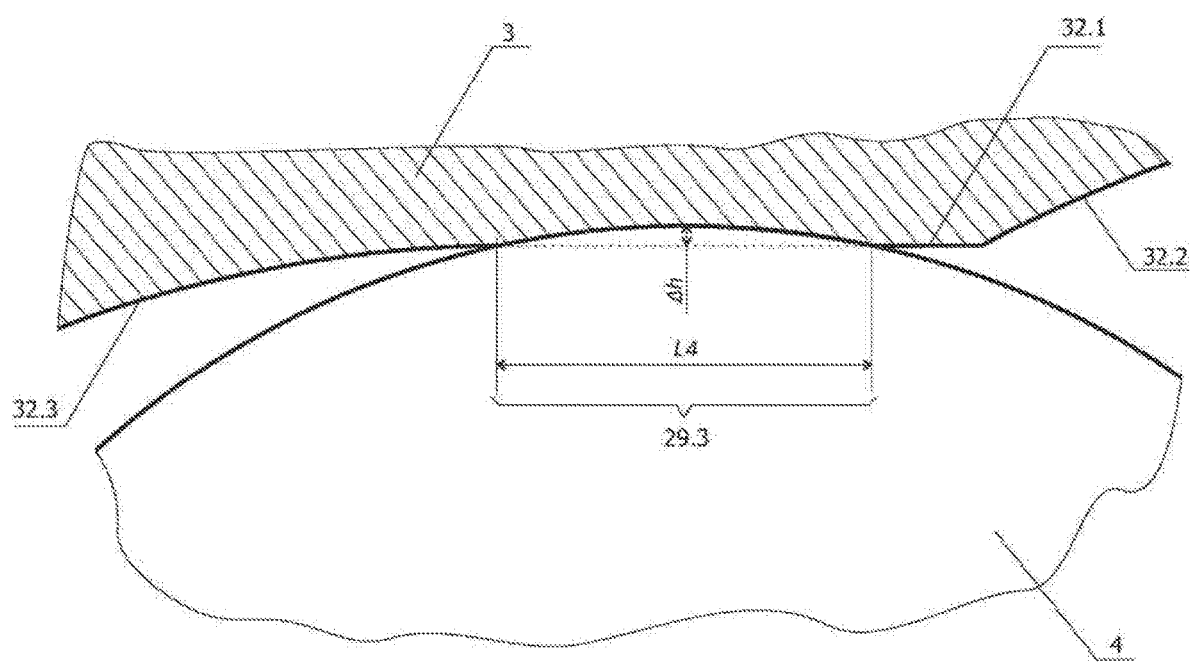

FIG. 63. View T (enlarged and rotated by 60 degrees) in FIG. 62.

Figure 64:
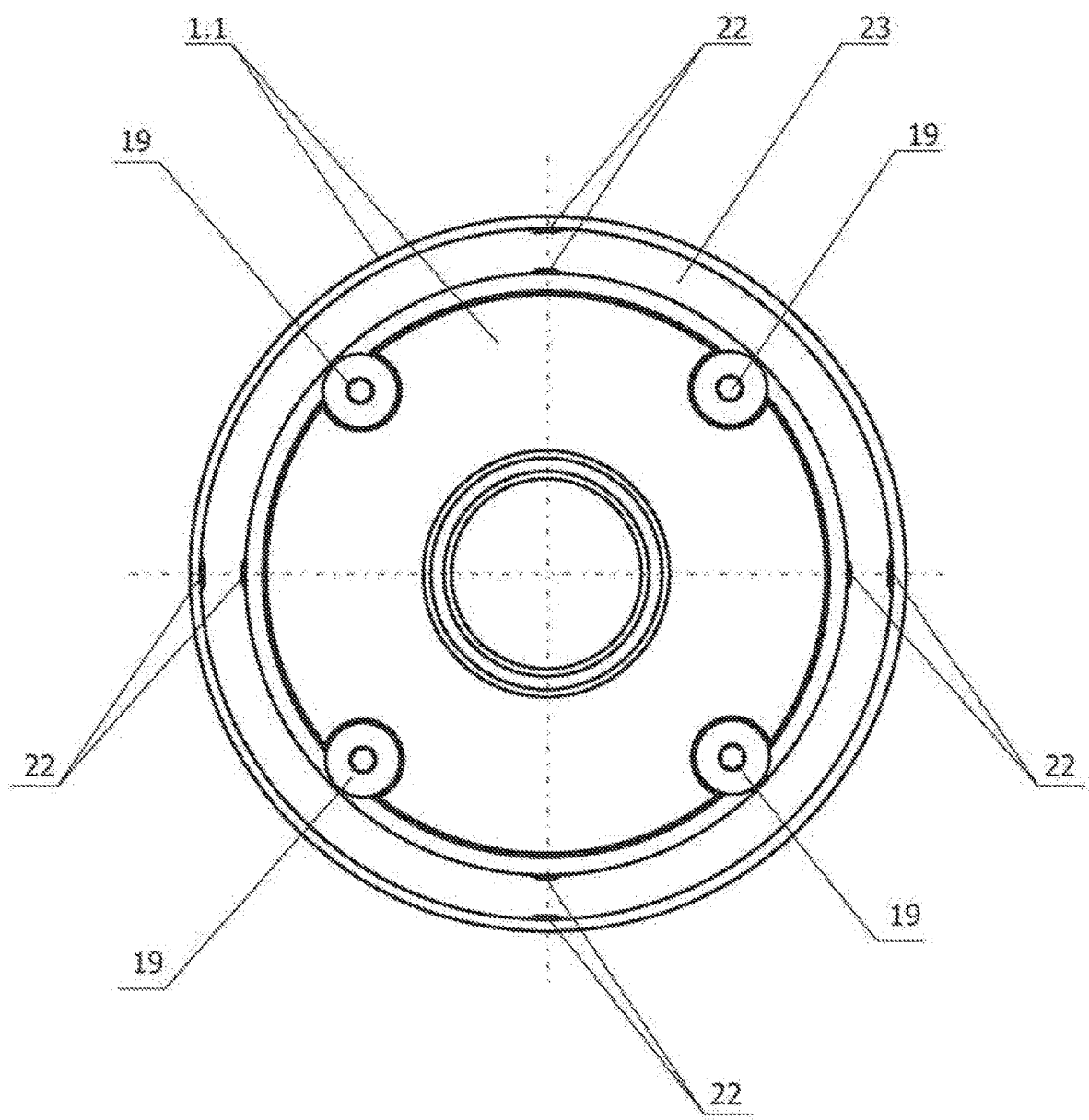

FIG. 64. Part 1 1.1 of Differential Housing 1 according to Option 2, Example 2. View from the side of Locking Elements 19.

Figure 65:
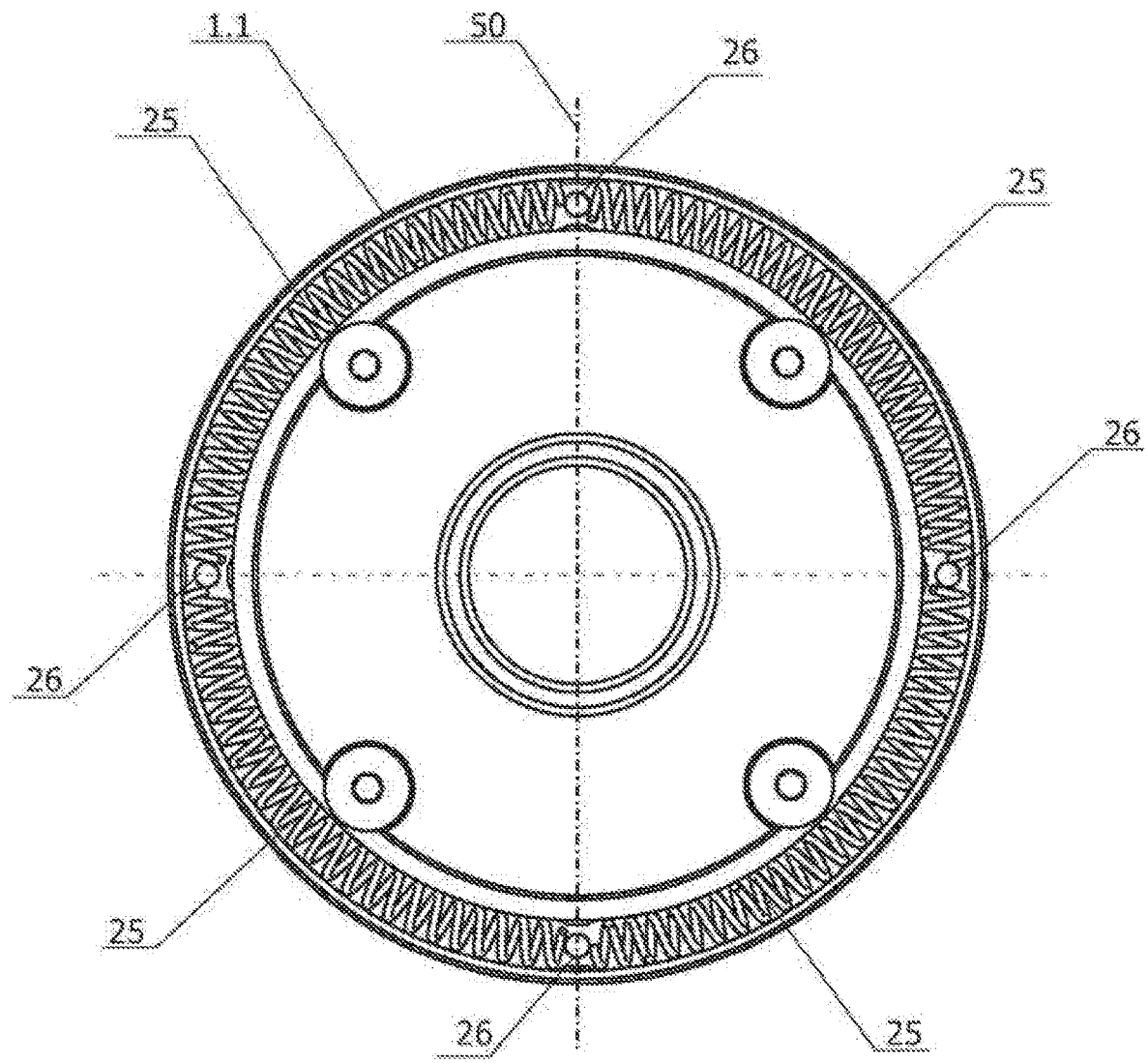

FIG. 65. Part 1 1.1 of Differential Housing 1 according to Option 2, Example 2, with Springs 25 laid in Groove 23, in "Unlocked" position 50. View from the side of Locking Elements 19. Pins 26 are shown relatively.

Figure 66:
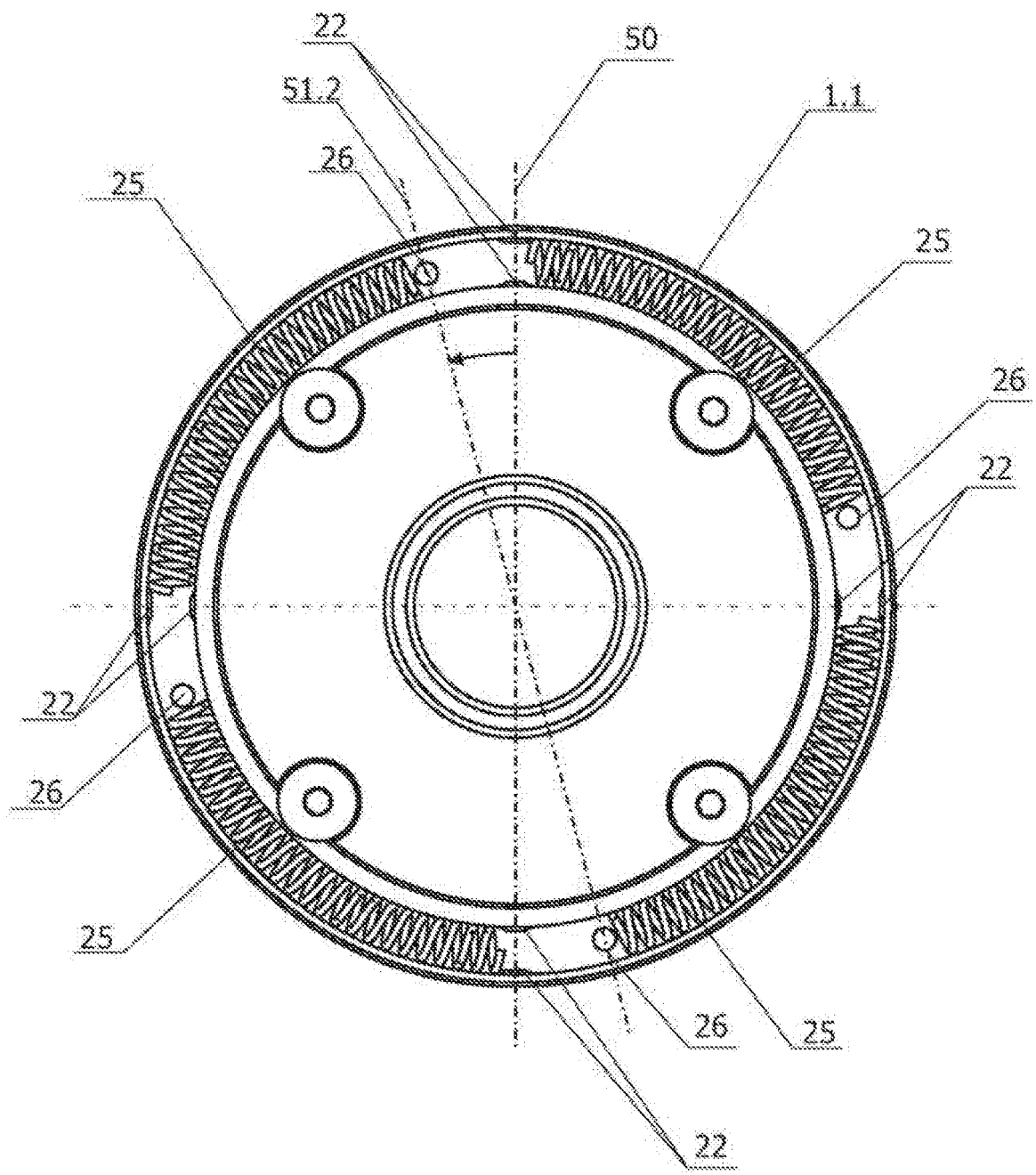

FIG. 66. Part 1 1.1 of Differential Housing 1 according to Option 2, Example 2, with Springs 25 laid in Groove 23, in "Locked" position 51.2. View from the side of Locking Elements 19. Pins 26 are shown relatively.

Figure 67:
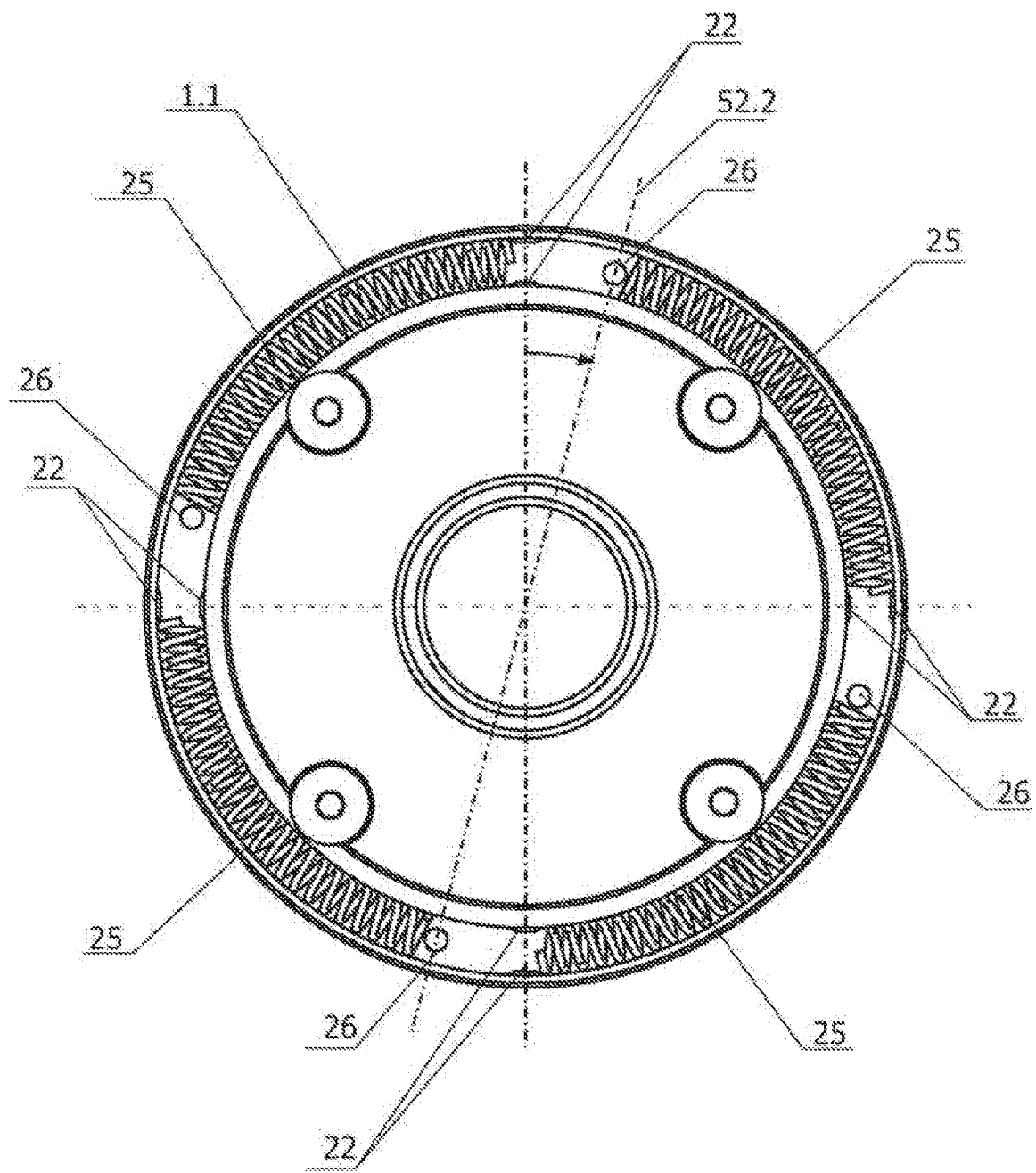

FIG. 67. Part 1 1.1 of Differential Housing 1 according to Option 2, Example 2, with Springs 25 laid in Groove 23, in "Locked" position 52.2. View from the side of Locking Elements 19. Pins 26 are shown relatively.

Figure 68:
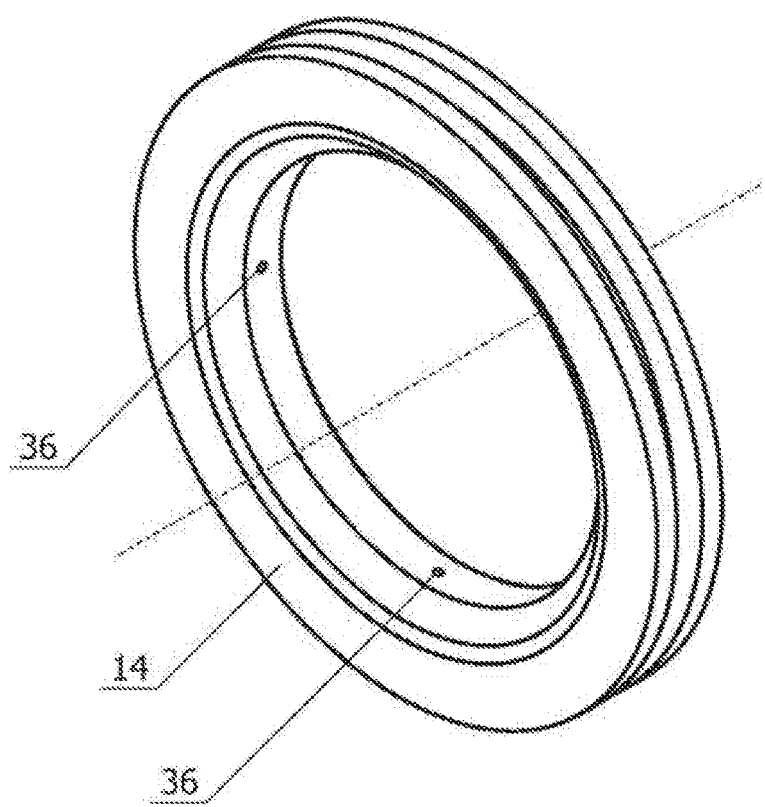

FIG. 68. Lock-Up Clutch 14 of the prototype.

Figure 69:
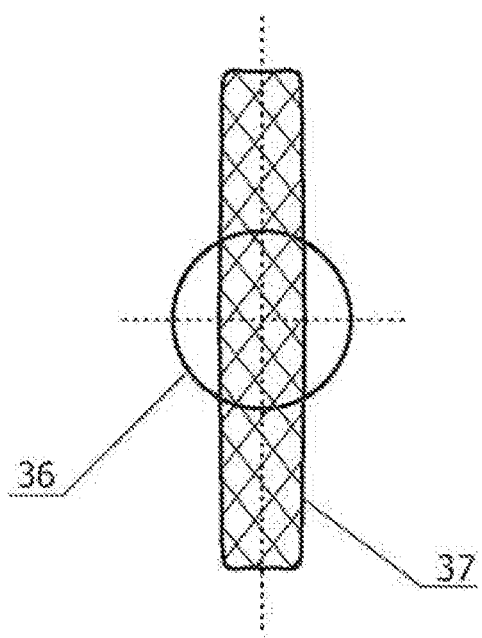

FIG. 69. Diagram for comparing contact spot areas in the claimed device and in the prototype.

FIG. 70. Data table of the modeling result of the claimed device features and the prototype.

Figure 71:
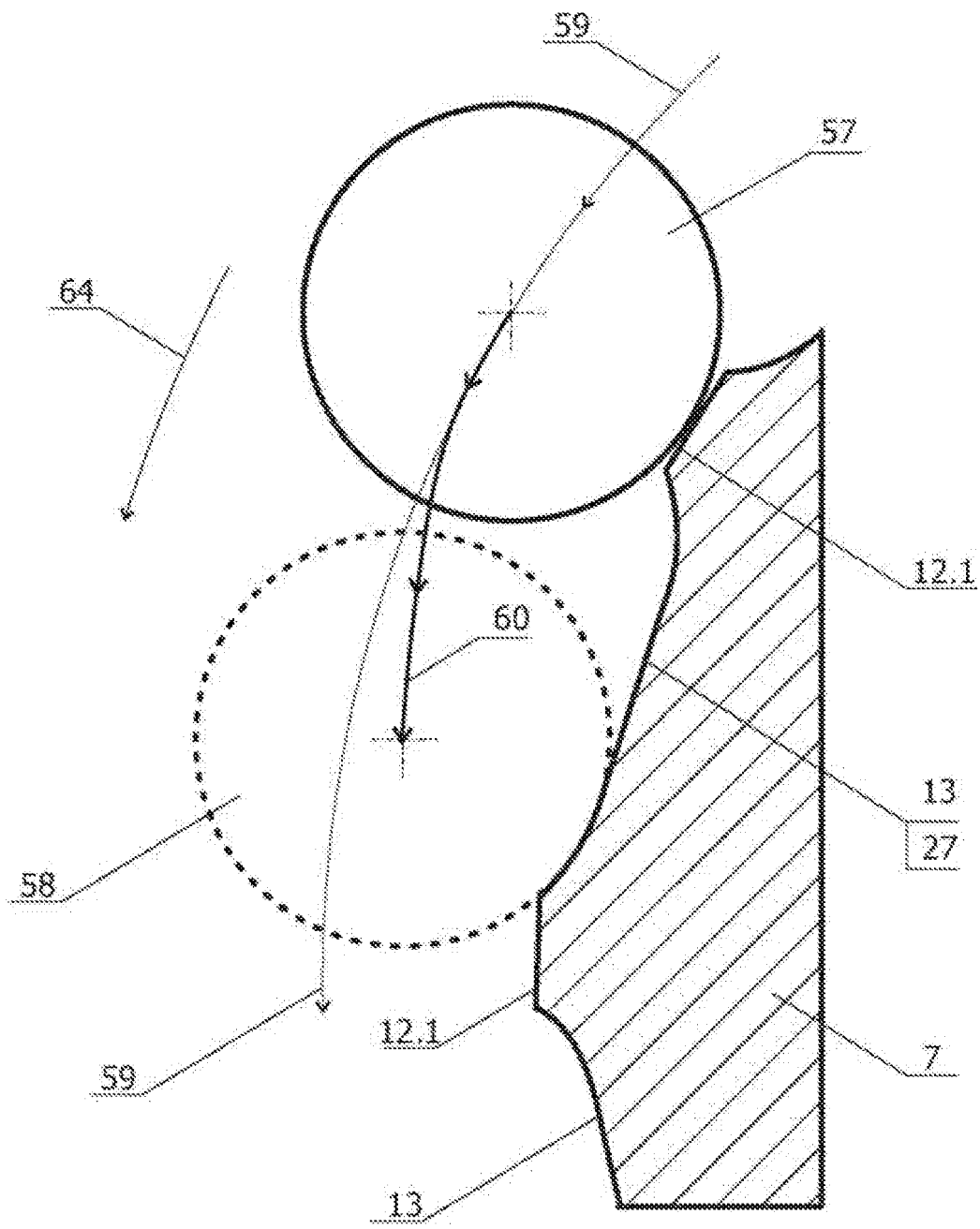

FIG. 71. The movement trajectories of Locking Elements 4 during switching the differential from "Unlocked" to "Locked" position for the claimed device.

Figure 72:
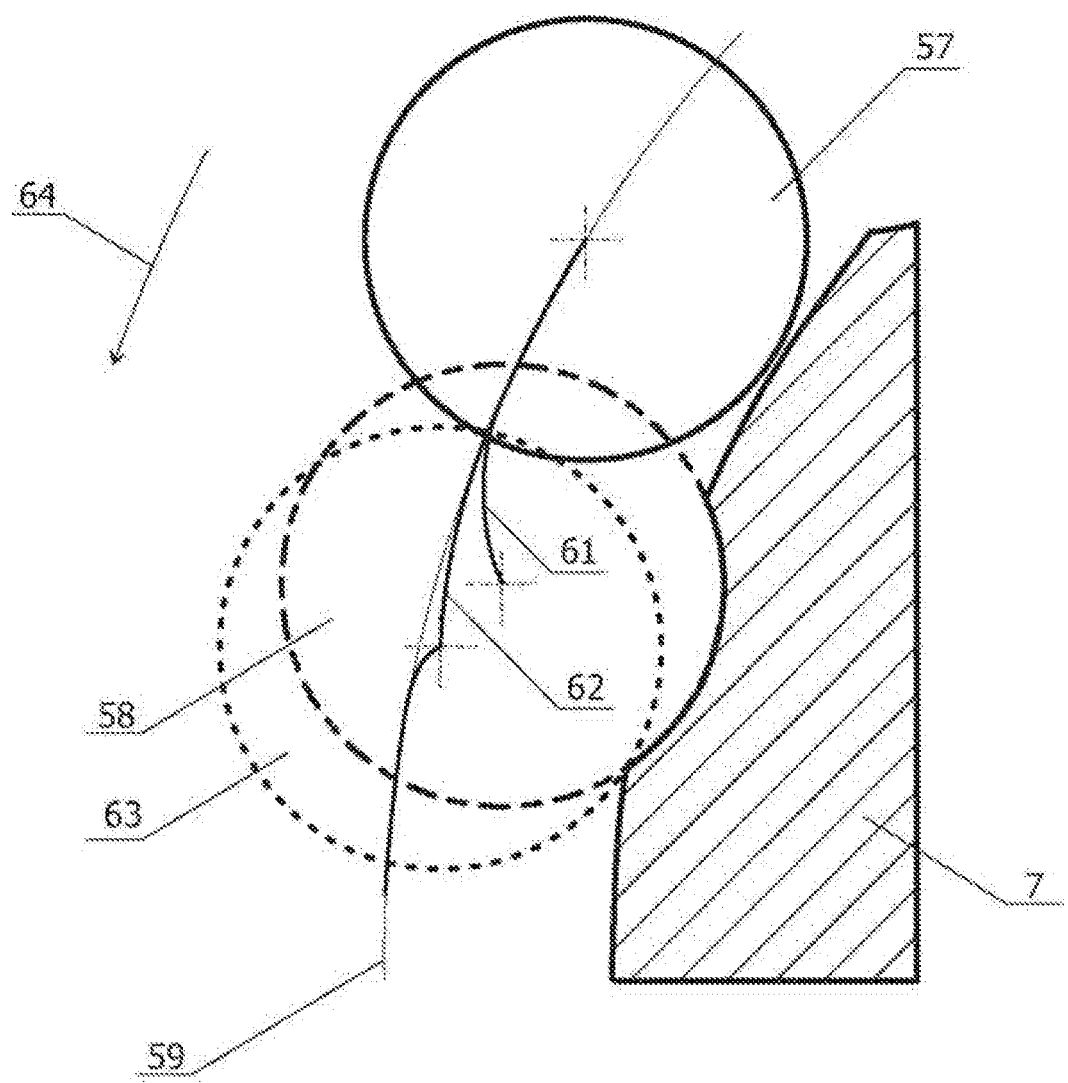

FIG. 72. The movement trajectories of Locking Elements 4 during switching the differential from "Unlocked" to "Locked" position for the prototype.

The list of positions on drawings' figures is provided in Appendix 1 to this description.

INVENTION IMPLEMENTATION

As an example, a locking device for a conical differential is shown in figures illustrating the claimed invention.

A specialist in this area will see from further description that the claimed locking device can be used in other types of vehicle differentials.

The examples provided of the claimed device structure are not limiting and exhaustive. They are stipulated only for a better understanding of the claimed technical solution.

In all possible cases, the same reference designations are used in drawings for identical or similar elements. For the sake of description brevity, the reference items or features executing the function described above may be described or not in relation to other drawings in which they appear.

Invention Implementation According to Option 1

The differential locking device of the vehicle according to Option 1 (FIG. 1) is integrated with Differential Housing 1. The differential comprises Differential Housing 1, Gears 7 and Semi-Axles 7.1 (semi-axles are not conventionally shown) located inside the housing and interacting with each other by Satellites 10, as well as Crosspiece 9 and Thrust Washers 11. The differential locking device is in one of the following positions: "Locked" or "Unlocked".

The differential locking device (not indicated in the drawing), is executed as items interacting with each other:

Ring Lock-Up Clutch 3 connected to Drive 15 and mounted on Differential Housing 1 with the possibility of moving along its outer surface along Differential Rotation Axis 33;

One or more Locking Elements 4 shaped as rotation bodies;

One or more through radial (i.e. oriented along the radius) Locking Holes 2 made in Differential Housing 1 and located at the same distance from each other. Locking Element 4 (FIG. 1) is inside each of Locking Holes 2 with the possibility of its movement in Locking Holes along Axes 34 (FIG. 18) of these holes and with the possibility of partial exit of Locking Elements 4 beyond Locking Holes 2 (FIG. 10, FIG. 11, FIG. 12, FIG. 13, FIG. 15);

One or more Recesses 13 of Gear 7 located at the same distance from each other, located on the surface of semi-axle Gear 7 (FIG. 3).

Ring Lock-Up Clutch 3 (FIG. 1, FIG. 7) is placed on Differential Housing 1 around Locking Holes 2 with Locking Elements 4. On Inner Surface 18 of Lock-Up Clutch 3, there are Grooves 5 that enlarge the contact spot area of the pair: Lock-Up Clutch 3—Locking Element 4. Grooves 5 of Lock-Up Clutch 3 according to Option 1 are hereinafter referred to as Grooves 5.1 of Type 1. They have, for example, three sections (FIG. 8). Each Groove 5.1 of Type 1 has a Locking Section 6.1 intended to fix Locking Element 4 in Recess 13 of Gear 7. The shape of Section 6.1 surface facilitates enlargement of Contact Spot Area 29.1 of the pair: Lock-Up Clutch 3—Locking Element 4 when the device is in "Locked" position (FIG. 9).

On the outer surface of semi-axle Gear 7, which is the rotation surface, Ring Groove 12 can be made oriented along Parallels 24 of the outer surface of semi-axle Gear 7 (FIG. 3). Ring Groove 12 consists of Bottom 12.1 and Walls 12.2 (FIG. 4, FIG. 6). Bottom 12.1 of Groove 12 is shaped as the cylinder lateral surface. The cylinder axis is coaxial with Differential Rotation Axis 33. Groove 12 is intended to increase the gap between the inner surface of Housing 1 and the boundaries of Recesses 13 of Gear 7.

At Bottom 12.1 of Groove 12, Recesses 13 of Gear 7 (FIG. 3) are made, each of which comprises the first 13.1 and the second 13.3 Spherical Surfaces, Toroidal Surface 13.2 connecting them and Cylindrical Surfaces 13.4, 13.5 and 13.6 (FIG. 4). The shape of Recesses 13 of Gear 7 corresponds to the shape of Locking Element 4, with the possibility of immersion in them of a part of Locking Element 4 volume.

Arrangement of Recesses 13 in Bottom 12.1 of Groove 12 of Gear 7 eliminates the contact of the protruding deformed Hardening Section 46 on Gear 7 (FIG. 19) with the differential housing in the prototype, due to the gap created by the depth of Groove 12. In its turn, it eliminates jamming of semi-axle Gear 7 in Differential Housing 1 and enables achieving the claimed technical result.

The number of Recesses 13 of Gear 7 corresponds to the number of Locking Elements 4. Locking Element 4 is made as a rotation body. For the described example of invention implementation according to Option 1, Locking Element is shaped as a ball with Radius $R_1$ and designated as 4.1 (FIG. 18). In this case, for the described example of invention Option 1, Locking Holes 2 are designated as 2.1. Locking Holes 2.1 are through and cylindrical. The diameter of each of them corresponds to Locking Element 4.1 diameter with the possibility of a loose fit of Locking Element 4.1 in Locking Hole 2.1. Axles 34 of Locking Holes 2.1 are axes of cylinders forming these holes; they intersect Differential Rotation Axis 33. They are perpendicular to it and are located in Plane 47, hereinafter referred to as the "operational plane", coinciding with Sectional Plane C-C in FIG. 14. Locking Elements 4.1 can move freely in Locking Holes 2.1 along Axles 34 of these holes, with a possibility of partial exiting the Locking Elements beyond the blocking holes. The centers of Locking Elements 4.1 are always located on Operational Plane 47.

The first 13.1 and second 13.3 Spherical Surfaces of Recesses 13 of Gear 7 are made with a radius equal to Radius $R_1$ of Locking Element 4.1 Toroidal Surface 13.2 of Recess 13 of Gear 7 is a part of the surface of the torus sector, the axis of which is aligned with Differential Rotation Axis 33. In this case, the radius of the circle that forms the torus is equal to Radius $R_1$ of Locking Element 4.1, and the angle of the specified torus sector is β (FIG. 5). Angle β is selected so that the adjacent Recesses 13 do not touch and do not overlap each other. The Toroidal Surface 13.2 of Recess 13 is intended to lengthen Recesses 13 along the parallel of Gear 7 outer surface. The parallel is located at the intersection line of the specified surface with Operational Plane 47, thereby increasing the coverage area with Recess 13 of Gear 7 of Bottom 12.1 of Groove 12 of Gear 7. It enables the claimed device to lock the differential at higher rotation speed of semi-axle Gear 7 relative to Differential Housing 1 compared to the speed of the prototype. It occurs during sharp turns of the vehicle on which the differential with the claimed device is mounted or when one of the wheels of this vehicle lose traction, which allows to achieve the claimed technical result (for more details, see the description of the claimed device according to Option 1).

Surfaces 13.4, 13.5 and 13.6 are intended to extend Recesses 13 of Gear 7 along Gear 7 rotation axis of the semi-axle coinciding with Differential Rotation Axis 33. Surface 1 13.4 of the extension of Recess 13 of Gear 7 is a sector of the lateral cylindrical surface with Angle β, for which the cylinder axis is aligned with Differential Rotation Axis 33, and the cylinder height is $L_1$, where $L_1$ is the value of the increase in the width of Recess 13 (FIG. 4, FIG. 6). Surface 2 13.5 of the expansion of Recess 13 of Gear 7 is a part of the lateral cylindrical surface for which the cylinder axis is parallel to Differential Rotation Axis 33 and passes through the sphere center of Surface 13.1. The cylinder height is $L_1$. Surface 3 13.6 of the expansion of Recess 13 of Gear 7 is a part of the lateral cylindrical surface for which the cylinder axis is parallel to Differential Rotation Axis 33 and passes through the sphere center of Surface 13.3, and the cylinder height is 1.1.

The presence of the first 13.4, second 13.5 and third 13.6 extension surfaces of Recess 13 of Gear 7 enables enhancement of admitted wearing values of Thrust Washer 11.1, at which the operability of the claimed device is maintained. The wear of this Thrust Washer results in Gear 7 displacement, and, therefore, to the displacement of Recess 13 of Gear 7 along Differential Rotation Axis 33 relative to Operational Plane 47 (FIG. 4). In the absence of the first 13.4, second 13.5 and third 13.6 surfaces of Recess 13 of Gear 7, the slightest wear of the Thrust Washer 11.1 requires its replacement, because the above displacement makes it impossible to fully immerse Locking Element 4.1 in Recess 13 of Semi-Axle Gear 7, and the differential lock is disabled. The presence of these surfaces compensates the wear of Thrust Washer 11.1 in thickness by $L_1$ value, where $L_1$ is the value of Recess 13 of Gear 7 (FIG. 4) enlargement. At the same time, the presence of the first 13.4, second 13.5 and third 13.6 expansion surfaces of Recess 13 of Gear 7 also compensates for manufacturing errors of differential elements. Thus, the presence of the first 13.4, second 13.5 and third 13.6 surfaces leads to an increase of the period of differential fail-safe functioning and to achievement of the claimed technical outcomes.

Surfaces 13.1, 13.2, 13.3, 13.4, 13.5 and 13.6 of Recesses 13 of Gear 7 are interconnected.

According to Option 1 of the claimed invention (FIG. 1), differential switching from one position to another occurs when Locking Elements 4.1 are moved to a particular position in Operational Plane 47 by their interaction with Lock-Up Clutch 3 that moves along Differential Rotation Axis 33 by Drive Mechanism 15 in one direction or another 35 (FIG. 10 and FIG. 11), from one fixed position to another. FIGS. 10 and 12 show the differential in "Unlocked" position, and FIGS. 11 and 14 show the differential in "Locked" position.

The number of grooves of the lock-up clutch, namely Type 1 Grooves 5.1, is equal to the number of Locking Holes 2.1. They are located on Surface 18 of Lock-Up Clutch 3 at the same distance from each other (FIG. 8). Locking Section 6.1 is shaped as a part of the lateral cylinder surface oriented along Differential Rotation Axis 33 and having a radius equal to R1, i.e. equal to the radius of Locking Element 4.1, which significantly increases Contact Spot Area 29.1 for a pair: "Locking Element 4.1—Lock-Up Clutch 3" (FIG. 9, FIG. 19, FIG. 20), compared to the prototype (FIG. 68). This structure allows the differential to operate at significantly high static and impact loads without the risk of mechanical damage to the material of Lock-Up Clutch 3 and the material of Locking Element 4.1, which allows achieving the claimed technical result.

Locking Plane 42 (FIG. 8, FIG. 9) is perpendicular to Differential Rotation Axis 33 and passes through the centers of all Contact Spot Areas 29.1. Locking Plane 42 in the "Locked" differential position is aligned with Operational Plane 47, and the centers of all Locking Elements 4.1 in this case are located in Locking Plane 42.

Unlocking Section 6.2 of Type 1 Groove 5.1 of Lock-Up Clutch 3 is intended to accommodate a part of Locking Element 4.1 when the diametrically opposite part of Locking Element 4.1 exits from Recess 13 of Gear 7 when the differential switches to the "Unlocked" position (FIG. 18). Unlocking Section 6.2 is shaped as a part of the lateral cylinder surface oriented along Differential Rotation Axis 33 and is of a radius equal to $R_2$ (FIG. 18), with $R_2 \geq R_1$. When the differential is in "Unlocked" position (FIG. 18), Unlocking Plane 43 is aligned with Operational Plane 47. The centers of all Locking Elements 4.1 are located in Plane 43, which is perpendicular to Differential Rotation Axis 33. Plane 43 intersects Unlocking Section 6.2 of Grooves 5.1 of Type 1 of Lock-Up Clutch 3 (FIG. 8, FIG. 9).

Transition Section 6.3 of Type 1 Groove 5.1 of Lock-Up Clutch 3 is transitional between Locking Section 6.1 and Unlocking Section 6.2. Transition Section 6.3 is a spherical surface smoothly connecting Sections 6.1 and 6.2 (FIG. 16).

Inner Surface 18 of Lock-Up Clutch 3 (FIG. 7) is made with Bevel Edge 44 with a curved surface (FIG. 8, FIG. 9) to exclude the contact of Rounding 49 of Lock-Up Clutch 3 on Housing 1.

In the unlocked position of the device, Locking Elements 4 located in Holes 2 of Housing 1 are partially located in Type 1 Grooves 5.1 of Lock-Up Clutch 3 on Unlocking Sections 6.2, and their diametrically opposite points touch Bottom 12.1 of Ring Groove 12 (FIG. 16, FIG. 18). During device operation, Locking Elements 4 are pressed by centrifugal force to the surfaces of Sections 6.2 of Type 1 Grooves 5.1 of Lock-Up Clutch 3 (FIG. 12, FIG. 13) and do not interfere with the rotation of Gear 7.

Lock-Up Clutch 3 according to Option 1 is equipped with Guide Pins 30 to prevent it from skewing and turning relative to Differential Housing 1 (FIG. 7), which contributes to achieving the claimed technical result.

Ring Groove 41 can be made on the outer surface of Lock-Up Clutch 3, Ring Groove 41 is intended to accommodate Fork 40 of Drive Mechanism 15.

Drive Mechanism 15 (FIG. 10, FIG. 11) can be mechanical or electrical. An example of Drive Mechanism 15 controlled by commands representing electrical signals is shown in FIG. 1, where: 38 is a solenoid, 39 is a rod, 40 is a fork, one end of which is fixed to Rod 39, and the other, the forked end, is located in Groove 41 made on the outer surface of Lock-Up Clutch 3.

Implementation of Invention According to Option 2

The differential locking device of the vehicle according to Option 2 (FIG. 2) is integrated with Differential Housing 1. In the diagram (FIG. 2) of the general view of the device, its elements are spatially spaced. The differential includes Differential Housing 1, Gears 7 and Semi-Axles 7.1 (semi-axles are not conventionally shown) located inside Housing 1 and interacting with each other by Satellites 10, as well as Crosspiece 9 and Thrust Washers 11.1, 11.2. The differential locking device is in one of the positions: "Locked" or "Unlocked".

The differential locking device (not indicated in the drawing) is made as interacting elements located relative to the central Differential Rotation Axis 33:

One or more Locking Elements 4 shaped as rotation bodies;

One or more through Locking Holes 2 made in Differential Housing 1, radially oriented with respect to Rotation Axis 33 and located at the same distance from each other. Inside each Locking Hole 2, there is Locking Element 4 (FIG. 2) with the possibility of its movement in Locking Holes along Axes 34 of these holes and with the possibility of partial exit of Locking Elements 4 beyond Locking Holes 2 (FIG. 34, FIG. 35, FIG. 39, FIG. 40, FIG. 43);

One or more Recesses 13 of Gear 7 (FIG. 3) located on the surface of semi-axle Gear 7 with the possibility of accommodating in each of them of a part of Locking Element 4 volume;

Ring Lock-Up Clutch 3 is placed on Differential Housing 1 around Locking Holes 2 with Locking Elements 4. On Inner Surface 18 of Lock-Up Clutch 3, there is one or more Groove 5 of Lock-Up Clutch 3, hereinafter referred to as Type 2 Grooves 5.2 of Example 1 and Example 3 (the profile of Type 2 Grooves 5.2 is shown in FIG. 25) or Type 3 Grooves 5.3 for Option 2 of Example 2 (the profile of Type 3 Grooves 5.3 is shown in FIG. 53).

Each Recess 13 of Gear 7 has a variable profile. The shape of Gear 7 recesses corresponds to the shape of Locking Element 4. Gear 7 recess is made with the possibility of immersing a part of Locking Element 4 volume into it. The number of recesses of Gear 7 corresponds to the number of Locking Elements 4, and, respectively, to the number of Locking Holes 2 in Differential Housing 1. The shape and purpose of Gear 7 recesses are described in detail in Examples 1-3 of device implementation according to Option 2.

On the outer surface of semi-axle Gear 7, which is the rotation surface, Ring Groove 12 can be made oriented along Parallels 24 of the outer surface of semi-axle Gear 7 (FIG. 3). The shape and purpose of Ring Groove 12 corresponds to the description given in the description of Option 1 (FIG. 3).

Lock-up Clutch 3 is connected to Electromagnetic Drive 17 (FIG. 2) and mounted on Differential Housing 1 with the possibility of turning it relative to Differential Rotation Axis 33 and with the possibility of stopping its rotation in Fixed Position 1 "Unlocked" 50 (FIG. 2), as well as in Fixed Position 2 51 or Fixed Position 3 52 "Locked" (FIG. 2). In this case, the structure of the claimed device prevents Lock-up Clutch 3 from moving along Differential Rotation Axis 33.

According to Option 2 of the claimed invention (FIG. 2), differential switching from one position to another occurs when Locking Elements 4 are moved to a particular position in Operational Plane 47, along Axes 34 lying in it (FIG. 35, 39), due to their interaction with Lock-Up Clutch 3 rotated around Differential Rotation Axis 33 relative to Differential Housing 1 in a clockwise or counterclockwise direction, and stopping its rotation in Fixed Position 1 "Unlocked" 50 or in one of two fixed positions "Locked": 51, 52, by Electromagnetic Drive 17 (FIG. 2) turning on or off. For example, FIG. 34 shows the differential in "Unlocked" position, and FIG. 39 shows the differential in "Locked" position.

According to Option 2, Electromagnetic Drive 17 is intended to control the status of the differential. An electromagnet can be used as Electromagnetic Drive 17, which provides the necessary force for the operation of the locking mechanism. When electric voltage is applied via Electric Voltage Connector 53 (FIG. 2) to Electromagnetic Drive 17, the differential switches to "Locked" position. When the voltage is switched off according to the relevant algorithm, the differential switches to "Unlocked" position. Electromagnetic Drive 17 is located on Differential Housing 1 next to Lock-Up Clutch 3. It is made with Stopper 16 that prevents Electromagnetic Drive 17 rotation around Differential Rotation Axis 33 relative to Differential Crankcase 55, which is possible due to Differential Housing 1 rotation. With respect to Differential Crankcase 55, Stopper 16 (FIG. 38) can move freely along Differential Rotation Axis 33. In directions perpendicular to Differential Rotation Axis 33, Stopper 16 movement is blocked by Stopper Detent 54, attached to Differential Crankcase 55 with Rigid Mechanical Connection 56, for example, by welding, to Differential Crankcase 55. Because Stopper 16 is rigidly fixed to Electromagnetic Drive 17, then this Electromagnetic Drive 17, respectively, can move along Differential Rotation Axis 33 and cannot rotate around Differential Rotation Axis 33 relative to Differential Crankcase 55. The movement of Electromagnetic Drive 17 along Differential Rotation Axis 33 is restricted on one side by Lock-Up Clutch 3, and on the other side by Stopper Elements 19.

The following are examples of specific implementation of the claimed device according to Option 2. These examples are not restrictive and exhaustive, they are provided only for better understanding of the claimed technical solution.

Example 1

The differential locking device of a vehicle according to Example 1 is made similarly to the above description.

Locking Element 4 is shaped as a rotation body. For the described example of invention implementation according to Option 2 of Example 1, Locking Element is shaped as a ball with Radius $R_1$ and designated as 4.1 (FIG. 35). In this case, for the described example according to Option 2 of Example 1 of the invention, Locking Holes 2 are designated as 2.1. The shape description of interacting elements, namely, Locking Holes 2.1, as well as Recesses 13 of Gear 7 are provided in detail in the description of the device according to Option 1 and in FIG. 4 and FIG. 6. In this example, the gear recess should be seen as indicated by Position 13.

Locking Holes 2.1 are located radially on Differential Housing 1. They are made through and cylindrical. The radius of each of them corresponds to Radius $R_1$ of Locking Element 4.1, with the possibility of a loose fit of Locking Element 4.1 in Locking Hole 2.1. Axles 34 of Locking Holes 2.1 are axes of cylinders forming these holes; they intersect Differential Rotation Axis 33. They are perpendicular to it and are located in Plane 47, hereinafter referred to as the "operational plane", coinciding with Sectional Plane H1-H1 in FIG. 32. Locking Elements 4.1 can move freely in Locking Holes 2.1 along Axles 34 of these holes, with a possibility of partial exiting the Locking Elements beyond the locking holes. The centers of Locking Elements 4.1 are always located on Operational Plane 47.

Lock-Up Clutch 3 is equipped with locking pins of various lengths, for example, two long Pins 20 and two short Pins 26 (FIG. 23). Long Pins 20 are intended to lock Lock-Up Clutch 3 in one of two fixed positions—in Fixed Position 2 51.1 or in Fixed Position 3 52.1 (FIG. 2). They lock the differential when Electromagnetic Drive 17 is switched on, and to return Lock-Up Clutch 3 to Fixed Position 1 50 (FIG. 2) when Electromagnetic Drive 17 is turned off to unlock the differential. Short Pins 26 are intended to return Lock-up Clutch 3 to Fixed Position 1 50 when Electromagnetic Drive 17 is switched off to unlock the differential.

Lock-up Clutch 3 (FIG. 2, FIG. 23) is placed on Differential Housing 1 around Locking Holes 2.1 with Locking Elements 4.1. On Inner Surface 18 of Lock-up Clutch 3, there are Grooves 5, which significantly increases Contact Spot Area 29.1 for a pair: "Lock-up Clutch 3—Locking Element 4.1". Grooves 5 of Lock-up Clutch 3 for Option 2 of Example 1, hereinafter referred to as "Type 2 Grooves 5.2", have, for example, three sections, namely: Locking Section 31.1, Unlocking Section 31.2 and Technological Section 31.3 (FIG. 23, FIG. 25, FIG. 26, FIG. 27, FIG. 28). Moreover, Locking Section 31.1 is intended to fix Locking Element 4.1 in Recess 13 of Gear 7 when the differential locking device is in "Locked" position (FIG. 37, FIG. 40). Contact Spot Area 29.2 enlargement for a pair: "Lock-Up Clutch 3—Locking Element 4.1" is ensured by compliance of Section 31.1 surface shape to the shape of the rotation surface of Locking Element 4.1 The number of Type 2 Grooves 5.2 is equal to the number of Locking Holes 2.1 in Part 1 of Differential Housing 1.1. Adjacent Grooves 5.2 are connected to each other. The view of the end face of Lock-Up Clutch 3 from the side of Pins 20 and 26 is shown in FIG. 25 and FIG. 26. The dotted line conventionally shows the profile of Type 2 Grooves 5.2 of Lock-Up Clutch 3.

For Example 1, according to Option 2, where Locking Element 4.1 is used in the shape of a ball, Locking Section 31.1 Type 2 Groove 5.2 has the shape of a part of the surface of an open torus. The torus axis is aligned with Differential Rotation Axis 33, and the plane in which the guiding circle of the torus lies on Operational Plane 47. The radius of the forming circle of the torus is equal to $R_1$, i.e. it is equal to the radius of Locking Element 4.1 (FIG. 37), which significantly increases the length. Therefore, Contact Spot Area 29.2 enlarges for a pair: "Locking Element 4.1—Lock-Up Clutch 3" (FIG. 29), compared to the prototype (FIG. 68). In its turn, it enables differential operation at significantly high static and impact loads without the risk of mechanical damage to the material of Lock-Up Clutch 3 and to the material of Locking Elements 4.1, which facilitates achieving the claimed technical result. Depth $L_6$ (FIG. 26) of Locking Section 31.1 of Type 2 Groove 5.2 is selected depending on the required Contact Spot Area 29.2 at a given load.

Unlocking Section 31.2 of Type 2 groove has, for example, the shape of a part of the surface of a closed torus. The torus axis is parallel to Differential Rotation Axis 33. The outer radius of Torus $R_3$ (FIG. 35) is longer or equal to $R_1$. The radius of the torus-forming circle is longer or equal to $R_1$, where $R_1$ is the radius of Locking Element 4.1. The range depends on the processing tool, and it is not the subject of the invention. The torus-guiding circle lies in Operational Plane 47 (FIG. 26). At the same time:

$$L_7 = L_8 + L_6, \text{ where:}$$

$L_6$—the depth of Locking Section 31.1 for Type 2 groove;
$L_7$—the depth of Unlocking Section 31.2 for Type 2 groove;
$L_8$—the depth of Recess 13 of Gear 7 (FIG. 5).

Unlocking Section 31.2 for Type 2 Groove 5.2 of Lock-Up Clutch 3 is intended to accommodate a part of Locking Element 4.1 in it when Locking Element 4.1 exits Recess 13 of Gear 7 when the differential is in "Unlocked" position (FIG. 32, FIG. 33, FIG. 34, FIG. 35).

Technological Section 31.3 for Type 2 Groove 5.2 of Lock-Up Clutch 3 is used when assembling the differential. Technological Section 31.3 is a part of the lateral surface of the cylinder oriented along Differential Rotation Axis 33 with a radius equal to $R_1$ (FIG. 27).

Inner surface 18 of Lock-Up Clutch 3 is made with Bevel Edge 44 with a curved surface (FIG. 28, FIG. 30, FIG. 33, FIG. 37) to exclude the contact of Lock-Up Clutch 3 with Rounding 49 on Part 1 of Housing 1.1.

In the unlocked position of the device, Locking Elements 4.1 located in Locking Holes 2.1 of Housing 1 are partially located in Type 2 Groove 5.2 of Lock-Up Clutch 3 in Unblocking Sections 31.2. Their diametrically opposite points touch Bottom 12.1 of Ring Groove 12. When the device is operating, Locking Elements 4.1 are pressed due to centrifugal force to the surfaces of Unblocking Sections 31.2 for Type 2 Groove 5.2 (FIG. 34, FIG. 35) and do not interfere with the rotation of Gear 7.

In the locked position of the device, Locking Elements 4.1 located in Locking Holes 2.1 of Housing 1.1 are partially located in Type 2 Groove 5.2 of Lock-Up Clutch 3 in Locking Sections 31.1, and their diametrically opposite parts are located in Recesses 13 of Gear 7 (FIG. 39, FIG. 40).

The end surface of Differential Housing 1 on the side of Lock-Up Clutch 3 is made with Ring Groove 23 (FIG. 42) containing Cutouts 21 and Protrusions 22 that are arranged in pairs on different walls of Groove 23. The number of Cutouts 21 is equal to the number of long locking Pins 20, and the number of pairs of protrusions is equal to the number of fixing long 20 and short Pins 26 (FIG. 23, FIG. 42, FIG. 44). Ring Groove 23 is intended to accommodate Return Springs 25 in it (FIG. 45, Pins 20 and 26 are shown conditionally). The number of Springs 25 is equal to the number of locking Pins 20 and 26. Springs 25 are intended to return Lock-Up Clutch 3 to the original fixed Position 50 when the differential is unlocked. Cutouts 21, assisted by long Pins 20, are intended to stop the rotation of Lock-Up Clutch 3, in one of two fixed Positions 51.1 or 52.1 (FIG. 2, FIG. 46, FIG. 47). In each of them the differential is locked when Electromagnetic Drive 17 is switched on.

Example 2

The differential locking device of a vehicle according to Example 2 is made similarly to Example 1. Locking Element 4 in this example is shaped as a rotation body and made as a ball with Radius $R_1$; it is designated as 4.1 (FIG. 35).

The shape description of interacting elements, namely, Locking Holes 2.1, Recesses 13 of Gear 7 are provided in detail in the description of the device according to Option 1 and in FIG. 4, FIG. 6 and in Example 1 of Option 2. In the present example, the gear recess should be seen as indicated by Position 13.

Unlike the device according to Example 1, Lock-Up Clutch 3 is equipped with locking Pins 26, for example, with four pins (FIG. 52), intended to interact Lock-Up Clutch 3 with the return Springs 25, namely, to return Lock-Up Clutch 3 to starting Position 50 (FIG. 2) when Electromagnetic Drive 17 is turned off to unlock the differential.

Ring Lock-Up Clutch 3 (FIG. 2, FIG. 52) is placed on Differential Housing 1 around Locking Holes 2.1 with Locking Elements 4.1. On Inner Surface 18 of Lock-Up Clutch 3, there are Grooves 5, allowing to enlarge the contact spot area of the pair: "Lock-Up Clutch 3—Locking Element 4.1". Grooves 5 of Lock-Up Clutch 3 in this example are further referred to as Type 3 Grooves 5.3, each Groove 5.3 contains, for example, two Locking Sections 32.1, Unlocking Section 32.2, two sections 32.3 stops and Technological Section 32.4 (FIG. 55, FIG. 56, FIG. 57). Two Locking Sections 32.1 are intended to fix Locking Element 4.1 in Recess 13 of Gear 7 when the differential locking device is in the "Locked" position (FIG. 36, FIG. 61). The enlargement of Contact Spot Area 29.3 of the pair: "Lock-Up Clutch 3—Locking Element 4.1" is ensured by surface shape compliance of each Section 32.1 to the shape of rotation surface of Locking Element 4.1

The number of Type 3 Grooves 5.3 of Lock-Up Clutch 3 is equal to the number of Locking Holes 2.1 in Part 1 of Housing 1.1 and they are located at the same distance from each other (FIG. 52). The view of the end of Lock-Up Clutch 3 from the side of Pins 26 is shown in FIG. 53 and FIG. 54. The dotted line conventionally shows the profile of Type 3 Grooves 5.3 of Lock-Up Clutch 3. In Example 2, according to Option 2, Type 3 Grooves 5.3 of the lock-up clutch are made with the possibility of interaction with locking elements, which are a ball with Radius $R_1$—Locking Element 4.1.

For Example 2, Section 32.1 locking Groove 5.3 of Type 3 of Lock-Up Clutch 3 has the shape of a part of an open torus surface. The torus axis is aligned with Differential Rotation Axis 33, and the plane in which the torus guiding circle is located lies on Operational Plane 47. Moreover, the radius of torus-forming circle is equal to $R_1$, i.e. it is equal to the radius of Locking Element 4.1. It significantly increases the length, and therefore, Contact Spot Area 29.3 for the pair: "Locking Element 4.1—Lock-Up Clutch 3" (FIG. 58) compared to the prototype (FIG. 68). In its turn, it allows the differential to operate at significantly high static and impact loads without the risk of mechanical damage to the material of Lock-Up Clutch 3 and the material of Locking Elements 4.1, which allows achieving the claimed technical result. Section 32.1 is located between Section 32.2 and Section 32.3, and its length should be greater than the width of Contact Spot 29.3 located on it. Contact Spot 29.3 has the width equal to 1.4 at the maximum load, to prevent crumpling of the border between Section 32.1 and Section 32.2. Depth 16 of Locking Section 32.1 for Type 3 groove (FIG. 54) is selected depending on the required Contact Spot Area 29.3 under such load. At the same time, for reliable locking, the distance from Surface 13.4 lying between Surfaces 13.2 of Recess 13 of Gear 7 to the intersection line of Section 32.1 with Operational Plane 47 should be equal to $2R_1$, i.e. to the diameter of Locking Element 4.1

In this case, Unlocking Section 31.2 for Type 3 Grooves 5.3 is intended to accommodate a part of Locking Element 4.1 in it when Locking Element 4.1 exits Recess 13 when the differential is in "Unlocked" position (FIG. 32, FIG. 33, FIG. 59, FIG. 60).

Unlocking Section 31.2 for Type 3 groove has, for example, the shape of a part of the surface of a closed torus. The torus axis is parallel to Differential Rotation Axis 33. The outer radius of Torus $R_3$ (FIG. 60) is longer or equal to $R_1$. The radius of the torus-forming circle is longer or equal to $R_1$, where $R_1$ is the radius of Locking Element 4.1. The range depends on the processing tool, and it is not the subject of the invention. The torus-guiding circle lies in Operational Plane 47. At the same time (FIG. 26):

$L_7 = L_8 + L_6$, where:

$L_6$—the depth of Locking Section 31.1 for Type 2 groove;
$L_7$—the depth of Unlocking Section 31.2 for Type 2 groove;
$L_8$—the depth of Recess 13 of Gear 7 (FIG. 5).

The radius of the torus-forming circle is equal to $R_1$, where $R_1$ is the radius of Locking Element 4.1. Moreover, the torus-guiding circle lies in Operational Plane 47, in which Axes 34 of hole-forming cylindrical surfaces of Locking Holes 2.1 are located. $L_7$ is the depth of immersing the torus surface under Surface 18 of Lock-Up Clutch 3 (FIG. 54) $Z_7$ is selected so that the distance from Bottom Surface 12.1 of Gear 7 groove to the intersection line of Section 32.2 of Operational Plane 47 in the center of this section would be equal to $2R_1$, i.e. equal to the diameter of Locking Element 4.1.

Two Limit Stop Sections 32.3 of Type 3 Groove 5.3 are intended to stop the rotation of Lock-Up Clutch 3 relative to Housing 1.1 when the differential is locked, and one of the Sections 32.3 restricts rotation in one direction, and the other Section 32.3—in the other direction. Sections 32.3 are arranged symmetrically relative to Section 32.2. They are made, for example, in the shape of a part of the surface of a closed torus. The torus axis is parallel to Differential Rotation Axis 33 (FIG. 58). The torus outer radius $R_4$ corresponds to Radius $R_1$ of Locking Element 4 or more. The range depends on the processing tool, and it is not the subject of the invention. The radius of torus-forming circle is equal to $R_1$, where $R_1$ is the radius of the Locking Element 4. The plane in which the torus-guiding circle is located lies in Operational Plane 47.

Technological Section 32.4 of Type 3 Groove 5.3 of Lock-Up Clutch 3 is used for differential assembly and disassembly. Section 32.4 is, for example, a part of the cylinder lateral surface oriented along Differential Rotation Axis 33. Section 32.4 has a radius equal to $R_1$ or more (FIG. 55). The depth of Section 32.4 should allow assembly and disassembly of the differential without effort.

The end surface of Differential Housing 1 on the side of Lock-Up Clutch 3 is made with Ring Groove 23 (FIG. 64) containing paired Projections 22. The number of projection pairs is equal to the number of Pins 26 (FIG. 64). The ring groove is intended to accommodate return Springs 25 in it (FIG. 65, fixing Pins 26 are shown conditionally). The number of Springs 25 is equal to the number of locking Pins 26. Springs 25 are intended to return Lock-Up Clutch 3 to the first fixed Position 50 when unlocking the differential (FIG. 65).

Example 3

The differential locking device of a vehicle according to Example 3 is made similarly to Example 1. Locking Element is shaped as a cylindrical roller with Radius $R_1$, hereinafter referred to as 4.2 (FIG. 48). The useful length of such a cylindrical roller is Ly (GOST 22696-2013). The roller is made with Bevel Edge 28 with a nominal size of $R_5$.

Locking Holes 2, hereinafter, according to this example, Locking Holes 2.2. They are made in Differential Housing 1 (FIG. 43) as through holes, corresponding to the shape of Locking Element 4.2 that has a rectangular longitudinal section, with the possibility of a loose fit of Locking Element 4.2 in them. In this case, Axes 34 of Locking Holes 2.2 intersect Differential Rotation Axis 33 perpendicular to it; they are located in Operational Plane 47 (FIG. 50). Locking Elements 4.2 can move freely in Locking Holes 2.2 along Axes 34 of these holes, with a possibility of partial exiting the Locking Elements beyond Locking Holes 2.1. In FIG. 43, in one of Locking Holes 2.2, Locking Element 4.2 is shown partially protruding above the surface of Housing 1, which corresponds to the position of Locking Element 4.2 in the "Locked" position of the claimed device.

In this example, the gear recess should be regarded as designated by Position 27 in FIG. 40. Recesses 27 of Gear 7 are made with the possibility of interaction with Locking Element 4.2, which is a cylindrical roller. The quantity, name and intended use of Recess 27 surfaces (FIG. 49, 50) are similar to Recesses 13 previously described in Option 1 (FIG. 4), namely: the first Spherical Surface 27.1 of Recess 27, Toroidal Surface 27.2 of Recess 27, the second Spherical Surface 27.3 of Recess 27, the first Surface 27.4 of Recess 27 extension along Rotation Axis 33, the second Surface 27.5 of Recess 27 extension along Rotation Axis 33, the third surface 27.6 of Recess 27 extension along Rotation Axis 33 (FIG. 50). In this case, the width $L_{10}$ of the first Extension Surface 27.4, the second Extension Surface 27.5 and the third Extension Surface 27.6 of Recess 27 is equal to the sum of $L_{10}=L_9+L_1$, where Ly is the useful length of Locking Element 4.2, and L, is the value of width increase in Recess 27 of Gear 7, which determines the permissible wear of Thrust Washer 11.1 (FIG. 4, FIG. 51).

Similarly to Example 1, Lock-Up Clutch 3 is equipped with locking pins of different lengths, for example, two long Pins 20 and two short Pins 26 (FIG. 23). The long Pins 20 are intended to lock Lock-Up Clutch 3 in one of two fixed positions—in the second 51.1 or in the third 52.1 (FIG. 2), which locks the differential when Electromagnetic Drive 17 is switched on. It also returns Lock-Up Clutch 3 to the first Fixed Position 50 (FIG. 2) when Electromagnetic Drive 17 is turned off to unlock the differential. The short Pins 26 are intended to return Lock-Up Clutch 3 to the first Fixed Position 50 when Electromagnetic Drive 17 is switched off to unlock the differential.

On Inner Surface 18 of Lock-Up Clutch 3, there are Grooves 5, allowing to increase the Contact Spot Area of the pair: "Lock-Up Clutch 3—Locking Element 4.2". The grooves of Lock-Up Clutch 3, according to Option 2 in Example 3, are hereinafter referred to as "Type 2 Grooves 5.2", similar to Example 1, consisting, for example, of sections of three types, namely: Section 31.1 of locking Groove 5.2 of Type 2 Lock-Up Clutch 3, Section 31.2 of the unlocking Groove 5.2 of Type 2 Lock-Up Clutch 3 and Section 31.3 of technological Groove 5.2 of Type 2 Lock-Up Clutch 3 (FIG. 30).

Locking Section 31.1 of Type 2 Groove 5.2 of Lock-Up Clutch 3 is intended to fix Locking Element 4.2 in Recess 27 of Gear 7 when the differential locking device is in the "Locked" position (FIG. 40). Locking Section 31.1 of Type 2 Groove 5.2 of Lock-Up Clutch 3 corresponds to the shape of the rotation surface of Locking Element 4.2. The locking Section 31.1, Unlocking Section 31.2 and the technological Section 31.3 of Type 2 Groove 5.2 of Lock-Up Clutch 3 are made taking into account the shape of Locking Element 4.2 made as a cylindrical roller (FIG. 30). Contact Spot Area 29.4 for pairs: "Locking Element 4.2—Lock-up Clutch 3" has the form shown in FIG. 31.

The inner Surface 18 of Lock-Up Clutch 3, as in Example 1, is made with Bevel Edge 44 with a curved surface (FIG. 28, FIG. 30, FIG. 33, FIG. 37) to exclude the contact of Rounding 49 of Lock-Up Clutch 3 on Housing 1.1.

In the unlocked position of the device, Locking Elements 4.2 located in Locking Holes 2.2 of Housing 1 are partially located in Type 2 Groove 5.2 of Lock-Up Clutch 3 in Unlocking Sections 31.2, and their diametrically opposite points touch Bottom 12.1 of Ring Groove 12. During device operation, Locking Elements 4.2 are pressed by centrifugal force to the surfaces of Unlocking Sections 31.2 of Type 2 grooves (FIG. 34, FIG. 35), and do not interfere with Gear 7 rotation.

In the locked position of the device, Locking Elements 4.2 located in Locking Holes 2.2 of Housing 1 are partially located in Type 2 Groove 5.2 of Lock-Up Clutch 3 in Locking Sections 31.1, and their diametrically opposite parts are located in Recesses 27 of Gear 7 (FIG. 39, FIG. 40).

The end surface of Part 1 of Differential Housing 1.1., on the side of Lock-Up Clutch 3, as in Example 1, is made with Ring Groove 23 (FIG. 42) containing Cutouts 21 and Projections 22 arranged in pairs on different walls of Groove 23. The number of Cutouts 21 is equal to the number of long locking Pins 20, and the number of pairs of projections is equal to the number of fixing long 20 and short 26 pins (FIG. 23, FIG. 42, FIG. 44). Ring Groove 23 is intended to accommodate Return Springs 25 in it (FIG. 45, Pins 20 and 26 are shown conventionally). The number of Springs 25 is equal to the number of locking Pins 20 and 26. Springs 25 are intended to return Lock-Up Clutch 3 to the original Fixed Position 50 when the differential is unlocked. Cutouts 21, with the help of long Pins 20, are intended to stop the rotation of Lock-Up Clutch 3, in one of two Fixed Positions 51.1 or 52.1 (FIG. 2, FIG. 46, FIG. 47). In each of these positions, the differential is locked when Electromagnetic Drive 17 is switched on.

It should be clear that the elements described for any example can be combined in any appropriate way in various examples, as long as the context does not clearly prescribe something else. While several examples in this description have been disclosed in detail, it will be obvious to specialists in this technology area that the examples disclosed here can be modified, therefore, they are not restrictive.

Operation

If the differential is in "Unlocked" position, the first Gear 7 and second Gear 7.1 can freely rotate relative to Differential Housing 1 in any direction. If the differential is in the "Locked" position, Gear 7 and 7.1 are fixed relative to Housing 1 with an angular backlash equal to the angle β (FIG. 5), and rotate synchronously simultaneously with Differential Housing 1, i.e. they are stationary relative to Housing 1, unless the above backlash is taken into account, The presence of backlash does not affect the device operation due to its insignificant size.

The operation of the claimed device as either of the Options assumes a quick and reliable switching of the differential position from the "Unlocked" position to the "Locked" position and vice versa, both during vehicle parking and during its movement. Moreover, these switches are made by mechanical switching on and off of a rigid mechanical coupling (mechanical contact) between differential Semi-Axle Gear 7 and Differential Housing 1. The specified rigid mechanical connection is a mechanical gear engagement with Locking Elements 4 connected to Differential Housing 1 and having the ability to move along Axes 34 of Locking Holes 2 both towards Gear 7 and away from it. The movement of Locking Elements 4 towards Gear 7 leads to switching on of a rigid mechanical connection between Semi-Axle Gear 7 and Differential Housing 1 due to the engagement of these elements for the recesses of Gear 7, which leads to the differential switching to "Locked" position. The movement of Locking Elements 4 along Axes 34 of Locking Holes 2 away from Semi-Axle Gear 7 leads to the disconnection of the specified rigid mechanical connection, i.e. to switching of the differential to "Unlocked" position. The specified movement of Locking Elements 4 is done with Lock-Up Clutch 3 due to its movement along the surface of Differential Housing 1. Locking Elements 4 are partially located in Grooves 5 of Lock-Up Clutch 3. Since each Groove 5 has sections of different depths, then Locking Elements 4, getting on one or another section, move along the depth and, consequently, along the axes of Locking Holes 34, which leads to switching on and off of the rigid mechanical connection between Semi-Axle Gear 7 and Differential Housing 1, hence its locking and unlocking. The specified movement of Lock-Up Clutch 3 can be done when one of two control commands is received from the outside: "Lock", "Unlock". These commands can be received using various mechanical devices, hydraulic drives, electrical signals, etc.

Operation of the Claimed Device According to Option 1

In the example in FIG. 1, control commands are sent to Drive Mechanism 15. In this example, commands are used as electrical signals coming to Solenoid 38, which is part of Drive Mechanism 15.

In Option 1 of this invention, Lock-Up Clutch 3 movement along Differential Housing 1 while locking or unlocking the differential, is linear Lock-Up Clutch 3 movement along Differential Rotation Axis 33.

In the example in FIG. 1, control commands are sent to Drive Mechanism 15. In this example, commands are used as electrical signals coming to Solenoid 38, which is part of Drive Mechanism 15. When a new command is received, Rod 39 moves in Direction 35, depending on the command, from one fixed position to another, as shown in FIG. 10, FIG. 11, respectively, left/right. Thus, if the differential is in "Unlocked" position, and "Lock" command is received, then Rod 39, which was previously in the first fixed position, moves to the right to the second fixed position. If the differential is in "Locked" position, and "Unlock" command is received, then Rod 39, which was previously in the second fixed position, moves to the left to the first fixed position.

If the differential is in "Unlocked" position, and "Lock" command is sent to the claimed device, Lock-Up Clutch 3 moves to the rightmost position, in which its Locking Plane 42 is aligned with Operational Plane 47 (FIG. 11, FIG. 17). Locking Elements 4 during the movement of Lock-Up Clutch 3 are pushed by the surface of transition Section 6.3 of Type 1 Groove 5.1 into Recesses 13 of Gear 7. With further movement of Lock-Up Clutch 3, Locking Elements 4 get on Locking Sections 6.1 of Type 1 Groove 5.1. After termination of Lock-Up Clutch 3 movement, Locking Plane 42 (FIG. 8) and Operational Plane 47 are combined, and Locking Elements 4 are fixed by Sections 6.1 of Type 1 Groove 5.1 in Recesses 13 of Gear 7. This situation is shown in figures FIG. 14, FIG. 15, FIG. 17 and FIG. 19. In this position of Lock-Up Clutch 3, Gear 7 has a limited possibility of turning relative to Housing 1, because it will be prevented by the first 13.1 and second 13.3 spherical surfaces of Recesses 13 of Gear 7. Thus, the differential was switched to "Locked" position.

At the same time, when an external force occurs aimed at Gear 7 rotation, for example, in Direction 45 (FIG. 19), Locking Elements 4 are affected by the force transmitted to them by Surface 13.1. Resulting from it, Locking Elements 4 will be pressed against the surface of Section 6.1 that locks Type 1 Groove 5.1 with a force whose Vector 48 is oriented along Holes 2 axis (FIG. 19). Vector 48 results from forces applied to Locking Element 4 of Gear 7 that contacts with it. As affected by an external force, the gear tries to turn in Direction 45. Due to elasticity and viscosity of lock-up clutch material, the Locking Element 4 will sink into it up to the depth Δh. The width of Contact Spot 29.1 is equal to $L_2$ (FIG. 20). After termination of the specified force impact, the surface of Section 6.1, due to the elasticity of the material of Lock-Up Clutch 3, will be restored. The shape of Contact Spot 29.1 under such interaction of the Locking Element 4 with the surface of Section 6.1 is shown in FIG. 9, and the result of modeling such a surface 37 under the rated load is shown in FIG. 69. As the radii of Locking Elements 4 and the radius of circle-forming cylindrical surfaces of Sections 6.1 are equal, the surface of Contact Spot 29.1 will not be a circle centered around the contact point, as in the prototype, but a surface elongated along the intersection line of Section 6.1 and Operational Plane 47, combined, as shown above, with Locking Plane 42 (FIG. 9).

In FIG. 69, for comparison, Contact Spot 36 for the prototype and Contact Spot 37 for the claimed device are shown under the rated load. The enlarged Contact Spot Area 37 compared to Contact Spot 36 for the prototype allows the differential with the claimed device to work steadily and reliably with static and impact loads significantly exceeding those for the prototype. It is confirmed by the modeling data shown in the table in FIG. 70. The initial data for modeling: Locking Element 4 $R_1$=6 mm, the material of Lock-Up Clutch 3, steel AISI 4130 (Young's modulus 207 GPa, Poisson's ratio 0.33, yield strength 778 MPa, tensile strength 895 MPa), temperature 20° C., rated load 3000 kg. The results show that the maximum pressure in the contact spot center of the claimed device is significantly lower than that of the prototype. The immersion depth of Locking Element 4 into the material of the lock-up clutch is significantly less for the claimed device than for the prototype. It all proves that the problem of increasing the load capacity of the claimed device has been solved.

Another task solved by the set of features of the claimed device is the possibility of switching the differential from "Unlocked" position to "Locked" position at higher rotational speeds (w) of Housing 1 relative to Gear 7 than that of the prototype. High speeds of such relative rotation occur when the vehicle turns sharply or when one of its wheels loses traction. The diagrams in FIG. 71 and FIG. 72 show the trajectories of Locking Elements 4 movement during the operation of switching the differential from "Unlocked" position to "Locked" position for the claimed device (FIG. 71) and the prototype device (FIG. 72). The observation point for these figures is fixed relative to Gear 7. The example is considered when Housing 1 rotates relative to Gear 7 in Direction 64, i.e. counterclockwise. In this case, the centers of Locking Elements 4 move relative to Gear 7 along Trajectory 59 lying in Operational Plane 47. In FIG. 71 in Position 57, Locking Element 4 is shown when the differential is in "Unlocked" position, and "Lock" command is sent to it at this moment.

The case is considered when the rotation speed ($\omega$) of Housing 1 relative to Gear 7 is maximum permissible ($\omega_{max1}$) for the claimed device and has Direction 64. The locking Lock-Up Clutch 3 with the surface of Transition Section 6.3, Type 1 Groove 5.1 of Lock-Up Clutch 3 (not shown in the diagram) begins to press Element 4 in Position 57, moving simultaneously with Housing 1 along Trajectory 59, to the bottom of Groove 12.1. When the edge of Recess 13 of Gear 7 is reached, Locking Element 4 begins to move along the axis of Hole 2 of Housing 1 (not shown in the diagram) in the direction of Differential Rotation Axis 33. The trajectory of its movement at the same time passes along Line 60 (FIG. 71) lying in Operational Plane 47. The movement of Locking Element 4 continues until it reaches Position 58, where, having reached the bottom of Recess 13 of Gear 7, it is stopped by the first Spherical Surface 13.1 of Recess 13 of Gear 7 and the second Surface 13.5 of the extension of Recess 13 of Gear 7. Now Gear 7 and Housing 1 are stationary relative to each other, and the differential is in "Locked" position.

If the differential is in "Unlocked", and the rotational speed ($\omega$) of Housing 1 relative to Gear 7 is more ($\omega_{max1}$), upon receipt of "Lock" command, Locking Element 4 does not reach the bottom of Recess 13 of Gear 7, but it hits the point of the borders of Recess 13 of Gear 7 and the bottom of Groove 12.1 of Gear 7. After the impact, there will be a rebound of Lock-Up Clutch 3, and Locking Element 4 returns to Trajectory 59 and continues moving until the next Recess 13 on Gear 7.

FIG. 72 shows a diagram of the movement of Locking Element 4 in the prototype. Two cases are shown.

Case 1. Trajectory 62, when the rotation speed of Housing 1 relative to Gear 7 is equal to the maximum permissible speed for the claimed device $\omega_{max1}$, considered in the previous example, and it has Direction 64. In this case, it can be seen that Element 4 does not have time to reach the bottom of Recess 13 of Gear 7, hits its border, Position 63, and then returns to Trajectory 59.

Case 2. Trajectory 61, when the rotation speed of Housing 1 relative to Gear 7 is the maximum permissible for the prototype device $\omega_{max2}$, has Direction 64. In this case, Element 4 reaches the bottom of Recess 13 of Gear 7 and the differential enters "Locked" position. The experiments have shown that the speed ratio ($\omega_{max1}$) and ($\omega_{max2}$), with other things being equal, is more than 5. It confirms the fact that the task has been solved, because the maximum permissible speed of the claimed device is significantly higher than the prototype speed.

If the differential is in "Locked" position, and "Unlock" command is sent to the claimed device, Lock-Up Clutch 3 moves to the leftmost position, in which its Unlocking Plane 43 is aligned with Operational Plane 47 (FIG. 12, FIG. 16). In this case, Locking Elements 4, affected by the centrifugal force arising from Housing 1 rotation, move along the axes of Holes 2 towards Lock-Up Clutch 3 and are pressed against the surfaces of Sections 6.2 of Type 1 Grooves 5.1 of this Lock-Up Clutch 3 (FIG. 13 and FIG. 18). The direction of centrifugal forces is shown by arrows in FIG. 13. After such a movement of Locking Elements 4, the differential switches to "Unlocked" position, in which Gear 7 has the opportunity to rotate freely in any direction relative to Housing 1. If the rotation speed of Housing 1 is small, and the centrifugal force is not enough to move Locking Element 4 to the surface of Sections 6.2 of Type 1 Groove 5.1, then Locking Element 4 is easily pushed out towards the surface of Section 6.2 of Type 1 Groove 5.1 by the surface of the bottom of Groove 12.1 of Gear 7.

Under impact loads on the differential containing the claimed locking device, the border between Surface 13.1 and the Bottom Surface 12.1 of Groove 12 of Gear 7 is deformed. The deformation is a rivet hardening schematically shown in FIG. 19, Item 46. The occurrence of such a hardening does not interfere with the operation of the claimed device, since the presence of Groove 12 increases the distance from Rivet Hardening 46 to Housing 1. Resulting from it, Gear 7 rotation in Housing 1 with differential position "Unlocked" occurs without interference, which facilitates achieving the claimed technical result. In the prototype, the presence of such a rivet hardening will lead to gear jamming in the differential housing.

If "Lock" command comes at the moment when the vehicle is stopped, and the differential is in "Unlocked" position, and the position of Gear 7 is as shown in FIG. 13, FIG. 16 and FIG. 18, then Lock-Up Clutch 3, when moving, cannot push Locking Elements 4 out of Section 6.2, as they rest against the bottom of Groove 12.1 of Gear 7. Lock-Up Clutch 3 will be stopped when the surface of Section 6.3 reaches the surface of Locking Element 4. The force applied by the drive mechanism, for example, Solenoid 38 (FIG. 1), in this case will try to move Lock-Up Clutch 3, selected in such a way that there is no self-destruction of elements of the claimed device and differential. This condition will persist even when the vehicle starts to move strictly straight. Only at the moment when the vehicle begins to turn or one of its wheels will loses traction, Gear 7 will start turning relative to Housing 1. Locking Elements 4 will be pushed by Lock-Up Clutch into Recesses 13 of Gear 7, and the differential will switch to "Locked" position. It is not a disadvantage of the claimed device, because when the vehicle is stopped, the differential lock is not required, and during strictly straight-line vehicle movement without traction lose, the differential lock is also not required.

Operation of the Claimed Device According to Option 2

If the differential is in the "Unlocked" position, Gears 7 and 7.1 can freely rotate around Differential Rotation Axis 33 relative to Differential Housing 1 in any direction. If the differential is in "Locked" position, Gears 7 and 7.1 are fixed relative to Housing 1 with an angular backlash equal to Angle $\beta$ (FIG. 5). The gears rotate simultaneously with it, i.e. they are stationary relative to Housing 1, unless the above backlash is taken into account. The backlash presence does not affect the device operation due to its insignificant value.

Functioning of the claimed device according to Option 2 assumes a quick and reliable switching of the differential position from "Unlocked" to "Locked" position and vice versa, both during vehicle parking and its movement. These switches can be made when one of two control commands is received from the outside: "Lock", "Unlock". These commands are sent to the claimed device, for example, as electrical signals. In the example in FIG. 2, control commands are sent in Electromagnetic Drive 17 is done by a cable via Electrical Connector 53. Turning on the electric voltage in Electromagnetic Drive 17 is done by "Lock" command, and turning off this voltage according to the appropriate algorithm is done by "Unlock" command.

According to Option 2 of this invention, the movements of Lock-Up Clutch 3 along Differential Housing 1 when locking or unlocking the differential means the rotational movement of Lock-Up Clutch 3 relative to Housing 1 around Differential Rotation Axis 33, clockwise or counter-clockwise.

Differential locking and unlocking by the device according to Examples 1 and 3 of Option 2 occurs as follows.

When a new command is received while the vehicle is moving, Electromagnetic Drive 17 moves along Differential Rotation Axis 33, depending on the received command, towards or away from Lock-Up Clutch 3.

If no voltage is applied to the electromagnet, the differential is in "Unlocked" position. Springs 25 are in an uncompressed position. In this case, Lock-Up Clutch 3 is in the first stable, Fixed Position 50 (FIG. 32, FIG. 33, FIG. 34, FIG. 35, FIG. 45), and one surface section of Locking Element 4 is pressed with by the centrifugal force to the surface of Unlocking Section 31.2 of Type 2 groove. The diametrically opposite sections of Locking Elements 4 are in Groove 12 of the first Semi-Axle Gear 7. They do not interfere with its rotation relative to Housing 1. Springs 25 provide a stable position of Pins 20 and 26, and via them—of Lock-Up Clutch 3 (FIG. 45).

When the command "Lock" is received by applying electric voltage to Electromagnetic Drive 17, the magnetic field created by it interacts with the structural elements made of steel surrounding Electromagnetic Drive 17 and is attracted to the structural elements with a given force. In this case, Lock-Up Clutch 3 is such a structural element. Affected by this force, Electromagnetic Drive 17 moves towards Lock-Up Clutch 3. At the same time, due to the presence of Stopper 16, Electromagnetic Drive 17 does not rotate relative to Differential Rotation Axis 33, at the same time, Lock-Up Clutch 3 rotates together with the housing relative to this axis. The friction force between Lock-Up Clutch 3 and Electromagnetic Drive 17 that has arisen during the mechanical contact, slows down the rotation of Lock-Up Clutch 3. In this case, Lock-Up Clutch 3, lagging behind Housing 1, rotates around Differential Rotation Axis 33 relative to the housing in the direction depending on the vehicle movement direction. It causes compression of Springs 25 with Pins 20 and 26 fixed to Lock-Up Clutch 3. The rotation occurs until it stops at the end edge of Cutout 21 of long Pins 20. When the specified limit stop is reached, the position of Lock-Up Clutch 3 corresponds to the second 51.1 or third 52.1 Fixed Positions. Moreover, if Housing 1 rotates clockwise, the view from the side of Electromagnetic Drive 17 (FIG. 2), then Lock-Up Clutch 3 is in the second Fixed Position 51.1. If Housing 1 rotation occurs counter-clockwise, Lock-Up Clutch 3 is in the third Fixed Position 52.1. FIG. 46 and FIG. 47 show the position of Springs 25 when Lock-Up Clutch 3 is respectively in the third Fixed Position 52.1 and in the second Fixed Position 51.1. In this case, long Pins 20 rest against one of the end edges of Cutouts 21. The positions of Pins 20 and 26 in FIG. 46 and FIG. 47 are shown conditionally. In this case, Springs 25 rest with one side against Projections 22, and the other side against Pins 20 and 26. It ensures a stable position of Lock-Up Clutch 3 when "Lock" command is given. The friction force between Electromagnetic Drive 17 and Lock-Up Clutch 3 is selected in such a way that it overcomes the resistance of Return Springs 25. Heating from friction between Electromagnetic Drive 17 and Lock-Up Clutch 3 does not exceed the values leading to the failure of the claimed device.

If the differential was in "Unlocked" position prior to "Lock" command was given (FIG. 34, FIG. 35), then, when the command "Lock" is received, Lock-Up Clutch 3 begins to rotate relative to Part 1 of Differential Housing 1.1. Since Gear 7 rotates freely relative to Part 1 of Differential Housing 1.1, then, as Lock-Up Clutch 3 turns, at the moment when Recess 13 for Example 1 or Recess 27 for Example 2, Gears 7 and Locking Element 4 are positioned opposite each other, Element 4 is pushed by Lock-Up Clutch 3 along Hole 2 into the specified recess. It enables Lock-Up Clutch 3 to be turned to the second 51.1 or third 52.1 Fixed Positions. In this case, Locking Element 4 on Lock-Up Clutch 3 moves from Unlocking Section 31.2 of Type 2 groove to Locking Section 31.1 of Type 2 groove. The presence of Locking Element 4 in Locking Section 31.1 of Type 2 groove does not allow Gear 7 to continue rotating relative to Housing 1 (FIG. 39, FIG. 40) because Locking Element 4 rests on Surfaces 13.1 and 13.5 or 13.3 and 13.6 of Recesses 13 of Gear 7 for Example 1, or on Surfaces 27.1 and 27.5 or 27.3 and 27.6 of Recesses 27 of Gear 7 for Example 3. Thus, the differential is switched to "Locked" position. In this position of Lock-Up Clutch 3, Gear 7 does not have the possibility of turning relative to Housing 1, as it will be prevented by Locking Elements 4 located in Holes 2 of Housing 1. At the same time, when an external force is applied to make Gear 7 rotate, for example, in Direction 45 (FIG. 40), Locking Element 4 is pushed along Axis 34 of Hole 2 in the direction of the surface of Locking Section 31.1 of Type 2 groove. Such pushing occurs with Surface 13.1 of Recess 13 of Gear 7 for Example 1, or the surface 27.1 of Recess 27 of Gear 7 for Example 3. Due to elasticity and viscosity of lock-up clutch material, the Locking Element 4 will sink into it up to the depth $\Delta h$ (FIG. 41). After termination of the specified force impact, the surface of Locking Section 31.1 of Type 2 groove, due to the elasticity of the material of Lock-Up Clutch 3, will be restored. The shape of Contact Spot 29.2 under such interaction of the Locking Element 4 with the surface of Locking Section 31.1 of Type 2 groove is shown in FIG. 29 for Example 1, and FIG. 31 shows the shape of Contact Spot 29.4 for Example 3. At the same time, the result of modeling such a surface of Contact Spot 37 for Example 1 and Contact Spot 36 for the prototype, at rated load, is shown in FIG. 69. As the radii of Locking Elements 4 and the radius of circle-forming cylindrical surfaces, along which the surface of Locking Section 31.1 of Type 2 groove is made for Example 1 are equal, the surface of Contact Spot 37 obtained during modeling on the surface of Locking Section 31.1 of Type 2 groove is not a circle centered around the contact point, as in the prototype, but a surface elongated along the circle forming the specified torus, located in the plane where Differential Rotation Axis 33 lies. The enhanced length of Contact Spot 37 compared to the prototype Contact Spot 36 reduces the pressure per area unit inside the border of Contact Spot 29.2. It facilitates the differential with the claimed locking device to operate steadily and reliably with static and impact loads significantly exceeding those for the prototype. It is confirmed by the modeling data shown in the table in FIG. 70. The simulation was carried out for Locking Element 4 in the shape of a ball with a radius $R_1 = 6$ mm, the material of Lock-Up Clutch 3, steel AISI 4130 (Young's modulus 207

GPa, Poisson's ratio 0.33, yield strength 778 MPa, tensile strength 895 MPa), temperature 20° C., rated load 3000 kg. According to the simulation results, it can be seen that the maximum pressure in the contact spot center of the claimed device is significantly lower than that of the prototype. The immersion depth of Locking Element 4 into the material of the lock-up clutch is significantly less for the claimed device than for the prototype. It all proves that the problem of increasing the load capacity of the claimed device has been solved.

Another task solved by the set of features of the claimed device is the possibility of switching the differential from "Unlocked" position to "Locked" position at higher rotational speeds (ω) of Housing 1 relative to Gear 7 than that of the prototype. High speeds of such relative rotation occur when the vehicle turns sharply or when one of its wheels slips. The diagrams of FIG. 71 and FIG. 72 show the trajectories of Locking Elements 4 movement during the operation of switching the differential from "Unlocked" position to "Locked" position for the claimed device (FIG. 71) and the prototype device (FIG. 72). The observation point for these figures is fixed relative to Gear 7.

The example is considered when Housing 1 rotates relative to Gear 7 in Direction 64, i.e. counterclockwise. In this case, the centers of Locking Elements 4 move relative to Gear 7 along Trajectory 59 lying in Operational Plane 47. In FIG. 71 in Position 57, Locking Element 4 is shown when the differential is in "Unlocked" position, and "Lock" command is sent to it at this moment. The example is considered when the rotation speed (ω) of Housing 1 relative to Gear 7 is maximum permissible ($\omega_{max1}$) for the claimed device and has Direction 64. Lock-Up Clutch 3, while turning, by the surface of Section 31.2 of unlocking Type 2 groove (not shown in the diagram), begins to press Element 4 in Position 57, moving simultaneously with Housing 1 along Trajectory 59, to the bottom of Groove 12.1. When the edge of Recess 13 or Recess 27 of Gear 7 is reached, Element 4 begins to move along Hole 2 of Housing 1 (not shown in the diagram), in the direction of Differential Rotation Axis 33. The trajectory of its movement at the same time passes along Line 60 (FIG. 71) lying in Operational Plane 47. For Example 1, the movement of Locking Element 4 continues until it reaches Position 58, where, having reached the bottom of Recess 13 of Gear 7, it is stopped by the first Spherical Surface 13.1 of Recess 13 of Gear 7 and the second surface 13.5 of the extension of Recess 13 of Gear 7. Now Gear 7 and Housing 1 are stationary relative to each other, and the differential is in the "Locked" position. If the differential is in "Unlocked" position, and the rotation speed (ω) of Housing 1 relative to Gear 7 is is more ($\omega_{max1}$), upon receipt of "Lock" command, Element 4 does not reach the bottom of Recess 13 of Gear 7, and it hits the point of the borders of Recess 13 of Gear 7 and the bottom of Groove 12.1 of the gear border. After the impact, there will be a rebound of Lock-Up Clutch 3, and Locking Element 4 returns to Trajectory 59 and continues moving until the next Recess 13 of Gear 7. For Example 3, everything occurs similarly in Recesses 27.

FIG. 72 shows the diagram of Locking Element 4 movement in the prototype. Two cases are shown there.

Case 1. Trajectory 62, when the rotation speed of Housing 1 relative to Gear 7 is equal to the maximum permissible for the claimed device $\omega_{max1}$, as considered in the previous example, and is oriented in Direction 64. In this case, it can be seen that Element 4 does not have time to reach the bottom of the gear recess, hits its border, Position 63, and then it rebounds and returns to Trajectory 59.

Case 2. Trajectory 61, when the rotation speed of Housing 1 relative to Gear 7 is the maximum permissible for the prototype device $\omega_{max2}$ and is oriented in Direction 64. In this case, Element 4 reaches the bottom of the recess, and the differential switches to "Locked" position.

The experiments have shown that the speed ratio ($\omega_{max1}$) and ($\omega_{max2}$), with other things being equal, is more than 5. It confirms the fact that the task has been solved, because the maximum permissible speed of the claimed device is significantly higher than the prototype speed ($\omega_{max2}$).

If the differential is in the "Locked" position, and the "Unlock" command is sent to the claimed device while the vehicle is moving, then the magnetic field excited by Electromagnetic Drive 17 disappears and the braking of Lock-Up Clutch 3 stops. In this case, Springs 25 through the Pins 20 and 26 return Lock-Up Clutch 3 to the first stable, Fixed Position 50. It leads to ejection, due to centrifugal force, of Locking Elements 4 from Recesses 13 of Gear 7 for Example 1, and Recesses 27 for Example 2 along the cylindrical Holes 2 to the surface of Unlocking Section 31.2 of Type 2 Groove 5.2 (FIG. 34). Now Gear 7 can rotate without obstacles in any direction around Differential Rotation Axis 33 relative to Housing 1. The differential has switched to the "Unlocked" position. In the same case, if the rotation speed of Housing 1 is small, and the centrifugal force is insufficient, Locking Element 4 is pushed out by one of the surfaces of Recess 13 or Recess 27 to the surface of Unlocking Section 31.2 of Type 2 groove (FIG. 40).

Under impact loads on the differential containing the claimed locking device, the material of Gear 7 is deformed at the border of Recess 13 or Recess 27 and the Bottom Surface 12.1 of Groove 12 of Gear 7. The deformation is a rivet hardening, schematically shown in FIG. 40, Item 46. The occurrence of such a rivet does not disrupt the operation of the claimed device, because the presence of Groove 12 increases the distance from Rivet 46 to Part 1 of Housing 1.1. Thus, Gear 7 rotation when the differential is "Unlocked" goes without interference, which facilitates achieving the claimed technical result. In the prototype, due to lack of such a distance, the presence of such a rivet will lead to gear jamming in the differential housing.

If the vehicle is stopped, and the differential is in "Unlocked" position (FIG. 34) and "Lock" command is given to Gear 7 position as shown in FIG. 34, FIG. 35, FIG. 36 and FIG. 37. Then, since Lock-Up Clutch 3 in this case does not rotate relative to Electromagnetic Drive 17, it cannot turn into the second 51 or third 52 fixed position, and, therefore, the differential lock will not occur. Blocking will not occur even when the vehicle starts to move straight, because despite the fact that Lock-Up Clutch 3 has begun to rotate relative to Electromagnetic Drive 17, it is stationary relative to Housing 1, so, it cannot push out Locking Elements 4 from Unlocking Section 31.2 of Type 2 groove, as they rest against the bottom of Groove 12.1 of Gear 7. And only at the moment when the vehicle begins to turn, or one of its wheels loses traction, Gear 7 will begin to rotate relative to Housing 1 and Locking Elements 4 will be pushed by Lock-Up Clutch 3 into Recesses 13 or into Recesses 27 of Gear 7, and the differential will switch to the "Locked" position. It is not a disadvantage of the claimed device, because when the vehicle is stopped, the differential lock is not required. The differential lock is also not required within strictly straight-line movement of the vehicle without traction lose.

The presence of the first 13.4, second 13.5 and third 13.6 extension surfaces of Recess 13 of Gear 7 enables increasing the values of Thrust Washer 11.1 admitted wear, at which the operability of the claimed device is maintained. The wear of this washer leads to Gear 7 displacement, and hence, to offset of Recesses 13 of Gear 7 along Differential Rotation Axis 33 relative to Operational Plane 47 (FIG. 4). In the absence of the first 13.4, second 13.5 and third 13.6 surfaces of Recess 13 of Gear 7, the slightest wear of Thrust Washer 11 leads to the need for its replacement, because the above offset makes it impossible to fully immerse Locking Element 4 in Recess 13 of semi-axle Gear 7, excluding the differential lock. The presence of these surfaces enables compensation of Thrust Washer 11.1 wear in thickness by $L_1$, where $L_1$ is the value of Gear 7 Recess 13 width increase (FIG. 4). At the same time, the presence of the first 13.4, second 13.5 and third 13.6 extension surfaces of Recess 13 of Gear 7 enables compensation of manufacturing errors. Thus, the presence of the first 13.4, second 13.5 and third 13.6 surfaces leads to an elevated period of fail-safe differential functioning, and it facilitates achieving the claimed technical result. For Example 3, the same can be said for Recesses 27, bearing in mind that 1.1, in this case, takes part in width $L_{10}$ formation for Surfaces 27.4, 27.5 and 27.6, namely: $L_{10}=L_9+L_1$, where $L_9$ is the useful length of Locking Element 4.2, and L is the value of width increase of Recess 27 of Gear 7 that determines Thrust Washer 11.1 admitted wear (FIG. 50, FIG. 51)

Operation according to Example 2 is similar to Example 1, it differs only in that the stop of Lock-Up Clutch 3 in the second 51 or third 52 "Locked" fixed positions occurs due to the presence of Limit Stop Sections 32.3 of Type 3 Groove 5.3 of Lock-Up Clutch 3, and not due to cutouts in the ring groove, on the borders of which the long Pins 20 rest, as in Examples 1 and 3. In this case, if the device was in "Unlocked" position, and when the command "Lock" is received by Electromagnetic Drive 17 (FIG. 2), the electric voltage of Electromagnetic Drive 17 moves towards Lock-Up Clutch 3. At the same time, due to Stopper 16 (FIG. 38), Electromagnetic Drive 17 does not rotate relative to Differential Rotation Axis 33. At the same time, Lock-Up Clutch 3 rotates jointly with Housing 1 relative to this axis. The friction force generated by the mechanical contact of the pair: "Lock-Up Clutch 3—Electromagnetic Drive 17" slows down Lock-Up Clutch 3 rotation. In this case, Lock-Up Clutch 3, lagging behind the rotating Housing 1, rotates around Differential Rotation Axis 33 in the direction depending on the vehicle movement direction. It causes compression of Springs 25 with Pins 26 fixed to Lock-Up Clutch 3. Since Gear 7 rotates freely relative to the housing, when Lock-Up Clutch 3 is rotated at the moment when Recess 13 is under Locking Element 4, it is pushed out by Lock-Up Clutch 3 into the specified recess. Having reached Recess 13 bottom, with further rotation of Lock-Up Clutch 3 relative to Housing 1, Locking Element 4 rests with its opposite part against the surface of Limit Stop Sections 32.3 of Type 3 Groove 5.3 of Lock-Up Clutch 3. Locking Element 4 begins to prevent further rotation of Lock-Up Clutch 3, and it is fixed in the second 51.2 or third 52.2 "Locked" Fixed Positions. Thus, the differential switched to "Locked" position. The position in which Lock-Up Clutch 3 is fixed, i.e. the second 51.2 or the third 52.2, depends on the direction of Differential Housing 1 rotation relative to Differential Crankcase 55. Moreover, if Housing 1 rotates clockwise (view from Electromagnetic Drive 17 in FIG. 39), then Lock-Up Clutch 3 is fixed in the second Fixed Position 51.2, and if Housing 1 rotation is counterclockwise, Lock-Up Clutch 3 is in the third Fixed Position 52.2 (FIG. 61).

FIG. 66 shows the position of Springs 25 when Lock-Up Clutch 3 is in the second Fixed Position 51.2. FIG. 67 shows the position of Springs 25 when Lock-Up Clutch 3 is in the third Fixed Position 52.2. The positions of Pins 26 in FIG. 66 and FIG. 67 are shown conditionally. In this case, Springs 25 rest with one side against Projections 22, and the other side rests against Pins 26. It ensures a stable position of Lock-Up Clutch 3 when the "Lock" command is given. The friction force between Electromagnetic Drive 17 and Lock-Up Clutch 3 is selected in such a manner that this force overcomes the resistance of return Springs 25, but the heating from friction between Electromagnetic Drive 17 and Lock-Up Clutch 3 does not exceed the values resulting in the claimed device failure.

If the differential is in "Locked" position, and "Unlock" command is sent to the claimed device while the vehicle is moving, the magnetic field excited by Electromagnetic Drive 17 disappears, and Lock-Up Clutch 3 braking is terminated. In this case, Springs 25 via Pins 26 return Lock-Up Clutch 3 to the first stable Fixed Position 50. It leads to ejection, due to centrifugal force, of Locking Elements 4 from Recesses 13 of Gear 7 along the cylindrical holes 2.1 to Unlocking Sections 31.2 Type 3 grooves (FIG. 59, FIG. 60). Now Gear 7 can rotate without obstacles in any direction around Differential Rotation Axis 33 relative to Part 1 of Housing 1.1. The differential has switched to "Unlocked" position. In case the rotation speed of Housing 1.1 is low, and the centrifugal force is insufficient. Locking Element 4 is pushed to Unlocking Section 32.2 of Type 3 groove by Surface 13.1 or 13.3 of Gear 7 (FIG. 62).

If no voltage is applied to the electromagnet, the differential is in "Unlocked" position. Springs 25 are in an uncompressed position, while Lock-Up Clutch 3 is in the first stable Fixed Position 50 (FIG. 32, FIG. 33, FIG. 59, FIG. 60, FIG. 65), and Locking Elements 4 with one section of their surface are pressed by centrifugal force to the surfaces of Unlocking Sections 32.2 of Type 3 Grooves. At the same time, the diametrically opposite sections of Locking Elements 4 are located in Groove 12 of the first Semi-Axle Gear 7, and they do not prevent its rotation relative to Part 1 of Housing1.1. Springs 25 provide a stable position of Pins 26, and via them—of Lock-Up Clutch 3 (FIG. 65).

INDUSTRIAL APPLICABILITY

The claimed differential locking device of the vehicle according to Options 1 and 2 can be used in any vehicles.

The advantage of the claimed device is:
enhanced load capacity of the differential locking mechanism;
elevated reliability of the differential locking mechanism;
extended flawless operation period of the differential lock mechanism;
increased operation speed of the differential locking system, including the period on the move due to eliminating the misalignment of Lock-Up Clutch of the differential locking mechanism relative to the differential housing (for Option 1);
elevated rotation speed of the semi-axle gear relative to the differential housing wherein differential locking is possible;
expansion of the design range of existing vehicles wherein the application of the claimed device is possible.

The technical result is achieved due to the totality of the essential features of the device.

SOURCES OF INFORMATION

1. Utility Model U.S. Pat. No. 154,407 Differential with forced locking for a vehicle (Application No.

2014151019; IPC F16H 48/20. Patent holder: Tobikov Alexander Andreevich (RU). Published on 20 Aug. 2015).
2. U.S. Pat. No. 2,040,720 Differential with forced locking for a vehicle (Application No. 5028840; IPC F16H 48/20. Published on 25 Jul. 1995).
3. U.S. Pat. No. 2,304,243 Differential with forced locking for a vehicle (Application No. 2006113228; IPC F16H 48/20, B60K23/04, B60K17/16. Published on August 2007).
4. U.S. Pat. No. 2,165,043 Mechanism of forced locking of the inter-wheel differential of a vehicle (application Ser. No. 99/117,948, IPC F16H 48/20. Patent holder: JSC "KAMAZ". Published on 10 Apr. 2001).
5. U.S. Pat. No. 2,319,875 Self-locking vehicle differential (Application No. 2005137271, IPC F16H 48/20. Published 2007).
6. U.S. Pat. No. 2,578,082 Forcibly locked conical differential of a vehicle (Application No. 2014151063; IPC F16H 48/00, B60K 17/00. Patent holder: Kozlov Georgy Leonidovich (RU). Published on 20 Mar. 2016).
7. U.S. Pat. No. 2,653,936 Forcibly locked differential of the vehicle drive axle (U.S. Pat. No. 2,653,936; IPC F16H 48/30. Patent holder(s): Gostev Vasily Evgenievich (RU) Published on 15 May 2018).
8. Utility Model U.S. Pat. No. 165,845 Forcibly locked wheel differential (Application No. 2016125153; IPC F16H 48/34. Patent holder(s): LLC "Sarapulsky Systems" (RU). Published on 10 Nov. 2016).
9. Utility Model U.S. Pat. No. 142,974 Vehicle differential (Application No. 2014108806; IPC F16H 48/20, F16H 48/08. Patent holder: George Leonidovich Kozlov (RU). Published on 10 Jul. 2014. Does not work).
10. RF Patent No. 2661248 Assembly unit of the locking differential (Application No. 2014152634; IPC B60K 17/16, F16H 48/34. Patent holder: EATON CORPORATION (US). Published on 13 Jul. 2018)
11. RF Patent No. 2619742 Locking differential with a small stroke length and a long locking engagement length (Application No. 2014152630; IPC F16H 48/34. Patent holder: EATON CORPORATION (US). Published on 17 May 2017).
12. GOST 22696-2013 Rolling bearings. Cylindrical rollers. Specifications.

What is claimed is:

1. A vehicle differential locking device integrated into a differential, the differential including a differential housing having a rotation axis and two semi-axle gears located inside the differential housing, the vehicle differential locking device being in either a "Locked" position or an "Unlocked" position, and the vehicle differential locking device comprising:
    locking elements each shaped as a rotation body;
    through locking holes made in the differential housing, each of the through locking holes having an axis, the locking elements being arranged in the through locking holes so as to freely move along the axes of the through locking holes;
    recesses made on an outer surface of one of the two semi-axle gears each of the recesses being shaped to receive a part of one of the locking elements;
    a ring lock-up clutch mounted on the differential housing around the locking holes with the locking elements, the ring lock-up clutch having an inner surface provided with lock-up clutch grooves;
    wherein the ring lock-up clutch is connected to a drive, and the ring lock-up clutch is configured to rotate around the rotation axis of the differential housing in a clockwise direction or a counterclockwise direction when the vehicle differential locking device is moved to the "Locked" position.

2. The differential locking device according to claim 1, wherein the differential housing has an end surface, and the ring lock-up clutch is configured to be mounted on the end surface, the end surface having a ring groove configured to accommodate return springs, and wherein the ring lock-up clutch comprises pins configured to interact with the return springs to return the differential locking device to the "Unlocked" position.

3. The vehicle differential locking device according to claim 1, wherein each of the lock-up clutch grooves of the ring lock-up clutch comprises two limit stop sections configured to stop the ring lock-up clutch from rotating around the rotation axis of the differential housing when the vehicle different locking device is in the "Locked" position, and wherein one of the two limit stop sections is configured to stop the ring lock-up clutch from rotating around the rotation axis of the differential housing in the clockwise direction, and another of the two limit stop sections is configured to stop the ring lock-up clutch from rotating around the rotation axis of the differential housing in the counterclockwise direction.

4. The vehicle differential locking device according to claim 1, further comprising a spring mechanism for returning the vehicle differential locking device to the "Unlocked" position by rotating the ring lock-up clutch around the rotation axis of the differential housing in the clockwise direction or the counterclockwise direction.

* * * * *